(12) United States Patent  
Shablygin et al.

(10) Patent No.: US 8,555,079 B2
(45) Date of Patent: Oct. 8, 2013

(54) TOKEN MANAGEMENT

(75) Inventors: Eugene Shablygin, Bedford, NH (US); Vasily Zakharov, Moscow (RU); Oleg Bolotov, Moscow (RU); Eric Scace, Cambridge, MA (US)

(73) Assignee: WWPass Corporation, Manchester, NH (US)

( * ) Notice: Subject to any disclaimer, the term of this patent is extended or adjusted under 35 U.S.C. 154(b) by 18 days.

(21) Appl. No.: 13/312,221

(22) Filed: Dec. 6, 2011

(65) Prior Publication Data

US 2013/0145173 A1    Jun. 6, 2013

(51) Int. Cl.
*G06F 21/00* (2013.01)
(52) U.S. Cl.
USPC ........................................................ 713/185
(58) Field of Classification Search
USPC ........................................................ 713/185
See application file for complete search history.

(56) References Cited

U.S. PATENT DOCUMENTS

| | | | |
|---|---|---|---|
| 5,408,633 A | 4/1995 | Katsumura et al. | |
| 5,864,854 A | 1/1999 | Boyle | |
| 7,457,933 B2 | 11/2008 | Pferdekaemper et al. | |
| 7,546,427 B2 | 6/2009 | Gladwin et al. | |
| 7,574,579 B2 | 8/2009 | Gladwin et al. | |
| 7,752,403 B1 | 7/2010 | Weinman, Jr. | |
| 7,818,430 B2 | 10/2010 | Zuckerman et al. | |
| 7,818,441 B2 | 10/2010 | Zuckerman et al. | |
| 7,818,445 B2 | 10/2010 | Zuckerman et al. | |
| 7,818,518 B2 | 10/2010 | Gladwin et al. | |
| 7,822,209 B2* | 10/2010 | Fu et al. ........................ | 380/284 |
| 7,822,855 B2 | 10/2010 | Zuckerman et al. | |
| 7,822,856 B2 | 10/2010 | Zuckerman et al. | |
| 7,822,869 B2 | 10/2010 | Zuckerman et al. | |
| 7,827,296 B2 | 11/2010 | Zuckerman et al. | |
| 7,840,679 B2 | 11/2010 | Zuckerman et al. | |
| 7,840,680 B2 | 11/2010 | Zuckerman et al. | |
| 7,844,712 B2 | 11/2010 | Zuckerman et al. | |
| 7,853,710 B2 | 12/2010 | Zuckerman et al. | |
| 7,865,537 B2 | 1/2011 | Kodama et al. | |
| 7,904,475 B2 | 3/2011 | Gladwin et al. | |
| 7,953,771 B2 | 5/2011 | Gladwin et al. | |
| 7,953,937 B2 | 5/2011 | Gladwin et al. | |
| 7,962,641 B1 | 6/2011 | Dhuse et al. | |
| 8,019,960 B2 | 9/2011 | Gladwin et al. | |
| 2002/0002658 A1 | 1/2002 | Okayasu | |
| 2003/0014523 A1 | 1/2003 | Teloh et al. | |
| 2003/0115466 A1* | 6/2003 | Aull et al. ................... | 713/172 |
| 2003/0188218 A1 | 10/2003 | Lubbers et al. | |
| 2004/0024975 A1 | 2/2004 | Morishita et al. | |
| 2005/0154925 A1* | 7/2005 | Chitrapu et al. ............ | 713/202 |
| 2007/0079081 A1 | 4/2007 | Gladwin et al. | |
| 2008/0022086 A1* | 1/2008 | Ho et al. ...................... | 713/155 |
| 2008/0183975 A1 | 7/2008 | Foster et al. | |
| 2008/0208697 A1 | 8/2008 | Kargman et al. | |
| 2008/0209224 A1* | 8/2008 | Lord ............................. | 713/185 |
| 2009/0094250 A1 | 4/2009 | Dhuse et al. | |
| 2009/0094318 A1 | 4/2009 | Gladwin et al. | |

(Continued)

OTHER PUBLICATIONS

Cleversafe Inc., "A Paradigm Shift in Digital Asset Storage—A new storage method is revolutionizing data management, reducing costs while increasing reliability and security", Cleversafe White Paper, Chicago, IL 2012, 11 pages.

*Primary Examiner* — Matthew Smithers
(74) *Attorney, Agent, or Firm* — Fish & Richardson P.C.

(57) ABSTRACT

Systems and methods for generating replacement tokens are described herein.

30 Claims, 33 Drawing Sheets

(56) References Cited

U.S. PATENT DOCUMENTS

| | | |
|---|---|---|
| 2009/0094320 A1 | 4/2009 | Palthepu et al. |
| 2009/0125522 A1 | 5/2009 | Kodama et al. |
| 2009/0254572 A1 | 10/2009 | Redlich et al. |
| 2009/0261162 A1 | 10/2009 | Kargman et al. |
| 2009/0268915 A1* | 10/2009 | Kelly et al. ............ 380/282 |
| 2010/0017531 A1 | 1/2010 | Dhuse et al. |
| 2010/0023524 A1 | 1/2010 | Gladwin et al. |
| 2010/0023529 A1 | 1/2010 | Gladwin et al. |
| 2010/0023710 A1 | 1/2010 | Gladwin et al. |
| 2010/0063911 A1 | 3/2010 | Gladwin et al. |
| 2010/0115063 A1 | 5/2010 | Gladwin et al. |
| 2010/0161916 A1 | 6/2010 | Thornton et al. |
| 2010/0169391 A1 | 7/2010 | Baptist et al. |
| 2010/0169415 A1 | 7/2010 | Leggette et al. |
| 2010/0169500 A1 | 7/2010 | Quigley et al. |
| 2010/0179966 A1 | 7/2010 | Gladwin et al. |
| 2010/0217796 A1 | 8/2010 | Palthepu et al. |
| 2010/0250497 A1 | 9/2010 | Redlich et al. |
| 2010/0250751 A1 | 9/2010 | Leggette et al. |
| 2010/0266119 A1 | 10/2010 | Leggette et al. |
| 2010/0266120 A1 | 10/2010 | Leggette et al. |
| 2010/0268692 A1 | 10/2010 | Resch |
| 2010/0268806 A1 | 10/2010 | Kumar et al. |
| 2010/0268877 A1 | 10/2010 | Resch et al. |
| 2010/0268938 A1 | 10/2010 | Resch |
| 2010/0269008 A1 | 10/2010 | Leggette et al. |
| 2010/0287200 A1 | 11/2010 | Dhuse |
| 2010/0306578 A1 | 12/2010 | Thornton et al. |
| 2010/0332751 A1 | 12/2010 | Quigley et al. |
| 2011/0016122 A1 | 1/2011 | Motwani et al. |
| 2011/0026842 A1 | 2/2011 | Cilfone et al. |
| 2011/0029524 A1 | 2/2011 | Baptist et al. |
| 2011/0029711 A1 | 2/2011 | Dhuse et al. |
| 2011/0029731 A1 | 2/2011 | Cilfone et al. |
| 2011/0029742 A1 | 2/2011 | Grube et al. |
| 2011/0029743 A1 | 2/2011 | Grube et al. |
| 2011/0029744 A1 | 2/2011 | Leggette et al. |
| 2011/0029753 A1 | 2/2011 | Baptist et al. |
| 2011/0029765 A1 | 2/2011 | Grube et al. |
| 2011/0029809 A1 | 2/2011 | Dhuse et al. |
| 2011/0029836 A1 | 2/2011 | Dhuse et al. |
| 2011/0029842 A1 | 2/2011 | Grube et al. |
| 2011/0055170 A1 | 3/2011 | Mark |
| 2011/0055178 A1 | 3/2011 | Mark |
| 2011/0055273 A1 | 3/2011 | Resch |
| 2011/0055277 A1 | 3/2011 | Resch |
| 2011/0055473 A1 | 3/2011 | Mark |
| 2011/0055474 A1 | 3/2011 | Resch |
| 2011/0055578 A1 | 3/2011 | Resch |
| 2011/0055661 A1 | 3/2011 | Grube et al. |
| 2011/0055662 A1 | 3/2011 | Grube et al. |
| 2011/0055903 A1 | 3/2011 | Leggette |
| 2011/0071988 A1 | 3/2011 | Resch et al. |
| 2011/0072115 A1 | 3/2011 | Gladwin et al. |
| 2011/0072210 A1 | 3/2011 | Dhuse |
| 2011/0072321 A1 | 3/2011 | Dhuse |
| 2011/0077086 A1 | 3/2011 | Grube et al. |
| 2011/0078080 A1 | 3/2011 | Grube et al. |
| 2011/0078277 A1 | 3/2011 | Baptist |
| 2011/0078343 A1 | 3/2011 | Resch et al. |
| 2011/0078371 A1 | 3/2011 | Resch |
| 2011/0078372 A1 | 3/2011 | Gladwin et al. |
| 2011/0078373 A1 | 3/2011 | Hoffman et al. |
| 2011/0078377 A1 | 3/2011 | Grube et al. |
| 2011/0078493 A1 | 3/2011 | Grube et al. |
| 2011/0078503 A1 | 3/2011 | Resch |
| 2011/0078512 A1 | 3/2011 | Grube et al. |
| 2011/0078534 A1 | 3/2011 | Resch |
| 2011/0078774 A1 | 3/2011 | Grube et al. |
| 2011/0083049 A1 | 4/2011 | Grube et al. |
| 2011/0083053 A1 | 4/2011 | Grube et al. |
| 2011/0083061 A1 | 4/2011 | Grube et al. |
| 2011/0102546 A1 | 5/2011 | Dhuse et al. |
| 2011/0106769 A1 | 5/2011 | Baptist et al. |
| 2011/0106855 A1 | 5/2011 | Resch et al. |
| 2011/0106904 A1 | 5/2011 | Resch et al. |
| 2011/0106909 A1 | 5/2011 | Gladwin |
| 2011/0106972 A1 | 5/2011 | Grube et al. |
| 2011/0106973 A1 | 5/2011 | Grube et al. |
| 2011/0107026 A1 | 5/2011 | Quigley et al. |
| 2011/0107027 A1 | 5/2011 | Grube et al. |
| 2011/0107036 A1 | 5/2011 | Resch et al. |
| 2011/0107078 A1 | 5/2011 | Resch et al. |
| 2011/0107094 A1 | 5/2011 | Resch et al. |
| 2011/0107112 A1 | 5/2011 | Resch |
| 2011/0107113 A1 | 5/2011 | Resch et al. |
| 2011/0107165 A1 | 5/2011 | Resch et al. |
| 2011/0107180 A1 | 5/2011 | Markison et al. |
| 2011/0107181 A1 | 5/2011 | Markison et al. |
| 2011/0107182 A1 | 5/2011 | Grube et al. |
| 2011/0107184 A1 | 5/2011 | Grube et al. |
| 2011/0107185 A1 | 5/2011 | Grube et al. |
| 2011/0107380 A1 | 5/2011 | Gladwin et al. |
| 2011/0122523 A1 | 5/2011 | Gladwin et al. |
| 2011/0125771 A1 | 5/2011 | Gladwin et al. |
| 2011/0125916 A9 | 5/2011 | Dhuse et al. |
| 2011/0125999 A1 | 5/2011 | Cilfone et al. |
| 2011/0126026 A1 | 5/2011 | Gladwin et al. |
| 2011/0126042 A1 | 5/2011 | Dhuse |
| 2011/0126060 A1 | 5/2011 | Grube et al. |
| 2011/0126295 A1 | 5/2011 | Resch |
| 2011/0161665 A1 | 6/2011 | Perez |
| 2011/0161666 A1 | 6/2011 | Gladwin et al. |
| 2011/0161679 A1 | 6/2011 | Grube et al. |
| 2011/0161680 A1 | 6/2011 | Grube et al. |
| 2011/0161681 A1 | 6/2011 | Dhuse et al. |
| 2011/0161754 A1 | 6/2011 | Baptist et al. |
| 2011/0161781 A1 | 6/2011 | Gladwin et al. |
| 2011/0182424 A1 | 7/2011 | Grube et al. |
| 2011/0182429 A1 | 7/2011 | Grube et al. |
| 2011/0184912 A1 | 7/2011 | Baptist et al. |
| 2011/0184997 A1 | 7/2011 | Grube et al. |
| 2011/0185141 A1 | 7/2011 | Dhuse et al. |
| 2011/0185193 A1 | 7/2011 | Grube et al. |
| 2011/0185253 A1 | 7/2011 | Resch et al. |
| 2011/0185258 A1 | 7/2011 | Grube et al. |
| 2011/0202568 A1 | 8/2011 | Gladwin et al. |
| 2011/0213928 A1 | 9/2011 | Grube et al. |
| 2011/0213929 A1 | 9/2011 | Baptist et al. |
| 2011/0213940 A1 | 9/2011 | Gladwin et al. |
| 2011/0214011 A1 | 9/2011 | Grube et al. |
| 2011/0219100 A1 | 9/2011 | Dhuse et al. |
| 2011/0225209 A1 | 9/2011 | Volvovski et al. |
| 2011/0225360 A1 | 9/2011 | Baptist et al. |
| 2011/0225361 A1 | 9/2011 | Resch et al. |
| 2011/0225362 A1 | 9/2011 | Leggette |
| 2011/0225386 A1 | 9/2011 | Motwani et al. |
| 2011/0225450 A1 | 9/2011 | Gladwin et al. |
| 2011/0225451 A1 | 9/2011 | Leggette et al. |
| 2011/0225466 A1 | 9/2011 | Resch et al. |
| 2011/0228931 A1 | 9/2011 | Grube et al. |
| 2011/0231699 A1 | 9/2011 | Gladwin et al. |
| 2011/0231733 A1 | 9/2011 | Cilfone et al. |
| 2011/0261813 A1 | 10/2011 | Baptist et al. |
| 2011/0261819 A1 | 10/2011 | Mark et al. |
| 2011/0261838 A1 | 10/2011 | Baptist et al. |
| 2011/0261839 A1 | 10/2011 | Baptist et al. |
| 2011/0261840 A1 | 10/2011 | Baptist et al. |
| 2011/0264717 A1 | 10/2011 | Grube et al. |
| 2011/0264823 A1 | 10/2011 | Baptist et al. |
| 2011/0264869 A1 | 10/2011 | Baptist et al. |
| 2011/0264950 A1 | 10/2011 | Baptist et al. |
| 2011/0264962 A1 | 10/2011 | Baptist et al. |
| 2011/0264989 A1 | 10/2011 | Resch et al. |
| 2011/0265143 A1 | 10/2011 | Grube et al. |
| 2011/0286594 A1 | 11/2011 | Resch et al. |
| 2011/0286595 A1 | 11/2011 | Resch et al. |
| 2011/0289122 A1 | 11/2011 | Grube et al. |
| 2011/0289215 A1 | 11/2011 | Resch et al. |
| 2011/0289283 A1 | 11/2011 | Baptist et al. |
| 2011/0289358 A1 | 11/2011 | Grube et al. |
| 2011/0289359 A1 | 11/2011 | Resch et al. |
| 2011/0289366 A1 | 11/2011 | Baptist et al. |
| 2011/0289378 A1 | 11/2011 | Grube et al. |

| | | | | | | |
|---|---|---|---|---|---|---|
| 2011/0289383 | A1 | 11/2011 | Dhuse et al. | 2011/0314355 A1 | 12/2011 | Grube et al. |
| 2011/0289565 | A1 | 11/2011 | Resch et al. | 2011/0314356 A1 | 12/2011 | Grube et al. |
| 2011/0289566 | A1 | 11/2011 | Resch et al. | 2012/0027134 A1 | 2/2012 | Gladwin et al. |
| 2011/0289577 | A1 | 11/2011 | Resch et al. | 2012/0030371 A1 | 2/2012 | Baptist et al. |
| 2011/0311051 | A1 | 12/2011 | Resch et al. | 2012/0030437 A1 | 2/2012 | Resch et al. |
| 2011/0314058 | A1 | 12/2011 | Motwani | 2012/0030736 A1 | 2/2012 | Resch et al. |
| 2011/0314072 | A1 | 12/2011 | Resch et al. | 2012/0054456 A1 | 3/2012 | Grube et al. |
| 2011/0314154 | A1 | 12/2011 | Resch et al. | | | |
| 2011/0314346 | A1 | 12/2011 | Vas et al. | | | |

\* cited by examiner

TOKEN MANAGEMENT

FIELD

Computer systems and methods, computer program products and more particularly electronic commerce and authentication conducted via computer networks are described herein.

BACKGROUND

Authentication is the process of validating a set of credentials that are provided by a party (e.g., a natural person, a program running on a computer system, or other automaton) to a transaction or on behalf of such a party. Authentication is accomplished by verifying, through a challenge/response operation using various authentication protocols, one or more of: something a party knows; something a party possesses; some characteristic about the party; or having one or more other authenticated parties vouch for the party being authenticated. For example, verification of something that a party knows may be accomplished through a shared secret, such as a party's password, or through something that is known only to a particular party, such as a party's cryptographic key. Verification of something that a party possesses may employ a smartcard or other form of hardware token. Verification of a human party characteristic might employ a biometric input such as a fingerprint or retinal map.

The role of the parties to a transaction may be characterized as user and service provider. The service provider delivers to the user via computer systems and networks some form or combination of information, information access, or access to resources. The service provider may also or instead perform some other function or service for or on behalf of the user.

SUMMARY

The above and other features of the present invention will be better understood from the following detailed description of the preferred embodiments of the invention that is provided in connection with the accompanying drawings.

In some aspects, a computer-implemented method includes receiving a user identifier and one or more encryption keys from a recovery key, the recovery key being associated with a user and enabled to generate replacement tokens. The method also includes storing the user identifier and the one or more encryption keys on a replacement token. The method also includes requesting a passcode from the user; in response to the request, receiving the passcode from the user. The method also includes, upon verification of the passcode, activating the replacement token by updating state information associated with the replacement token.

Embodiments can include one or more of the following.

Receiving the user identifier and the one or more encryption keys from the recovery key can include receiving the user identifier and the one or more encryption keys from a memory of the recovery key.

Receiving the user identifier and the one or more encryption keys from the recovery key can include receiving the user identifier and the one or more encryption keys from a data container identified by an access code that is based in part on a unique identifier associated with the recovery key.

The method can also include receiving an encryption algorithm identification associated with each of the one or more encryption keys from the recovery key and storing the encryption algorithm identification with the user identifier and the one or more encryption keys on the replacement token.

The method can also include prior to storing the user identifier and the one or more encryption keys on the replacement token, storing the user identifier and the one or more encryption keys in a storage location that is accessible based on a combination of a service provider identifier and a code, receiving the code from the user, combining the code with the service provider identifier, and accessing the stored user identifier and one or more encryption keys from the storage location.

The method can also include storing an encryption algorithm identifier on the replacement token.

The recovery key can be prevented from performing transactions other than those associated with token and passcode management.

The method can also include installing firmware on the token prior to storing the user identifier and the one or more encryption keys on the token.

The method can also include providing a list of tokens associated with the particular user to the particular user, receiving a selection of one or more of the tokens from the list of tokens, and deactivating the selected one or more of the tokens from the list of tokens by updating state information associated with the token.

The method can also include subsequent to activating the token receiving a request from a service provider to authenticate the token and authenticating the token to enable the user and the service provider to perform a transaction.

The token can be an electronic device configured to connect to the Internet.

The token can be an electronic device configured to connect to a network via a host device.

The token can be an electronic device configured to connect to the Internet via a contactless interface.

The token can be an electronic device configured to connect to the Internet via a contact-based interface.

Updating the state of the token can include accessing a look-up table indexed by token identifiers and modifying the state of the token in the look-up table.

Updating the state of the token can include modifying a state of the token in a data container accessible based on an access code generated based on a combination of the token identifier and a service provider identifier.

The method can also include subsequent to activating the token to authenticating the user based on presentation of the token.

BRIEF DESCRIPTION OF THE DRAWINGS

The accompanying drawings illustrate preferred embodiments of the invention, as well as other information pertinent to the disclosure, in which.

DETAILED DESCRIPTION

In some aspects of the systems and methods for authentication described herein, the user has a token that is unique but carries no personal information. The token can be a USB dongle or NFC-capable SmartCard. An application or service provider also has a token that is unique and registered with the authentication system. A transaction only takes place when both parties (e.g., the user and service provider) have authenticated with the authentication system using their tokens. Additional authentication factors can also be supported such as two factor authentication based on a token and passcode or three factor authentication based on a token, passcode, and biometric information. In some examples, a party can include a natural person, a program running on a computer system, and/or other automaton. In some additional examples, a party can also include any third-party service or application used by a party to create, store, retrieve, modify, delete, or otherwise use the data.

As described herein, user authentication can include authentication of the system to the user. Service provider authentication can include authentication of the system to the service provider. Neither party can complete authentication with a false system attempting to misrepresent itself as the true system.

In some examples, system authentication occurs prior to user authentication, such that if a party attempts authentication with a false system, the authentication procedure fails before that party reveals information critical to certifying the party's authenticity. A false system therefore cannot obtain information from the true party that would enable a false party to misrepresent itself as the user or as the service provider.

Figure 1A:
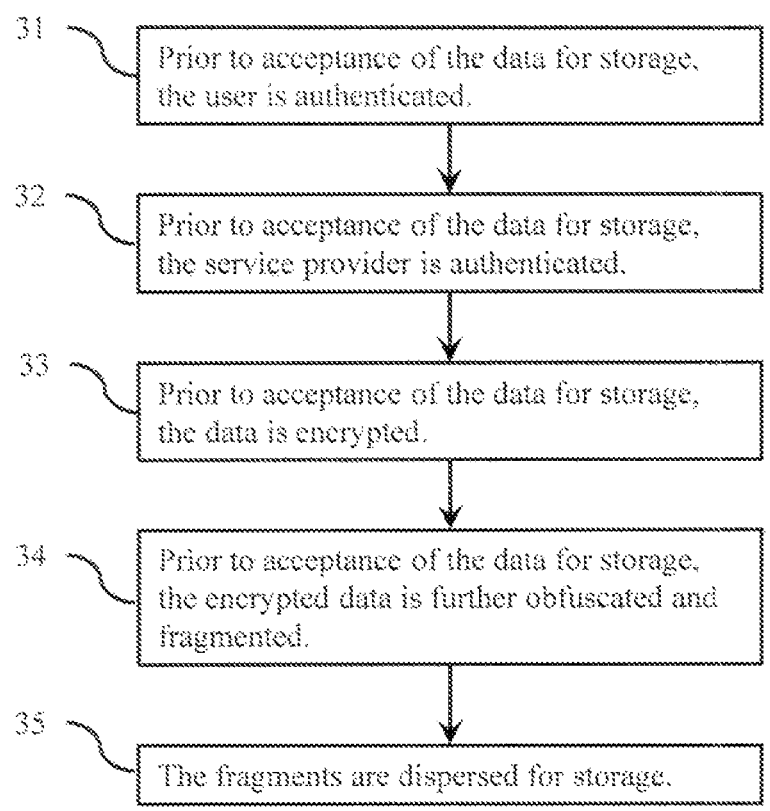
FIG. 1A depicts a process for storing data in a dispersed, secure manner
Figure 1B:
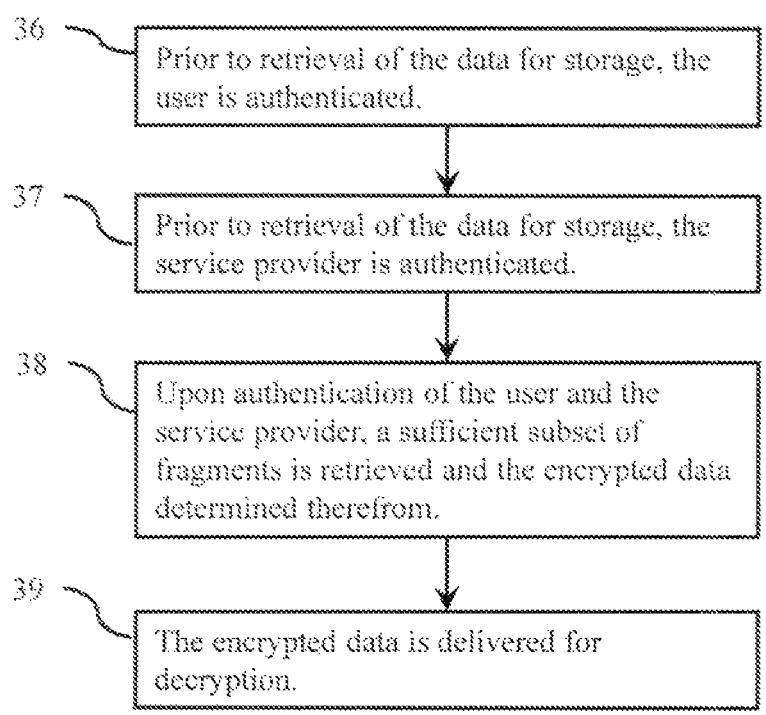
FIG. 1B shows a process for retrieving data in a dispersed, secure manner.

FIG. 1A depicts an overview of a process for storing data (e.g., storing previously un-stored data and/or modifying previously-stored data) in a dispersed, secure manner and FIG. 1B shows a process for retrieving data (e.g., retrieving data can includes deleting or rendering inaccessible to any party, including the storage system itself the previously-stored data from the storage system and/or rendering the previously-stored data otherwise inaccessible) in a dispersed, secure manner. The storage of data in a secure manner is tightly coupled with authentication of the parties that store the data. For example, to ensure the authenticity of the parties and enable secure storage, prior to acceptance by the system of the data for storage, the user is authenticated via a secure but anonymous method 31. Requiring the user to be authenticated can provide the advantage of allowing the user to feel confident that his/her identity cannot be mimicked and that the data will be safe from both internal and external threats. For example, the user can be authenticated using one or more of the authentication methods described herein. Also, prior to acceptance by the system of the data for storage, the service provider is authenticated via a secure method 32. Requiring the service provider to be authenticated in addition to the user can provide the advantage of providing assurance to the user that he is talking to or interacting with a real service provider. For example, the service provider can be authenticated using one or more of the authentication methods described herein. As noted herein, the authentication can be bilateral (requiring both the user and the service provider to be authenticated prior to entering a transaction) which provides the benefit of both user and service provider being mutually assured of the other's authenticity.

Authentication systems and methods described herein are believed to provide various advantages. In some examples, the authentication and storage of the data limits storage and retrieval of the data to only the unique (but otherwise anonymous) user that created, modified, or caused the creation or modification of the data, and only in conjunction with the specific, similarly-authenticated service provider (e.g., a program running on a computer system or other automaton providing a service or application such as a data storage service, financial transaction service, digital rights management service, etc.) employed by the user to create or modify the data. It is also believed that the authentication processes described herein provide an advantage of limiting the storage and retrieval of the data by a service provider to only that portion of the data which was created or modified by that specific service provider with that specific user. Thus, a user can authenticate with multiple different service providers using a single device without fear that any service provider will be able to share or otherwise access other similarly-stored information associated with a different service provider. In some additional examples, the authentication processes described herein can prevent both the user and service provider from individually or collectively repudiating the transaction that created or modified the data. This provides the advantage of validating the transaction. In some additional examples, the authentication processes described herein can prevent a false service provider from representing itself to the user as the legitimate service provider. This can provide the advantage of allowing a user to be confident of the service provider's identity when entering a transaction with the service provider. In some additional examples, the authentication processes described herein can prevent a false user from representing itself to the service provider as the legitimate user. Similarly, this can provide the advantage of allowing a service provider to be confident of the user's identity when entering a transaction with the service provider.

Returning to FIG. 1A, prior to acceptance of the data for storage, the data is encrypted 33, The data can be encrypted by an algorithm and/or cryptographic key known only to the party using, for example, one or more of the encryption methods described herein. Also described herein are systems and methods for encryption and decryption of data using algorithms and/or cryptographic keys known only to the party(s) that created the data. Using such algorithms can provide the advantage of protecting the privacy of the data.

After encryption and prior to storage of the data, the encrypted data is further obfuscated and fragmented 34. The data can be obfuscated and fragmented using, for example, one or more of the fragmentation methods described herein. In general the obfuscation and fragmentation methods described herein obfuscate and fragment the data such that:
a) no fragment represents by itself any portion of the encrypted data;
b) no small subset of fragments can be used to determine the encrypted data; and
c) a larger subset of fragments, but not all fragments, are sufficient to determine the encrypted data without error.

After obfuscation and fragmentation of the encrypted data, the fragments are dispersed for storage 35. The dispersal can be accomplished using, for example, one or more of the dispersion techniques described in more detail herein and which disperse the segments such that:
a) no subset of fragments sufficient to determine the encrypted data resides within a single or small subset of places;
b) the identification of point within the data storage location for each stored fragment can only be determined by a combination of a unique code assigned to the user, a unique code assigned to the service provider, and, optionally, other codes dependent on the application implemented by the service provider;
c) the identification of location cannot be used to determine any of the codes just described.

Prior to retrieval of the data from storage, the user is authenticated 36. The user can be authenticated via a secure but anonymous method such as the authentication methods described herein. Because the authentication is anonymous to authenticator, the system can provide the advantage of eliminating the need for the authenticator or the service provider to store a database of identities.

Prior to retrieval of the data from storage, the service provider is also authenticated 37. The service provider can be authenticated via a secure method such as the authentication methods described herein. Upon correct authentication of the user and service provider, a sufficient subset of fragments is retrieved from dispersed data storage and the encrypted data determined therefrom 38. The encrypted data is delivered to service provider for decryption 39. The encrypted data can be decrypted using, for example, an algorithm and/or cryptographic key known only to one of the parties using one or more of the methods described herein.

Figure 2A:
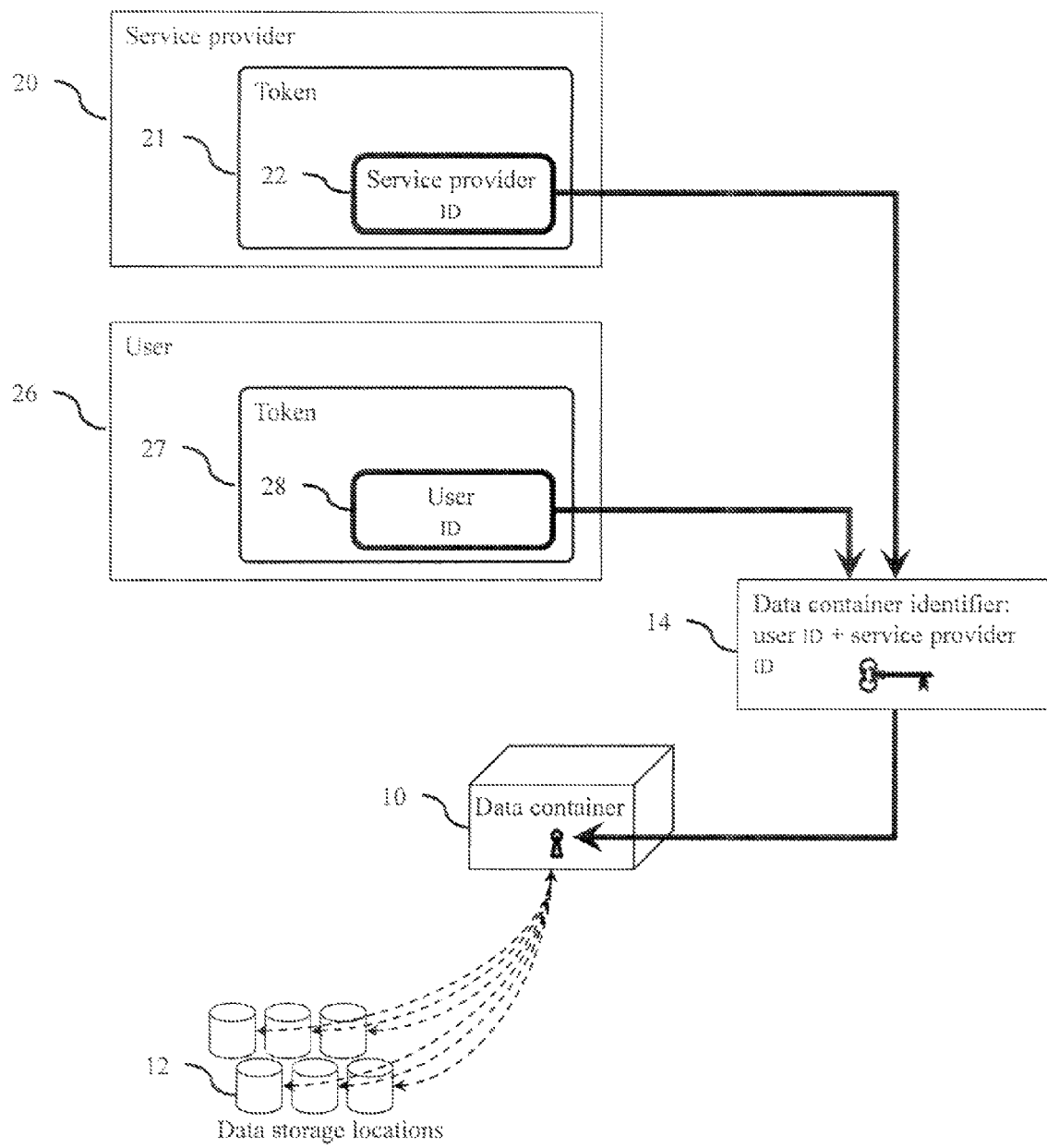
FIG. 2A depicts an overview of a data flow for generating an access code for accessing data stored in a data container.

FIG. 2A depicts an overview of a data flow for generating an access code (also referred to herein as a data container identifier) for accessing data stored in a data container 10. The data container 10 stores a data that a particular service provider is allowed to access, use and/or modify with the permission of the user. The data container 10 can be analogized to a virtual safe deposit box, where two keys are needed to open the virtual safe deposit box, with one key 22 belonging to the service provider and the other key 28 belonging to the user. To open the virtual safe deposit box (e.g., to access the data in the data container 10), both the user 26 and the service provider 20 must provide their keys 28 and 22 which, when combined, generate a unique data container identifier 14 that enables access to the data stored in the data container 10. As such, because keys are needed from both the service provider 20 and the user 26 to determine the location of the data, access to the data stored in the data container 10 is restricted to the authorized user/service provider pair. Requiring keys from both the service provider 20 and the user 26 additionally can provide the advantage of providing a system in which the storage provider 20 has no access to data except when the authenticated user 26 is present.

More particularly, the user 26 and the service provider 20 each have unique tokens 27 and 21 respectively. The tokens provide information used to authenticate the user 26 and the service provider 20 and to access the data in the data container 10. The tokens can, for example, take the form of a portable device such as a dongle or a keycard or be incorporated in another device such as a mobile phone. Token 27 includes, among other information, identity information in the form of a user ID 28. Similarly, the service provider token 21 includes, among other information, identity information in the form of a service provider ID 22. Prior to allowing access to the information in the data container 10, both the user 26 and the service provider 20 are authenticated by an authentication system (not shown) based on information provided via their respective tokens 27, 21. The authentication system authenticates not only the user 26 but also the service provider 20 before allowing access to the secured data in the data container 10. While the user ID 28 and the service provider ID 22 become known to the authentication system during the authentication process, they are retained in the authentication system for a limited length of time. After authentication of the service provider and the user, the user ID 28 and the service provider ID 22 are combined to generate the unique data container identifier 14 that identifies the location of the data container 10.

Figure 2B:
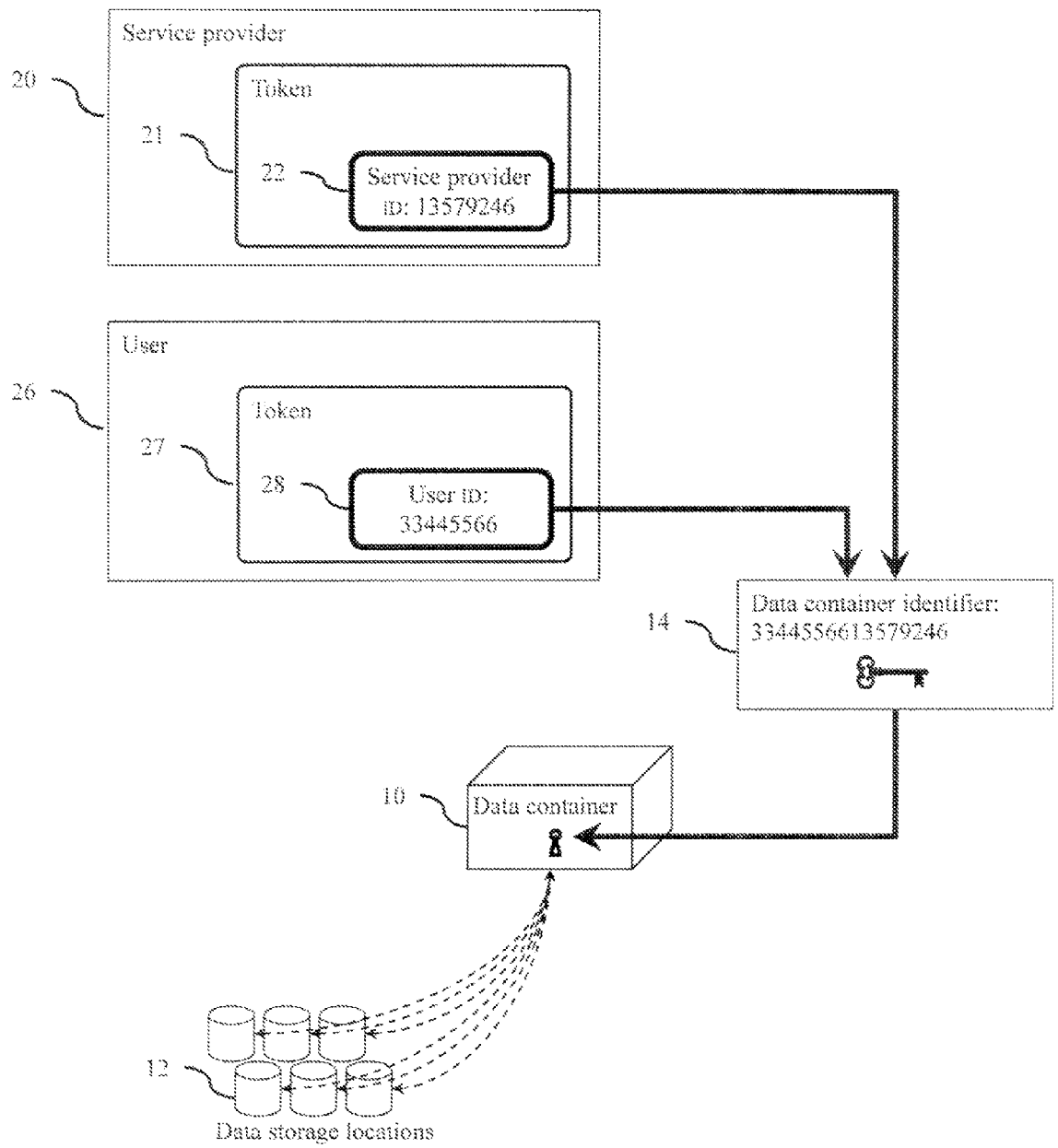
FIG. 2B shows an example of a data flow for generating an access code for accessing data stored in a data container.

In one particular simplified example of a combination method to generate a data container identifier shown in FIG. 2B, a concatenation of the user ID 28 and the service provider ID 22 forms the unique data container identifier 14. For example, the user ID 28 and the service provider ID 22 can each be a sting of alphanumeric characters (e.g., a string of 64 digits). In the example to follow the user ID 28 and the service provider ID 22 are described as a string of eight numeric digits for simplicity. If one were to assume the user ID 28 was the eight digit string of "33445566" and the service provider ID 22 was the eight digit string of "13579246", the unique data container identifier 14 can be generated based on a concatenation of the user ID 28 and the service provider ID 22 (e.g., user ID & service provider ID) resulting in a unique data container identifier 14 of "3344556613579246".

While the example in FIG. 2B above is based on a simple concatenation of the user ID and the service provider ID, other functions that combine the service provider ID with the user ID to form a unique data container identifier can be used. In general, any function of $$f(x,y)=k$$

can be used to combine x and y (e.g., the user ID and the service provider ID, respectively) to create k, the data container identifier 14, as long as the function $f(x,y)$ generates a unique result for each combination of x and y. One example of such a function is a one way permutation, a function $f_{OWP}(x,y)$ in which k can be easily calculated but by which cannot be easily reversed, e.g., knowing k, one cannot easily determine x or y. One benefit of using a one way permutation to generate the data container identifier 14 is that, were one to receive the data container identifier 14, the two IDs used to generate the data container identifier (e.g., user ID and the service provider ID) could not be easily determined. An exemplary one way permutation is described below. However, other irreversible one way functions can be used to form the data container identifier 14. The use of an irreversible one way function provides additional security in comparison to use of a reversible function such as the one described in FIG. 2B.

In some additional examples the unique data container identifier 14 not only can be based on a combination user ID 28 and the service provider ID 22 (e.g., as described above), but also may include additional data/variables as input to the function (e.g., $f(x,y,z)=k$) or as additional iterations of the function (e.g., $f(z,f(x,y))=k$) or as combinations of different functions (e.g., $f(z, g(x,y))=k$).

In addition to restricting access to the information stored in the data container 10 based on the unique data container identifier 14 formed based on the user ID 28 and service provider ID 22, the data stored in the data container 10 can be further protected by encryption and dispersal of the data. In general, before being stored in the data container, data is encrypted, fragmented, and dispersed to multiple data storage locations. When needed, the data from the multiple data storage locations is retrieved, re-assembled and delivered to an authorized recipient for decryption.

Figure 3A:
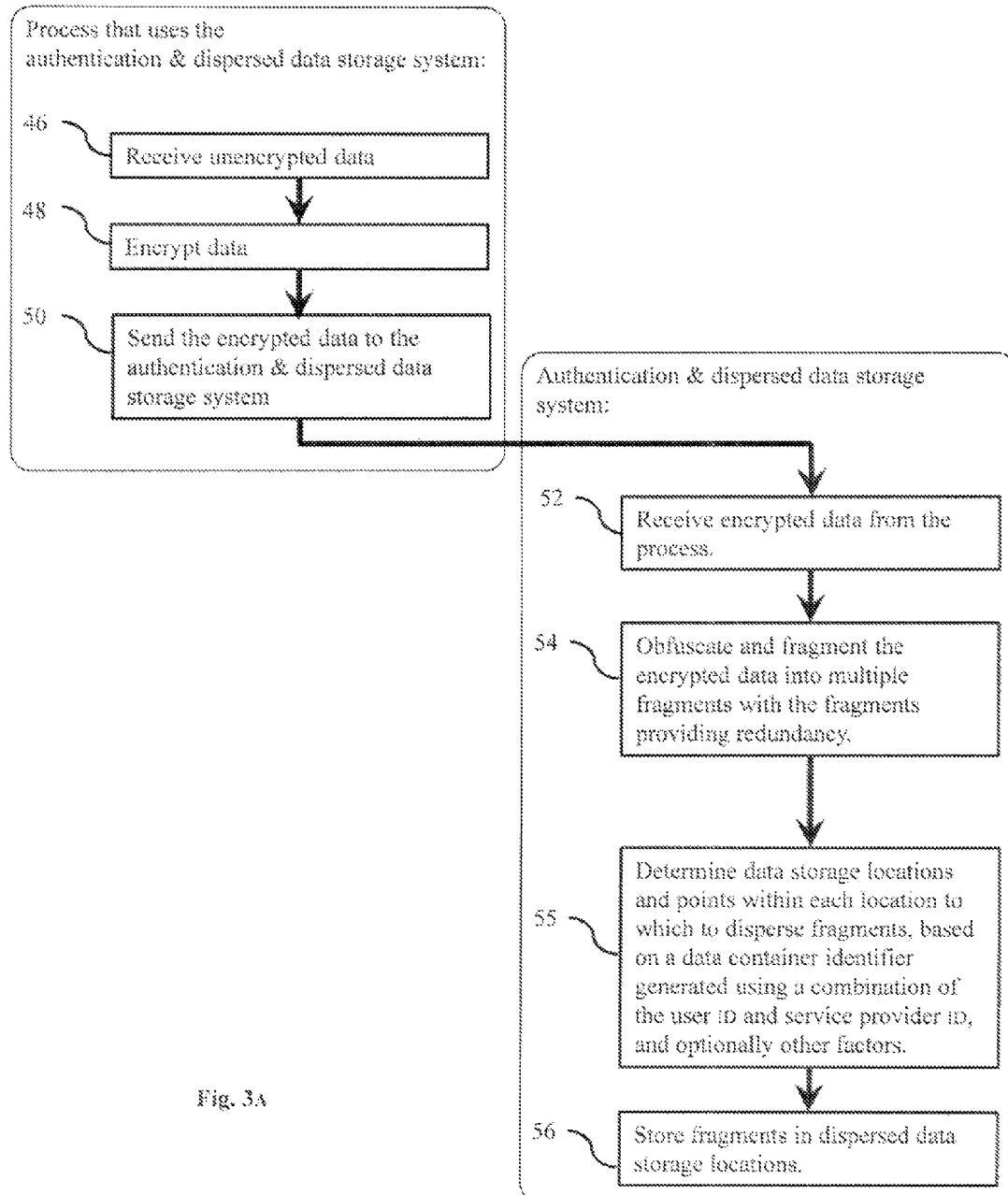
FIG. 3A shows an exemplary fragmentation and dispersion process.
Figure 3B:
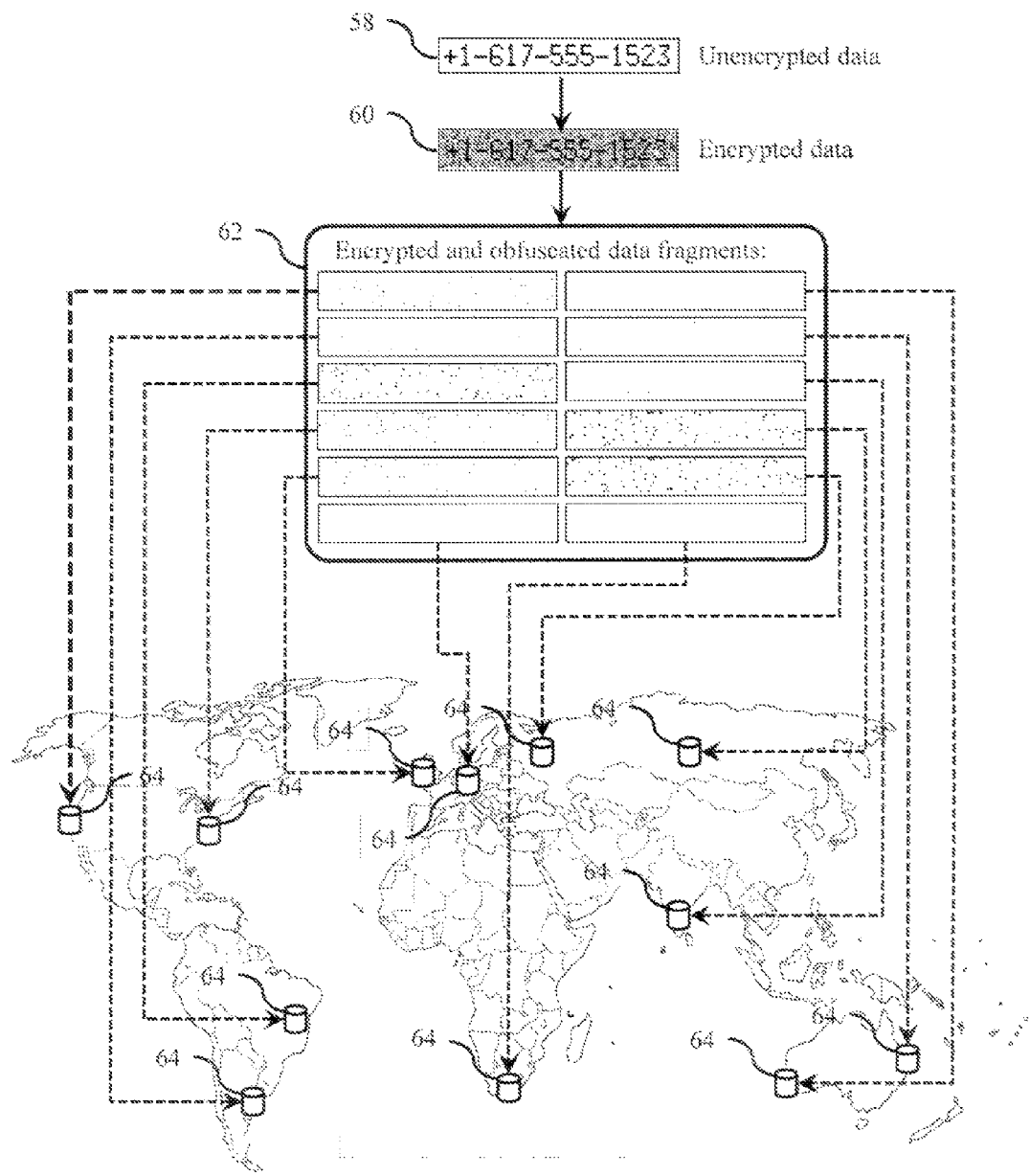
FIG. 3B shows a graphically depicted example of the fragmentation and dispersion process of FIG. 3A.

An exemplary fragmentation and dispersion process is shown in FIG. 3A and graphically depicted in FIG. 3B. In general, the fragmentation and dispersion processes described herein can provide systems and methods for safe data storage in many places while simultaneously protecting the privacy of the data and its owner(s). These systems and methods allow the data to be safely stored while protecting privacy by one or more of the following: precluding any single or small subset of places from holding a recognizable or derivable copy of the data; precluding the loss of data by the destruction, theft or replication of data storage locations in one or a small subset of places (e.g., all data storage locations within one country); precluding the determination of the party (e.g., a natural person, a program running on a computer system, or other automaton) that created, modified, or caused the creation or modification of the data.

In FIG. 3A a process receives 46 unencrypted data (e.g., unencrypted data 58, FIG. 3B). The unencrypted data is encrypted 48 to generate encrypted data (e.g., data 60, FIG. 3B). The encryption can employ various encryption processes. For example the token 27 can include cryptographic information and the data encryption can occur on the token 27. This method allows the data to be encrypted without the cryptographic information being communicated outside of the token, thus increasing the security of the cryptographic information.

In some examples, however, communication of the unencrypted data to the token from the user computer and communication of the encrypted data from the token to the user computer (and ultimately to the A&DDS system) may be time consuming due to limited processing power of the token and or the data transfer rate between the token and the user computer. In some alternative examples, rather than encrypting the data on the token, the token generates a unique file encryption key which the secure data storage application uses to encrypt the file. The file encryption key is encrypted with the user encryption key in the token and stored (in the encrypted form) with the file. Other encryption processes could additionally/alternatively be used to encrypt the data. Allowing data to be transmitted to/from the data storage locations 12 in encrypted form (e.g., the data is encrypted prior to uploading the data to the data storage locations and is decrypted only after the data has been retrieved from the data storage locations) provides an additional level of data security.

Once the data is encrypted, the data is sent 50 to the A&DDS system. The A&DDS system receives 52 the encrypted data and then obfuscates and fragments 54 the encrypted data into multiple fragments (e.g., encrypted and obfuscated data fragments 62, FIG. 3B). The A&DDS system determines 55 data storage locations and points therein to which to disperse fragmented data based on a data container identifier generated using a combination of a user ID and service provider ID and, optionally, other factors. The A&DDS system stores 56 the fragments in the determined dispersed data storage locations (e.g., data storage locations 64, FIG. 3B, akin to data storage locations 12 of FIG. 2A).

In some additional examples, the A&DDS system may receive data that is either encrypted or unencrypted. The received data is (further) encrypted by using an encryption key formed from a combination (e.g, using a one-way hash function) of the User ID, the Service Provider ID, and optionally other factors. This encryption key is never stored, but re-created when needed to store or retrieve data and only after the authentication of the user and of the service provider. Since the A&DDS system cannot create this encryption key without the presence of the authenticated user and of the authenticated service provider, during the absence of either party the stored data cannot be decrypted.

Data storage locations are separated according to specific design criteria. For example, the data storage locations can be located in different geographic zones such as on multiple continents, in multiple countries or states, or separated by a geographic distance that is great enough to eliminate the concern that a single natural disaster or physical attack could eliminate access to multiple locations (or even every location in a particular zone) such that the data could not be reassembled from the remaining available locations (e.g., a distance greater than 10 miles, greater than 50 miles, or greater than 100 miles). In another example, the data storage locations can be located in different legal jurisdictions such that the data could not be reassembled from the locations available within a subset of one or more legal jurisdictions, and such that the data could always be reassembled from other locations outside of any arbitrary subset of one or more legal jurisdictions. In another example, the data storage locations can be confined to locations within a set of one or more legal jurisdictions such that the data can always be reassembled from the locations available within one (or a small subset) of those legal jurisdictions regardless of events occurring within other legal jurisdictions. In another example, the data storage locations can be confined to a set of locations controlled by a set of one or more organizations (e.g., corporation or a government department) such that the data can always be reassembled from the locations available within a particular one (or a small subset of those) organization(s) and simultaneously can never be reassembled using only locations available outside that particular one (or small subset of) organization(s). Such design criteria as illustrated by these examples can be used singularly or in logical combinations, depending on business, technical, regulator or other needs for the specific instance of implementation of these systems and methods.

The data is dispersed using an information dispersal algorithm (e.g., using one or more of the information dispersal algorithms described herein), making it impossible to reconstruct the encrypted data, in whole or in part, without accessing and receiving data from at least a predefined minimum number of different locations. As a result theft of the contents of any combination of locations less than this minimum will not permit assembly of even the encrypted data. Additionally, even if a thief were to hold the encrypted data, the thief cannot derive either the service provider ID or the user ID of the service provider and user who stored the data. Additionally, even if the thief of the data somehow were to obtain the encrypted data, the user ID, and the service provider ID, the thief could not view the data because (as described in more detail herein) the thief could not decrypt the data as none of the systems hold any of the encryption/decryption keys or the identification of the encryption algorithm needed for decryption.

In addition to storing the data in a dispersed manner requiring a minimum number of locations to reconstruct the decrypted data, the data is dispersed in a manner that provides redundancy in the data, enabling reconstruction of the data from a subset of less than all of the locations. Storing the data in such a dispersed manner can eliminate single points of vulnerability to physical, electronic or internal attack because if a particular location is not available for data retrieval, the redundancy in the data enables the data to be reconstructed without requiring access to the unavailable location. Thus, the data is stored redundantly in many places while simultaneously not existing in any one particular place or region. The data belongs to and can only be obtained and decrypted by a specific user and service provider. However the system storing the data does not know which user or service provider stored the data nor can it decrypt the data even if the user and service provider were known.

For example, in a simplified example with only three dispersed data storage locations any one of the data storage locations can be inoperable and the data can still be restored based on the remaining available locations. Assuming the user begins with unencrypted data that he/she desires to store in a secure manner, the user encrypts the data to form encrypted data, represented in this example as "12345678". The encrypted data is sent to the A&DDS system and the A&DDS system fragments the data into multiple different fragments. For example, the encrypted data can be divided into two fragments where fragment #1 is "1234" and fragment #2 is "5678". (Note: for clarity obfuscation is not included in this simple example.) To generate an additional data fragment, the A&DDS system calculates some derivative of the two fragments such as the modulus$_{10}$ sum of fragment #1 and #2 resulting in a fragment #3 of "6912". The three fragments are then stored in dispersed data storage locations. For example fragment #1 could be stored in the United States, fragment #2 could be stored in Germany, and fragment #3 could be stored in Australia. In this example the encrypted data can be restored using the fragments from any two of the data storage locations. For example if the location located in the United States were inoperable, the encrypted data can be restored based on the data fragments stored in Germany and Australia as further described below.

In the simple example above some of the fragments included portions of the encrypted data. In a more secure example the fragmentation method simultaneously obfuscates the fragments with a mathematical function g( ) chosen such that no fragment includes a direct representation of any portion of the encrypted data. For example the encrypted data "12345678" can be obfuscated and fragmented by the function g(12345678) into multiple fragments of "802752", "913466", "482346", etc. In such an obfuscation and fragmentation method the disclosure of any fragment does not disclose a portion of the encrypted data. Methods of obfuscation and fragmentation are described in more detail herein.

Figure 4A:
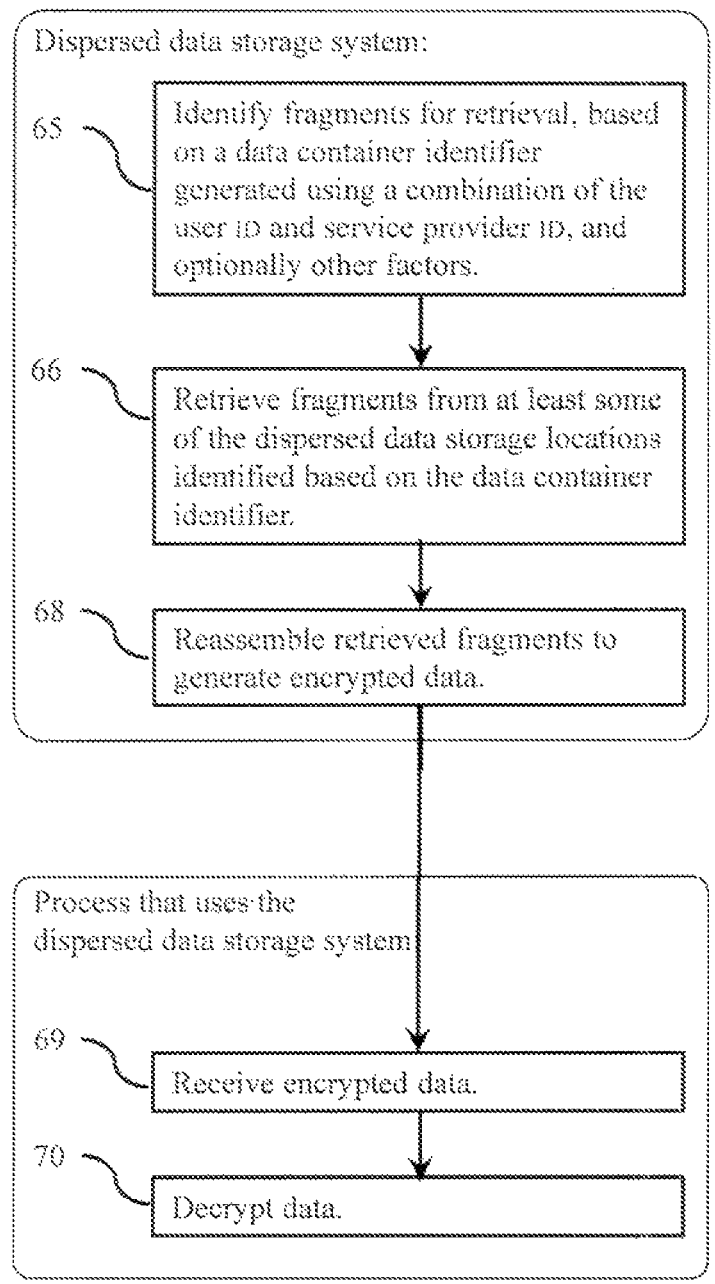
FIG. 4A shows an exemplary data assembly and decryption process.
Figure 4B:
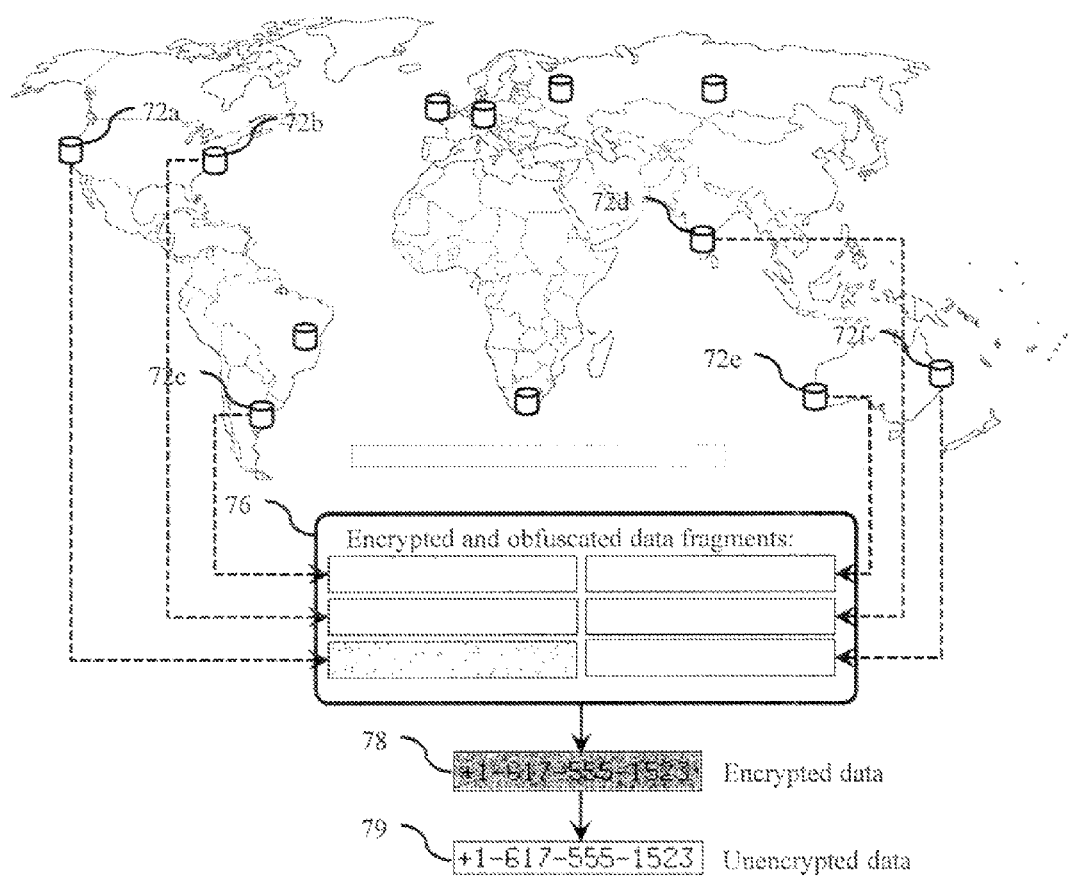
FIG. 4B shows a graphically depicted example of the data assembly and decryption process of FIG. 4A.

An exemplary data assembly and decryption process is shown in FIG. 4A and a graphically depicted example is shown in FIG. 4B. In general, when needed, the data from a subset of the multiple data storage locations is retrieved, re-assembled and delivered to an authorized recipient for decryption. As noted herein, however, the data cannot be located nor can it be retrieved without the presence of both permitted, authenticated parties because the data container identifier used to retrieve the data container from points within multiple dispersed data storage locations is based on processing of a combination of the parties' user ID and the service provider ID. Due to the redundancy in the stored data during the dispersion process, the data from a subset of the data storage locations is sufficient to reassemble the encrypted data. Thus, if one or more of the data storage locations is non-functional or inaccessible, the data can nevertheless be reassembled using other data storage locations.

More particularly the A&DDS system identifies 65 fragments for retrieval based on a data container identifier that is based on a combination of a user ID and service provider ID and, optionally, other factors. The A&DDS system retrieves 66 the fragments from at least some of the dispersed data storage locations identified based on the data container identifier and reassembles 68 the data fragments to generate the encrypted data. The encrypted data are sent from the A&DDS system and received 69 by the authorized recipient process. The recipient process decrypts 70 the encrypted data.

Using FIG. 4B, an example is described where redundancy enables reconstruction based on only some of the dispersed data storage locations. In this example data from six of the ten data storage locations (e.g., locations identified with reference numerals 72a, 72b, 72c, 72d, 72e, and 72O is retrieved. The A&DDS system reassembles 68 the retrieved data fragments 76 to regenerate the encrypted data 78. The encrypted data 78 is decrypted 70 to generate unencrypted data 79.

For example, continuing the simplified example above with only three dispersed data storage locations storing fragments #1, #2 and #3, the A&DDS system identifies the locations of the fragments within the dispersed data storage locations and assembles data from a subset of the data storage locations to reproduce the encrypted data. In this example, data from any two of the three data storage locations is sufficient to reassemble the encrypted data. For example, if fragment #1 of "1234" and fragment #2 of "5678" are retrieved then the A&DDS system merges the data to reconstruct the original encrypted data of "12345678". If fragments #1 and #3 are retrieved, then fragment #2 can be determined by subtracting modulus$_{10}$ fragment #1 ("1234") from fragment #3 ("6912") to reproduce fragment #2. Similarly, fragments #2 and #3 are retrieved, then fragment #1 can be determined by subtracting modulus$_{10}$ fragment #2 ("5678") from fragment #3 ("6912")

to reproduce fragment #1. Thus, in this example the encrypted data can be restored using the fragments from any two of the data storage locations.

Figure 5A:
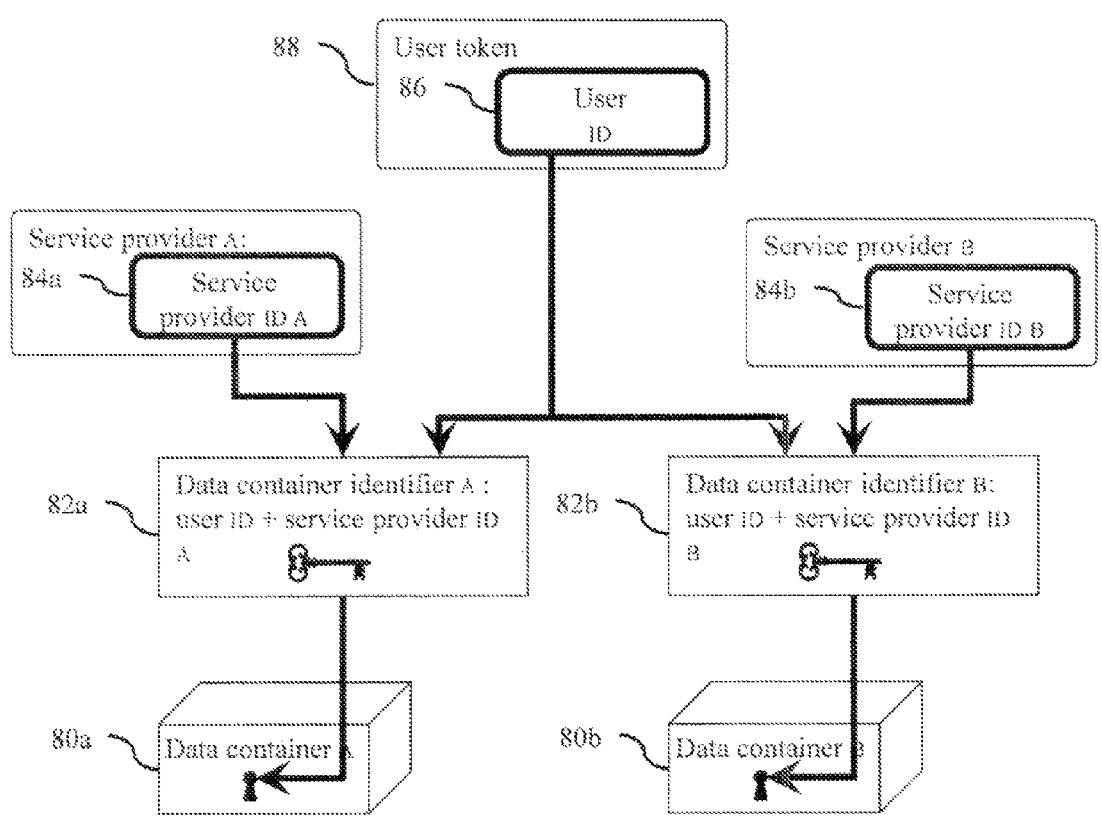
FIG. 5A shows a system for providing secure access to data stored in a user's multiple, different data containers.

In some aspects, a user can desire to have a single device that is capable of providing an authentication method for multiple, different applications. This can provide the advantage of convenience for the user and encourage the user to take appropriate actions to protect the device/information used in the authentication process. For example, a user can have multiple, different data containers with access to each of the data containers being restricted to a particular service provider. FIG. 5A shows a system for providing secure access to data stored in multiple, different data containers 80a and 80b. While only two data containers are shown, a user can have any number of data containers with each data container being associated with a different service provider. Each data container 80a and 80b stores data that a particular service provider is allowed to access, use and/or modify with the permission of the user. As described herein, access to a data container is restricted to a user/service provider pair based on a data container identifier (e.g., data container identifiers 82a and 82b) that is generated from a user ID 86 and the service provider ID (e.g., service provider IDs 84a or 84b). The user ID 86 for generating the data container identifier for each of the data containers 80a and 80b is the same. Thus, the user is provided with access to multiple, different data containers using a single token 88 that provides the user ID 86. However, while the user ID 86 used to generate the data container identifiers 82a and 82b for accessing different data containers 80a and 80b is the same, the service provider ID used to generate the data container identifiers 82a and 82b will differ based on the service provider associated with the data container. For example, data container 80a is associated with service provider A and the corresponding data container identifier 82a is based on a combination of the service provider ID 84a for service provider A and the user ID 86, while data container 80b is associated with service provider B and the corresponding data container identifier 82b is based on a combination of the service provider ID 84b for service provider B and the user ID 86.

Figure 5B:
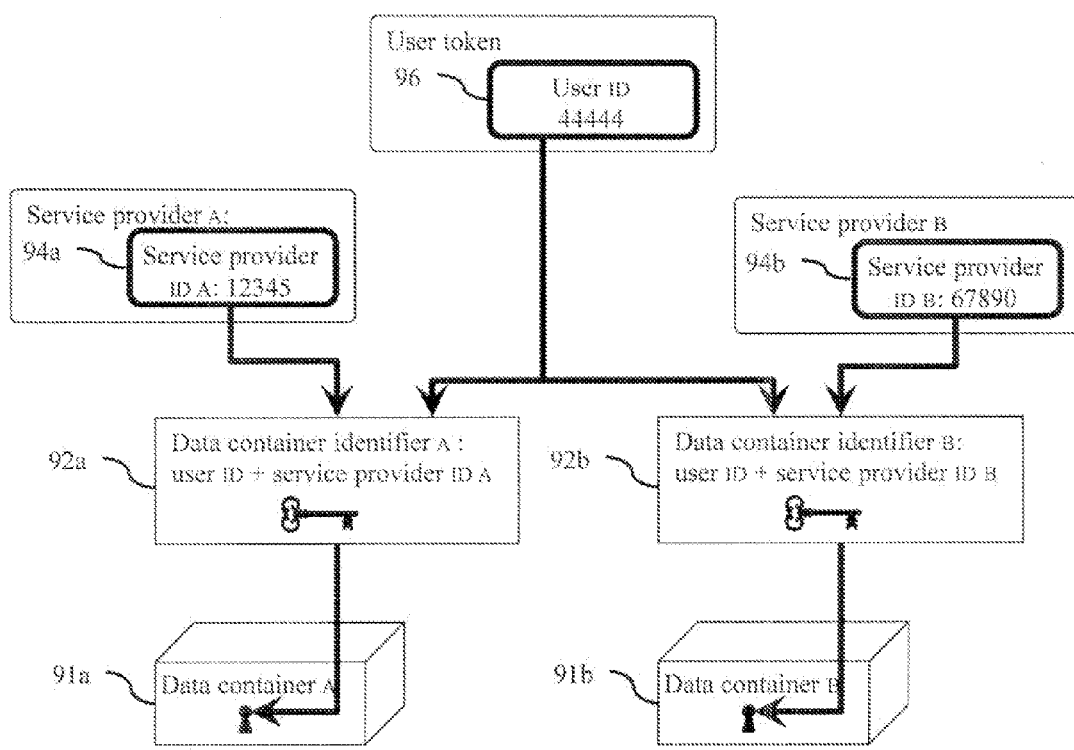
FIG. 5B shows a particular example of providing secure access to data stored in a user's multiple, different data containers.

In one simplified example shown in FIG. 5B, a user has multiple, different data containers 91a and 91b with access to each of the data containers being restricted to a particular service provider (e.g., access to data container 91a is limited to the user and service provider A and access to data container 91b is limited to the user and service provider B). In the example to follow the user ID 96, the service provider ID 94a, and the service provider ID 94b are described as a string of 5 numeric digits for simplicity. For example, if one were to assume the user ID 96 was the 5 digit string of "44444", the service provider ID 94a was the 5 digit string of "12345", and the service provider ID 94b was the 5 digit string of "67890", then the unique data container identifiers 92a and 92b for data containers 91a and 91b respectively can be generated based on a concatenation of the user ID 96 and the respective service provider ID (i.e., service provider ID 94a for data container 91a and service provider ID 94b for data container 91b). As such, the data container identifier for data container 91a is "4444412345" while the data container identifier for data container 91b is "4444467890".

While the example in FIG. 5B above is based on a simple concatenation of the user ID and the service provider ID, other functions that combine the service provider ID with the user ID to form a unique data container identifier can be used such as the one-way permutation functions mentioned above and discussed in further detail below. The data container identifiers generated by those functions are unique to each user-service provider pair. Furthermore, were one to receive any data container identifier so generated, neither the user ID nor the service provider ID) could be easily determined.

This description of the exemplary embodiments is intended to be read in connection with the accompanying drawings, which are to be considered part of the entire written description. Terms concerning attachments, coupling and the like, such as "connected" and "interconnected", refer to a relationship wherein components communicate to one another either directly or indirectly through intervening structures, unless expressly described otherwise.

A centralized authentication system with safe private data storage and method of providing centralized authentications with safe private data storage are described herein in connection with the figures. In the following description, it is to be understood that system elements having equivalent or similar functionality are designated with the same reference numerals in the figures. It is to be further understood that aspects of the present invention may be implemented in various forms of hardware, software, firmware, or a combination thereof. In particular, various system modules described herein are preferably implemented in software as an application program that is executable by, e.g., a general purpose computer or any machine or device having any suitable and preferred microprocessor architecture. The various functionalities described herein is preferably implemented on a computer platform including hardware such as one or more central processing units, a random access memory, and input/output interface(s). The computer platform also includes an operating system and microinstruction code. The various processes and functions described herein may be either part of the microinstruction code or application programs which are executed via the operating system. In addition, the computer platform may include various other functional software elements (e.g., network drivers, communication protocols, etc.) as well as other peripheral devices connected to the computer platform such as an additional data storage device.

Various aspects of the present invention can be embodied in the form of methods and apparatus for practicing those methods. Code to implement the present invention may be embodied in the form of program code operably disposed in tangible media, such as in system memory or stored on data storage media such as a fixed disk, floppy disk, CD-ROM, hard drives, or any other machine-readable data storage medium wherein, when the program code is loaded into and executed by a machine, such as a computer, the machine becomes an apparatus for practicing the invention. The code for implementing various aspects of the present invention may be transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. For the purpose of this disclosure, the term "processor" may be used to refer to a physical computer or a virtual machine.

It is to be further understood that, because some of the constituent system components described herein are preferably implemented as software modules, the actual system connections shown in the figures may differ depending upon the manner in which the systems are programmed. It is to be appreciated that special purpose microprocessors may be employed to implement various aspects of the present invention. Given the teachings herein, one of ordinary skill in the related art will be able to contemplate these and similar implementations or configurations of the present invention.

For example, while in some embodiments described above the storage is dispersed among multiple locations, in some aspects the authentication and storage can be used in a system that does not include dispersed storage (e.g., the data is stored in a single location).

Figure 6:
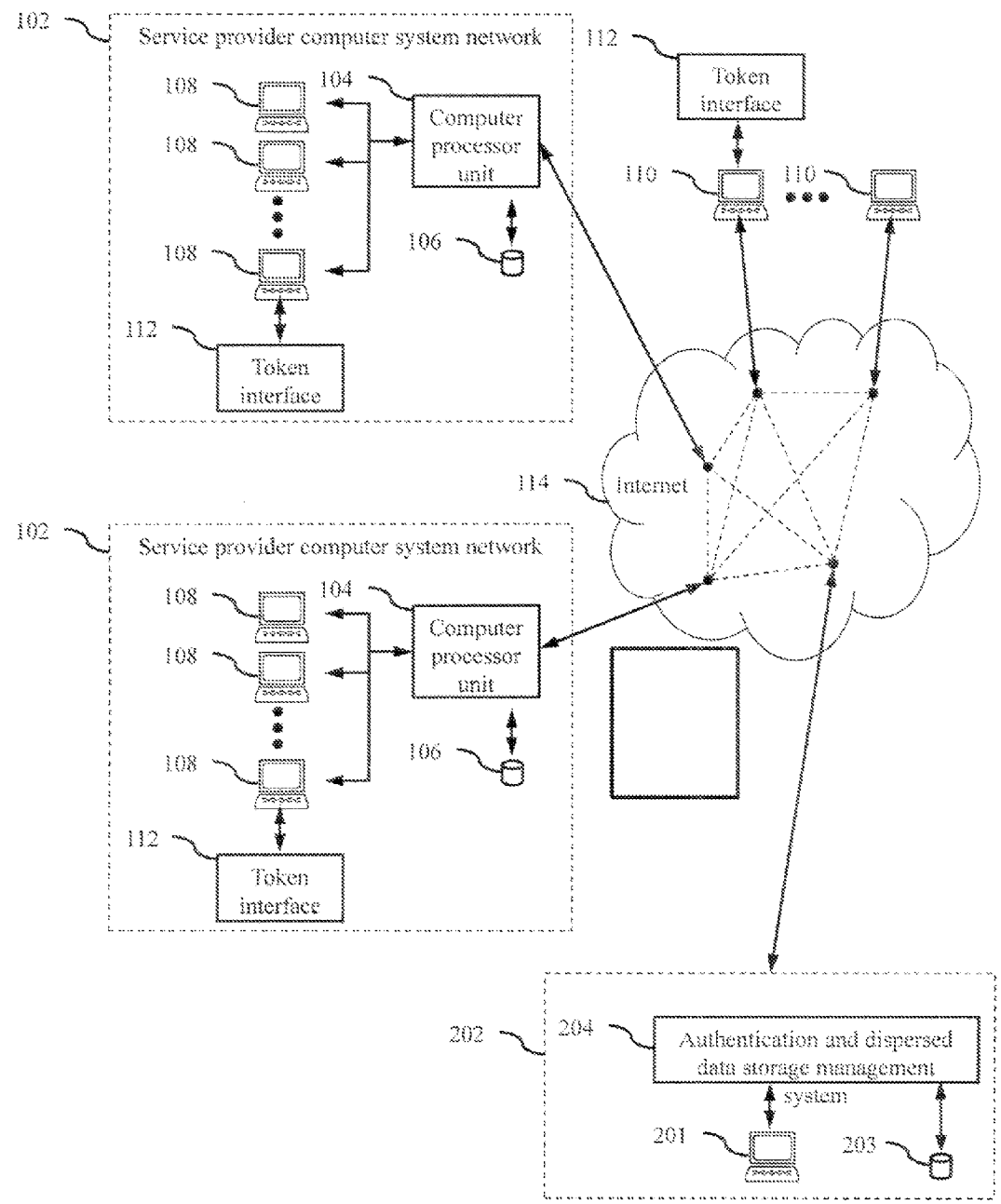
FIG. 6 is a stylized overview of a system of interconnected computer networks, one of which includes an authentication and dispersed data storage (A&DDS) system.

Before describing in detail the various aspects of the present invention, a general introduction to an environment in which the invention may be deployed is presented in connection with FIG. 6.

With reference to FIG. 6, the Internet 114 is a worldwide system of computer networks—a network of networks in which a user at one computer or other device connected to the network can obtain information from any other computer and communicate with users of other computers or devices. The most widely-used part of the Internet is the World Wide Web (often-abbreviated "www" or called "the web"). One of the most outstanding features of the web is its use of hypertext, which is a method of cross-referencing. In most web sites, certain words or phrases appear in text of a different color than the surrounding text. This text is often also underlined. Sometimes, there are hot spots, such as buttons, images, or portions of images that are clickable. Clicking on hypertext or a hot spot causes the downloading of another webpage via a protocol such as hypertext transport protocol (HTTP). Using the web provides access to millions of webpages of information. Web surfing is done with a web browser, such as Apple Safari® and Microsoft Internet Explorer® browsers. The appearance of a particular website may vary slightly depending on the particular browser used. Versions of browsers have plug-ins which provide animation, virtual reality, sound, and music. Interpreted programs (e.g., applets) may be run within the browser.

FIG. 6 shows a plurality of interconnected computer system networks 102 and remote user terminals 110. More specifically, the networks 102 may be computer system networks run by service providers. A typical networked computing environment can be broadly described as comprising users and service providers. A service provider delivers some form of information, informational access, or access to resources to a user electronically via computer systems and networks, such as those shown in FIG. 6. A user may be regarded as a consumer of the provided service. In general, many different types of service providers may be present in a given networked environment, such as the environment shown in FIG. 6. Online merchants represent a class of e-commerce service providers, while web portals represent a class of information service providers. Internet service providers are entities that provide a network communication link to the Internet as a service. Many of these service providers provide access to their particular service or resource only after a user has been properly authenticated. The service provider then makes use of the aspects of the user's identity it has been authorized to access. Non-limiting examples of service providers include public or corporate web services such as e-commerce sites (e.g., amazon.com), public mail servers (e.g., mail.google.com), wikis, social network services (e.g., facebook.com), traditional brick-and-mortar merchant systems (e.g., sales systems at Macy's or Home Depot), and traditional and on-line banking services, to name a few.

Each service provider computer system network 102 may include a corresponding local computer processor unit 104, which is coupled to a corresponding local data storage unit 106 and to local user terminals 108. A service provider computer system network 102 may be a local area network or part of a wide area network, for example.

The illustrated environment also includes a third-party (i.e., not a user and not a service provider as discussed above) A&DDS system 202, which includes a processing system identified as the A&DDS management system 204. In certain embodiments, the A&DDS management system 204 provides a vehicle for providing mutual authentication during a transaction. That is, the authentication operations of the system can be used to authenticate not only the user but also the service provider before any data from its secured data storage is released. Moreover, as part of this authentication process, the A&DDS management system 204 itself can be authenticated to the user and the service provider as provided in more detail in the remainder of this description. The A&DDS management system 204 includes local user terminal(s) 201 (used to perform administrative actions, for example) and local data storage 203. The A&DDS system 202 is shown coupled to remote user terminals 110 and service provider computer system networks 102 through the Internet 114, but it should be understood that communications between these devices and networks can also be by way of a private network or dedicated connection.

Each of the plurality of user terminals 108, 110 may have various devices connected to their local computer systems, such as scanners, barcode readers, printers, fingerprint scanners, mouse devices, keyboards, and other interface devices such as the token interface 112 described in more detail below.

The computer processor unit 104 of the service provider computer system network 102 can take the form of a server and front-end graphical user interfaces (GUIs) for providing its associated services/resources to user terminals 108, 110. The computer processor unit 104 can also provide back-end GUIs, for example, used by system administrators. User terminals 108, 110 are said to be clients of the computer processor unit 104. A client is any computer or device that is capable of connecting to a server computer or device (referred to as the host) through a network, wired or wireless. A client may also refer to computer software or firmware that communicates with (e.g., calls and connects) to a server. The aforementioned GUIs can take the form of, for example, a webpage that is displayed using a browser program local to the user terminal 108, 110. Front- and back-end GUIs may be portal webpages that include content retrieved from the one or more data storage devices 106. As used herein, portal is not limited to general-purpose Internet portals, such as Yahoo! or Google but also includes GUIs that are of interest to specific, limited audiences and that provide the user access to a plurality of different kinds of related or unrelated information, links and tools as described below.

A user may gain access to the services/resources provided by a service provider's computer processor unit 104 of the computer system network 102 by using a user terminal 108, 110, programmed with a web browser or other software, to locate and select (such as by clicking with a mouse) a particular webpage accessible via local area network. The content of the webpage is located on the one or more data storage devices 106. The user terminals 108, 110 may be microprocessor-based computer terminals that can communicate through the Internet using the Internet Protocol (IP), kiosks with Internet access, connected personal digital assistants (e.g., a Palm® device manufactured by Palm, Inc., iPaq® device available from Compaq, iPhone® from Apple, Inc. or Blackberry® device from RIM), or other devices capable of interactive network communications. User terminals 108, 110 may be wireless devices, such as a hand-held unit (e.g., a cellular telephone or a portable music player such as an iPod® device) that connect to, and communicate through, the Internet using a wireless access protocol or other protocols. Other types of devices may also be substituted in the system for user terminals 108, 110. One non-limiting example may be a door lock having an embedded processor without a visual browser that generates GUIs for a user display, such a processor instead making hidden requests to a predefined web server and in accordance with a reply from the web server performing some operations, e.g., triggering a switch or relay, responding with a reply, etc. In order to access a secure area, the user presents a token to an appropriately configured reader. The service provider in this example can be viewed as the corporate information technology or security system.

The system and method described herein may be implemented by utilizing all or part of the environment described above in connection with FIG. 6. It should be apparent to one of ordinary skill in the art that the system may be incorporated in a local area network, in a wide area network, or through an Internet 114-based approach, such as through a hosted or non-hosted application service, or through a combination thereof.

Figure 7:
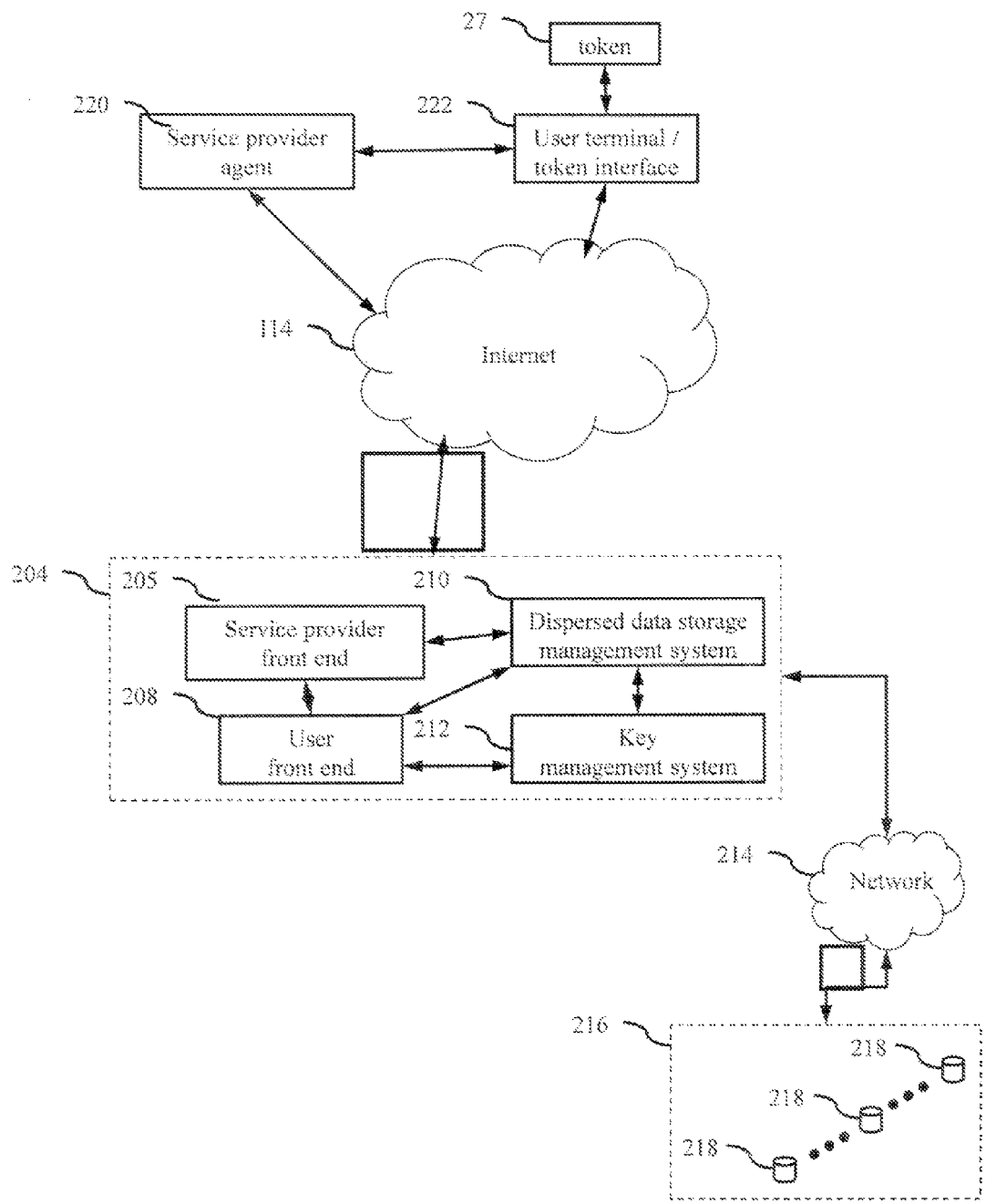
FIG. 7 illustrates the A&DDS system of FIG. 6 in more detail along with its connections for interfacing with a service provider agent, user terminal and dispersed data storage system.

FIG. 7 illustrates a particular embodiment of a centralized authentication system with safe private data that may be implemented using the computing environment illustrated in FIG. 6. The A&DDS management system 204 includes a service provider front end 205 for interfacing with the service provider agent 220, a user front end 208 for interfacing with the combined user terminal/token interface 222, a dispersed data storage management system 210, and a key management system 212. A token 27 communicates with the user terminal/token interface 222, which is in communication with the service provider agent 220 either locally or remotely through the Internet 114. The service provider agent 220 and the user terminal/token interface 222 communicate with the A&DDS management system 204 through a network such as the Internet 114.

Although FIG. 7 illustrates a single service provider front end 205 and a single user front end 208, it should be understood that this is for illustrative purposes only. That is, in embodiments the system can include multiple instances of both the service provider front end 205 and the user front end 208 each with its own respective address. These front ends can be located at a single location or at multiple locations. This provides two advantages. First, for a dispersed system, users and service providers can be connected to the nearest or most convenient front ends. Second, in the case a location fails, it is still possible for service provider and user to access other front ends.

As described above, a service provider delivers some form of information, informational access, or access to other resources or services (collectively or individually, "resource") to a user electronically via computer systems and networks, such as those shown in FIG. 6. A user may be regarded as a consumer of the provided service. The service provider can be thought of as an entity that provides some Internet (or other networked) service either directly to the user (e.g., e-commerce) or indirectly (e.g., through a third party). In a second sense, the service provider can be thought of as combination of computer programs, computers, network links that implement the functionality of this Internet (or other networked) service. Therefore, in order to resolve this uncertainty, this later aspect of the service provider is referred to herein as the service provider agent 220. The computer programs used by service providers to implement the service provider agent 220 include web servers and data base management systems, to name a few.

The A&DDS management system 204 is in communication with the dispersed data storage system 216 through a network 214, which may be a public network such as the Internet 114 or a private network. The dispersed data storage system 216 includes multiple dispersed and networked data storage locations 218.

The system shown in FIG. 7 is designed to facilitate user authentication with service providers for secure interactions between users and service providers, as well as provide secure data storage of data on behalf of the service providers or users.

The user's stored data can include personal and financial data associated with a specific natural person, such as a name, a user address (e.g., a postal address), a phone number, an e-mail address, a credit card number, credit card expiration date, a bank account number, a bank routing number, a social security number, a driver's license number, an identification number, a place of birth, a date of birth, a mother's maiden name, and any other personal identification information relevant to the user-service provider relationship. Data can also include preference data, such as at least one shopping profile, at least one music profile, at least one banking profile, and other data that indicates the user's preferences for transactions, vendors, products, or services of various kinds as well as historical data representing the person's status in a loyalty program or other indicia of the person's previous transaction history with a given service provider.

In various embodiments, discussed below, a user identification code (user ID) and service provider identification code (service provider ID) are used in retrieval of data from the dispersed data storage system 216. Preferably, these codes are not known to the A&DDS management system 204 on a permanent basis. Instead, they become known (if at all) only during an authentication phase while the user and service provider are being authenticated.

In embodiments, all data are dispersed in accordance with a selected information dispersal algorithm over multiple dispersed and networked data storage locations 218 in such a way that it is not possible to reconstruct the whole record or part of it from less than some predefined minimum number of data storage locations 218. Information dispersal algorithms are discussed in more detail below.

As one means to authenticate a particular user, the system makes use of portable devices such as hardware identification tokens 27 which hold the aforementioned user ID and one or more data encryption keys. In exemplary embodiments any cryptographic calculations are performed and protocols reside in the token 27 itself rather than in the user terminal/token interface 222. The user terminal/token interface 222 only helps to pass messages to/from the token 27 and other components in the system. This approach allows any suitably configured user terminal, not necessarily only trusted terminals, to be used in the system since all secure elements are in the token 27, which is produced in accordance with established security measures known in the art for both hardware and software. The system is thus very secure and mobile, i.e., the token 27 can be used with a wide array of user terminal/token interfaces 222 such as unsecure computers, pay terminals, etc.

As a result of both service provider and user authentication, the system can obtain a data container identifier, corresponding to data stored in a data container associated with the authenticated user/service provider pair. This data container identifier is used by the system to retrieve the data container from the secure data storage of the system and is discussed in more detail below.

One advantageous feature of the system is that every act of user/service provider authentication involves the generation of a temporary transaction identifier ("ticket") which is unique in time and space. The ticket allows the system to associate a user with a service provider during a given transaction. The system knows to whom it issued the ticket and learns the identity of party that returns the ticket to the system. A ticket's life cycle starts when either side (user or service provider agent 220) requests a new ticket and ends when the other side (service provider agent 220 or user respectively) produces this ticket back to the system. The association between the service provider and the user is established when the ticket circulates through the system. For example, if a user (through the token 27) initiates the transaction by requesting a ticket, then the ticket traverses the following circular path: The user front end 208 of the A&DDS management system 204→token 27→service provider agent 220→service provider front end 205 of the A&DDS management system 204→user front end 208 of the A&DDS management system 204. Conversely, if a service provider (through the service provider agent 220) initiates the transaction by requesting a ticket, then the ticket traverses the following circular path: service provider front end 205 of the A&DDS management system 204→service provider agent 220→token 27→user front end 208 of the A&DDS management system 204→service provider front end 205 of the A&DDS management system 204.

The ticket may carry various information. In embodiments, this information is a combination of human-readable service provider name, network node address from where this ticket was issued, and a nonce (number used once) based on a random number.

The security of data is ensured via a number of measures. First, in embodiments, necessary user access and encryption keys are kept only on portable tokens 27. Most of this information is not known to the A&DDS management system 204 on any permanent basis (i.e., the data are not stored on hard disks or other kind of non-volatile memory). For user authentication to be successful, mutual authentication (e.g., authentication of the token 27 and service provider agent 220, as well as authentication of the A&DDS management system 204 to the token 27 and service provider agent 220) is employed.

The token 27 preferably is a physical object such as a hardware token or an embedded token, containing a computer chip, integrated circuitry, smart card chip or software, or combination thereof. If token 27 is a hardware token, it preferably takes the form of a ring or other jewelry; a dongle; an electronic key; a card, such as an IC card, smart card, RFID or proximity card, debit card, credit card, ID badge, security badge, parking card, transit card; or the like.

If the token 27 is an embedded token, it preferably takes the form of a cell phone; a personal digital assistant; a watch; a computer; computer hardware; or the like. The token 27 preferably includes an input/output support element or a device interface that may take the form of any number of different apparatuses, depending upon the particular application in which it is used and depending upon the type of device with which it interacts. In embodiments, the input/output interface includes a port, such as a wireless communications port (e.g., Near Field Communication (NFC) interface), a serial port, a USB port, a parallel port, or an infrared port, or some other physical interface for communicating with an external electronic apparatus, whether by contact or contactless method.

Second, in embodiments, each service provider is registered in the A&DDS management system 204 in the same way as private users, i.e. all service providers are given a unique service provider ID and corresponding access keys and encryption keys. The service provider must pass mutual authentication procedures before being provided access to data.

Third, in embodiments, the user ID and service provider ID pair, made known during the authentication process, are used to form a data container identifier that identifies a data container in the dispersed data storage system 216. This data container holds data that a particular service provider is allowed to access, use and/or modify. The data container can be analogized to a safe deposit box where two keys are needed to open it—one belongs to a bank, the other to the client. Each relationship that a user has with a service provider is associated with its own data container since all service provider id/user ID pairs are unique.

Fourth, in embodiments, to provide reliable storage of data containers the system adds some redundancy information and scatters the data over multiple dispersed and networked data storage locations 218. When data is read back, the combination of the user ID and service provider ID are used to identify a particular set of data storage locations 218 and the way to restore the integrity of the data container. Dispersed data storage is preferred for most applications but is not a requirement of all embodiments of the invention.

Fifth, in embodiments, the use of redundancy information ensures that it is still possible to reconstruct a data container in the event that some data storage locations (i.e., not more than some predefined minimum number of them) become non-functional.

Sixth, in embodiments, data containers are ciphered (e.g., encrypted) by secret keys, which become known as a result of user authentication. In addition, data containers may be ciphered (e.g., encrypted) by the service provider secret keys.

Seventh, in embodiments, as mentioned above data containers can be identified by a unique combination of user ID and service provider ID. However, if the data container identifier is a mere concatenation of those IDs, there may be potential security issues. For example, a person having an access to a full list of available data containers can find all the data associated with a particular user ID. To avoid this possibility the combination of user ID and service provider ID is transformed by a one-way function to produce the data container identifier so that it is not possible (in any practical sense) to restore either the user ID or the service provider ID from resulting data container identifier.

System from the User Point of View:

From the user point of view, user authentication is based on at least the "what somebody has" principle using the token 27. As described above, the token 27 is preferably a small electronic device that the user has at his disposal. FIGS. 8A through 8D illustrate just some of the many possible embodiments of a token 27. From the user's point of view, the token 27 is a universal key that opens many doors (i.e., it can be used to authenticate the user to many different service providers).

For applications of a token requiring high security, the token—or the token in combination with an input/output element—may include the following components: a keypad (alphanumeric), interactive display, or other type of data entry mechanism (collectively referred to herein as "user interface") that allows a user to compose or modify a message; a user interface for inputting data representing a secret (it should be noted that the user interface for generating or modifying a message may, but does not have to, be the same as the user interface for the entry of the data representing a secret); a display for showing the message and/or secret to the user; a scanner or reader for receiving at least one type of biometric data for a biometric characteristic of the user; memory for securely storing a secret of the authorized user, biometric data of the authorized user, and/or other security information; a processor or circuitry for verifying input of the secret or biometric data as being that of the authorized user; a processor or circuitry for generating or originating digital signatures; and/or an output for outputting from the device and transmitting information including the message and digital signature therefor. Preferably, the device also includes memory for storing and exporting encryption key(s), a token ID, a user ID, and other information. For lower security applications, not all of the above elements are necessary.

In certain embodiments, the token is smart enough to ask for a second kind of authentication criteria, such as a "what you know" authenticator (e.g., PIN) for critical applications and to display a service provider name during the authentication process.

Figure 8A:
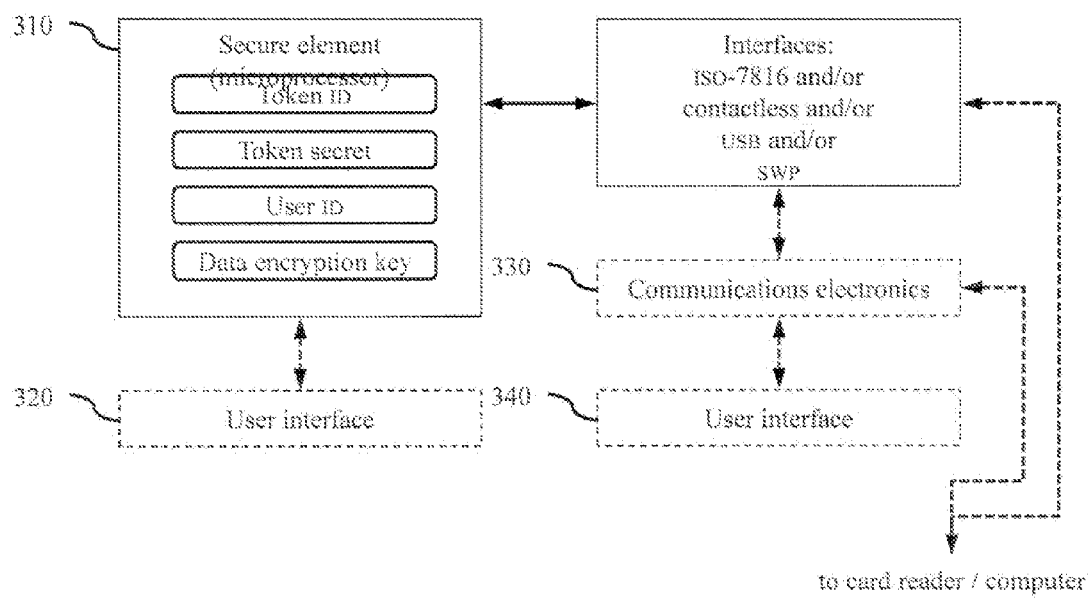
FIG. 8A is a block diagram of a token for use in the system of FIG. 7 and FIGS. 8B-8E illustrate various embodiments of tokens.

FIG. 8A is a block diagram of the functional components of the token 27. The heart of token is the secure element 310, which includes a microprocessor, memory (e.g., random-access and read-only memories) for operating instructions and data storage, and input/output interfaces. The microprocessor operates in accordance with a program resident in its memory. As discussed in detail in the following sections, every token 27 has stored in its memory a token ID, a token key, a user ID and optionally a data encryption key. The token ID is a unique number assigned to this token and known to the A&DDS management system 204. It is not a secret parameter and is used for authenticating the token 27.

The token key is a secret parameter. This token key is also known to the A&DDS system. This token key is used for token-to-system mutual authentication and creation of a ciphered (e.g., encrypted) communication channel between the system and the token.

The user ID is the most sensitive parameter stored in the token. This user ID is used to derive a data container identifier used in retrieval of the user's stored data. If sent outside of the token at all, it should only be sent to the A&DDS system via a ciphered (e.g., encrypted) channel.

The data encryption key is optional and used in some applications where data may (and preferably is) encoded/decoded by the token. For example, a user could use the A&DDSM system for password storage or storage of other personal data. The user accesses this data through a user terminal 108, 110. When retrieved from the A&DDSM system, the user terminal can pass the retrieved data to the token for decryption and return to the user terminal for viewing and/or editing the data, and pass the data back through the token for encryption before transmission back to the A&DDSM system for storage.

In another example, the token may generate a unique file encryption key. The token gives this file encryption key to the user terminal 108, 110 so that the user terminal 108, 110 encrypts data to be stored in the A&DDS management system 204. The token encrypts the file encryption key and, optionally, an indication the encryption algorithm used with the data encryption key and then causes these encrypted data to be stored in the A&DDS management system 204.

The architecture of the secure element as well as its software ensure that the token key (and, in some cases the data encryption key) cannot be exported from the token memory. They also ensure that the user ID may be transmitted only via ciphered channel.

One possible implementation of the secure element 310 is a cryptographic card. Available cards can communicate by a legacy ISO-7816 contact interface, a contactless interface (e.g. ISO 14443) or a USB interface (or any combination of these interfaces). In some cases the secure element 310 may have a single wire protocol interface for communication with an external contactless transceiver. This secure element may be packaged in an ID-1 plastic body (e.g., the well-known bank card body) or may be included in a SIM card, which has a secure microprocessor and memory, as used in mobile phones. Alternatively, the secure element may take the form of a packaged die with pins for soldering (or other connection) to an appropriately configured token body with interface connections for power and communications.

The simplest form of token is an ID-1 smart card which connects to a computer via USB interface or via a card reader. In that case it is responsibility of software at a user terminal 108, 110 to show a service provider name and accept user consent for authentication (described in various embodiments below).

Some embodiments may allow for the secure element 310 to have its own user interface 320, i.e. display, buttons, touch screen, and the like. This solution is preferred as it does not depend on any software at the user terminal 108, 110.

If the secure element 310 does not have its own user interface 320, it may be embedded in a housing, e.g., a MP3 player, personal data assistant, or mobile phone, that provides its own user interface 340 as well as its own communications electronics 330 for communicating with an external user terminal (e.g., card reader or computer). Some mobile phones, personal data assistants and the like may already include components 310, 330 and 340. The token functionality could then be implemented in an application of the device. The secure element 310 may be a 3G mobile phone multi-application SIM card or specially installed second cryptographic element. Any number of interfaces (e.g. Bluetooth or USB) may be used to connect the device to the user terminal 108, 110.

The user terminal 108, 110 may include, if necessary, software for routing various communications between the browser resident on the user terminal 108, 110, the user front end 208, and the token 27. This software can be permanently resident on the user terminal, such as in the form of a browser plug-in, or in form of drivers or executable programs, including programs running as a service (daemons). Some parts of user terminal software may be downloaded each session as, for example, an applet. A servlet based approach may also be used.

Figure 8B:
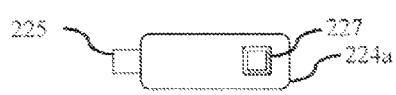

FIG. 8B illustrates a basic smart card or fob token 224A. The token 224A includes an input/output interface 225, such as a USB connector, for connection to a user terminal/token interface 222, which may be either a specialty terminal (such as a point of sale terminal of a merchant) located at the service provider premises or the user's computer, which in turn has Internet access. Instead of or in addition to a wired interface such as a USB interface, the token 224A can have a wireless interface for connection to a suitably configured user terminal/token interface 222. In embodiments, the token 224A may also include a consent button 227.

Figure 8D:
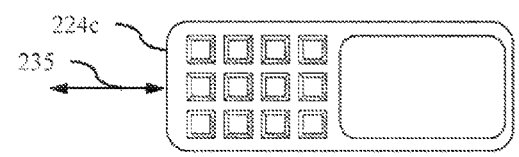
Figure 8C:
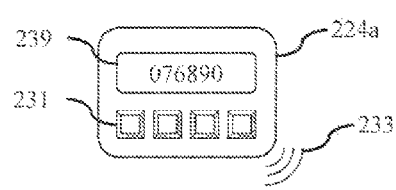

FIG. 8c illustrates an alternative embodiment of a token 224B. The token 224B has a user interface including a screen or display 229 and input buttons 231. The token 224B also includes a wireless communications interface (illustrated by wireless communications 233), such as an Infrared Data Association interface, contactless NFC interface, or Bluetooth interface.

Figure 8E:
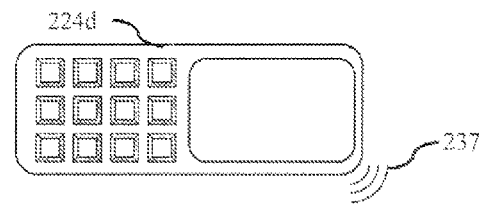

FIGS. 8D and 8E illustrate that token functionality may be incorporated into mobile phones 224c and 224D as applications resident on the phones. In the embodiment of FIG. 8D, the mobile phone 224c can be connected to a wired interface such as a USB port of a user terminal/token interface 222 by a wired connection 235. Alternatively, in the embodiment of FIG. 8E, the mobile phone 224D can communicate with the user terminal/token interface 222 wirelessly (as illustrated by wireless communications 237), such as by way of NFC, Bluetooth, SMS/GPRS/3G or other appropriate technology.

In order to authenticate a user accessing the website of a particular service provider, or to authenticate the user at a service provider premises (e.g., at a point of sale terminal), the user connects his token 27 to a user terminal/token interface 222. The user presses a button on the token 27 to confirm that the user seeks to be authenticated to the service provider. In embodiments, the consent button could be implemented as a soft button on the display of the user terminal. As a result of token authentication and service provider authentication (the processes of which are described in detail below), the service provider is provided access to the data needed by the service provider for interaction with the user. This data (e.g., a customer profile) are retrieved from the dispersed data storage system 216, assembled and sent to the service provider agent 220. The data allows the service provider to know, for example, how to address the user, how loyal the user is and what kind of discounts should be provided. The service provider can modify the data and send it back to the A&DDS management system 204 for safe storage in the dispersed data storage system 216. Sensitive data are not maintained at the service provider agent or associated data storage and thus are not as vulnerable to inappropriate access.

As noted above, the functionality of the system is similar to that of a safe deposit box. Data are stored in the virtual safe deposit box. To open the box two keys are needed: one from the user and one from the service provider. Once the box is open, the service provider and/or the user obtains the data and uses it in a current session. When the session is over, the service provider and/or user may put modified data back into the safe deposit box or return the box with the content unmodified.

It is important to note that each safe deposit box or "data container" contains only data relevant to a particular user/service provider pair. This data is generated as part of, for example, the user's registration at a service provider's website or at the time of issuing a loyalty card and may be updated as the relationship with the user progresses to reflect the user history with the provider. By registration it is meant an operation in which a user provides identity information to a service provider in order to establish a permanent business relationship with the service provider; thereafter, the service provider recognizes the user through some form of authentication credentials. Data for another service provider is stored in a separate data container and are available only to that particular service provider.

System from Service Provider Point of View:

To use the A&DDS management system 204 for third-party identification/authentication and for safe private data storage, the service provider must first register with the A&DDS management system 204. The service provider is assigned a service provider ID and one or more keys for authentication and traffic ciphering (e.g., encryption). These keys and service provider ID can be provided in the form of tokens that are installed on the service provider's servers, such as at the USB port of the servers. If the service provider uses a hosting service as its service provider agent 220, then this information can be provided as, for example, a software token to the hosting service. Any necessary software is then installed at the service provider agent 220 for enabling this kind of third-party identification/authentication. For example, the software may include, generally speaking, a library analogous to what is provided by the OpenID Foundation for those web entities using their authentication system. The library is installed on the server and modifications are made to the service provider's files/programs to call this library's procedures for user authentication/database requests. By way of example, the Apache web Server, which is the most widely used server today, is configured to be able to use external modules for authentication. Module names start with mod_auth_method, where method is the name of the authentication method. This module can be provided for use by a service provider server.

The service provider may choose to trust the A&DDS management system 204 with storing data associated with a specific user. Alternatively, in cases where the service provider already has a large investment in a reliable database and does not want to redesign its core technologies, it is possible to store within the dispersed data storage system 216 only certain pieces of information, such as the service provider's local ID that it associates with the presented user. It should be understood that this form of data need not necessarily be, but may be, stored in a dispersed format. No matter which kind of service is chosen, the user experience will be the same.

If the service provider interacts with the user through a webpage, the service provider preferably modifies its login webpage to add an appropriate graphical symbol, textual prompt (analogous to the OpenID or Microsoft LiveID single sign-on service symbols) or button that allows a user to authenticate himself/herself using the token 27. When the user presses on the button or points-and-clicks the graphical symbol, a new graphical user interface (e.g., webpage) may be displayed to the user. A ticket is created and used in the authentication process of authenticating both the user and/or the service provider (described in more detail below). The ticket is issued by the A&DDS management system 204 and passed between the user terminal/token interface 222 and the service provider agent 220. This new graphical user interface prompts the user to plug-in (by wired or wireless connection) his token 27 and activate the token 27 (e.g. press the consent button 227 in the embodiment of FIG. 8B). When the user activates the token 27, a new authentication transaction begins and if authentication is successful, the service provider agent 220 receives the stored data from the A&DDS management system 204. For example, the service provider agent 220 can receive all the information about a particular user that has been gathered to date by the service provider, e.g., the user information that was gathered during initial user registration with this service provider along with historical data (e.g., purchase or other transaction history, etc.). If the service provider had chosen to keep all data in its own database, then the retrieved data may carry only a pointer (or reference, or key) to the user record, such as in the form of a user identifier used in the database system accessible to the service provider agent 220.

Figure 9:
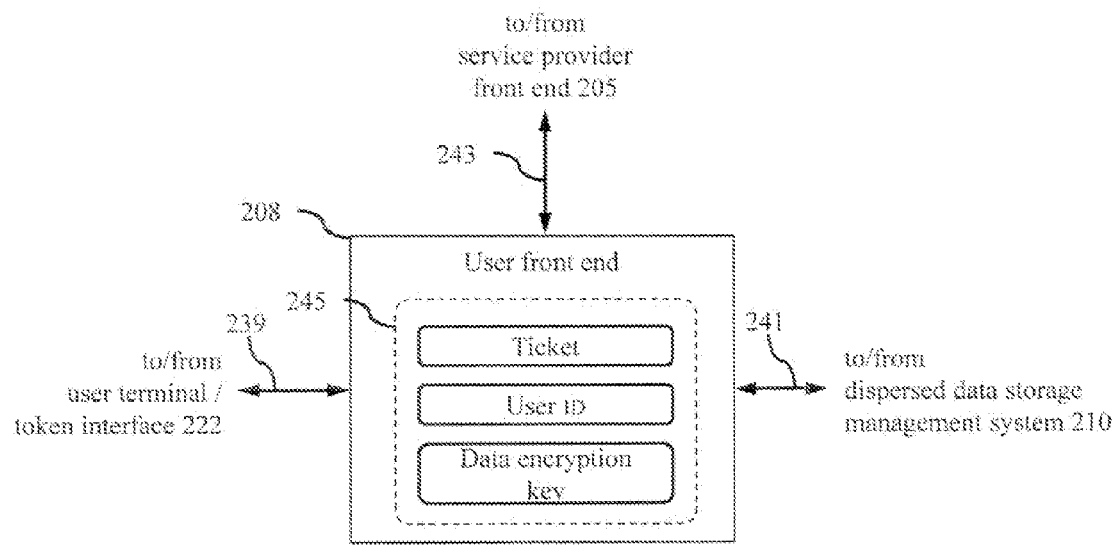
FIG. 9 illustrates the user front end component of the A&DDS management system with its main links to other parts of the system.

FIG. 9 is a schematic illustration of the user front end 208 of the A&DDS management system 204. The user front end 208 preferably takes the form of a computer program that runs on a networked computer. This computer has a processor, random access memory, a number of network interfaces and a mass data storage device (e.g., hard disk drive). If this computer is used solely for the purpose of user front end functionality, then data stored on a hard disk includes principally operating system files and the user front end program. The user front end 208 also includes configuration data, which is used to discover other components of the A&DDS management system 204 (e.g., dispersed data storage management system 210, service provider front end 205 and key management system 212), to the extent those other components are resident on other networked computers/processors forming the A&DDS management system 204 or at other IP addresses in a network (virtual or otherwise). From a network point of view, the user front end 208 uses IP for communications with other devices and has three principal connection points. The first connection of interest is the connection 239 from the user terminal/token interface 222 to the user front end 208 as a token server. This token server has a public IP address and is the entry point for all authentication operations with user terminals/token interfaces 222. Those operations may arrive from all over the world. The user front end 208 has another IP connection 241, which is a connection point to the dispersed data storage management system 210. The user front end 208 uses this connection 241 to read data containing token keys for mutual user front end/token authentication. This connection is an intra-system connection and may have an internal system IP address (e.g., an address inside a virtual private network). Finally, the user front end 208 has a connection 243 to exchange data (e.g., tickets, user IDs or other information) with the service provider front end 205. This connection may also use an intra-system network connection through, for example, a virtual private network.

The user front end 208 is responsible for authentication of the user using a token 27. Authentication is based on a unique token number and the user front end's knowledge of a token key that is a secret. The token key (as well as enabled/disabled state and other possible parameters) may be stored in an external data storage system, such as the dispersed data storage system 216 managed by the dispersed data storage management system 210. This option allows the user front end 208 not to keep records describing tokens in its memory or attached mass data storage devices. After successful authentication the token 27 sends another secret datum: the user ID, which is a unique number stored on the token 27 and used in data retrieval from the dispersed data storage system 216. The user ID should not be confused with a token ID, which is another ID stored on the token but not used in connection with a service provider ID for retrieval of a data container.

When the user front end 208 receives this user ID, it generates a temporary data structure 245 in its random access memory. The data structure 245 can be used as a way to supply the service provider front end 205 with the data contained therein. This data structure 245 holds information on a newly created transaction:

a) a unique identifier of the transaction (ticket) which preferably includes a random number and the network address of the user front end 208;
b) the user ID; and
c) a data encryption key (optional).

Every transaction is assigned a time-to-live parameter, which represents the maximum time period the transaction may be kept in the memory of the user front end 208. Regardless of the time-to-live parameter, the data structure 245 can be used as a means to supply the service provider front end 205 with the data contained therein.

Figure 10:
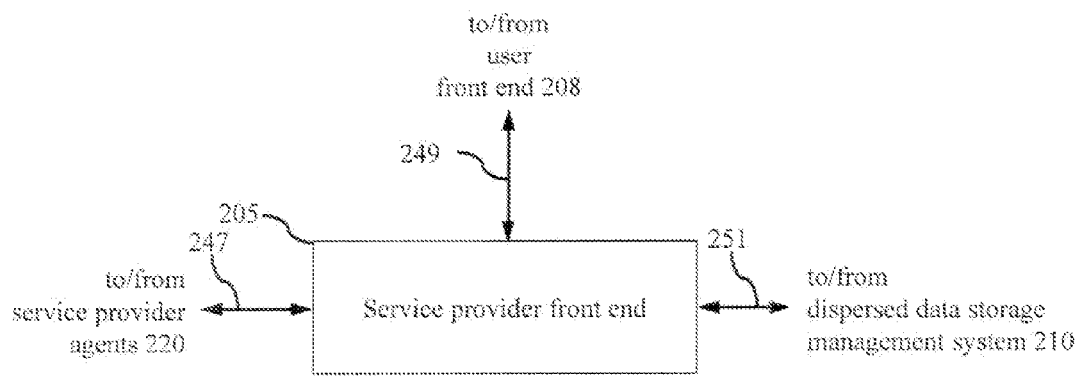
FIG. 10 illustrates the service provider front end component of the A&DDS management system with its main links to other parts of the system.

FIG. 10 is a schematic illustration of the service provider front end 205 of the A&DDS management system 204. The service provider front end 205 preferably takes the form of a computer program that runs on a networked computer. This computer has a processor, random access memory, number of network interfaces and mass storage device (e.g., hard disk drive). If this computer is used solely for the purpose of service provider front end functionality, then data stored on a hard disk includes principally operating system files and the service provider front end program. The service provider front end 205 also includes configuration data, which is used to discover other components of the A&DDS management system 204 (e.g., the dispersed data storage management system 210 and the user front end 208), to the extent those other components are resident on other networked computers/processors forming the A&DDS management system 204 or are located at another IP address. From a network point of view, the service provider front end 205 supports IP communications and has three connections. The first connection 247 is an access point for service provider agents 220. This connection 247 is preferably by way of a public IP address and is used for all exchanges with service provider agents 220. The service provider front end 205 has a second connection 251 for communicating with the dispersed data storage management system 210. The service provider front end 205 uses this connection to receive/send data containers containing data to the dispersed data storage management system 210. Being an intra-system connection, this connection 251 may have an internal system IP address, for example an address inside a virtual private network. Finally, the service provider front end 205 preferably has a third connection 249 for exchanging data (tickets, user IDs or other information) with the user front end 208. This connection may also use an internal system IP address, for example an address in a virtual private network.

The service provider front end 205 can be considered a socket in the A&DDS management system 204 to which a service provider agent 220 connects in order to obtain data from or submit data to the system. The service provider front end 205 is responsible for authentication of service provider agents 220, ticket transfer and data exchange between the A&DDS management system 204 and the service provider agents 220. In embodiments described more fully below, when the service provider front end 205 receives a ticket from a service provider agent 220, it calculates a network address of the user front end 208 that issued the ticket and then requests the user ID and (optionally) data encryption key from the user front end 208. Next, the service provider front end 205 combines service provider ID and user ID, and obfuscates this combination to obtain a data container. A service provider agent 220 requests the A&DDS management system 204 to execute a particular operation (e.g., CREATE, READ, WRITE or DELETE) on the data container. In the case of a CREATE operation, an empty data container may be created. When it is a READ operation, the data container is provided by the dispersed data storage management system 210 to the service provider front end 205, optionally decrypted with a data encryption key, and sent to the service provider agent 220.

For WRITE operations, the service provider front end 205 receives data for reliable storage from service provider agent 220. The service provider front end 205 optionally encrypts this data with a data encryption key and sends the data container to the dispersed data storage management system 210 for storage. A DELETE operation requests that the dispersed data storage management system 210 destroy a data container.

Figure 11:
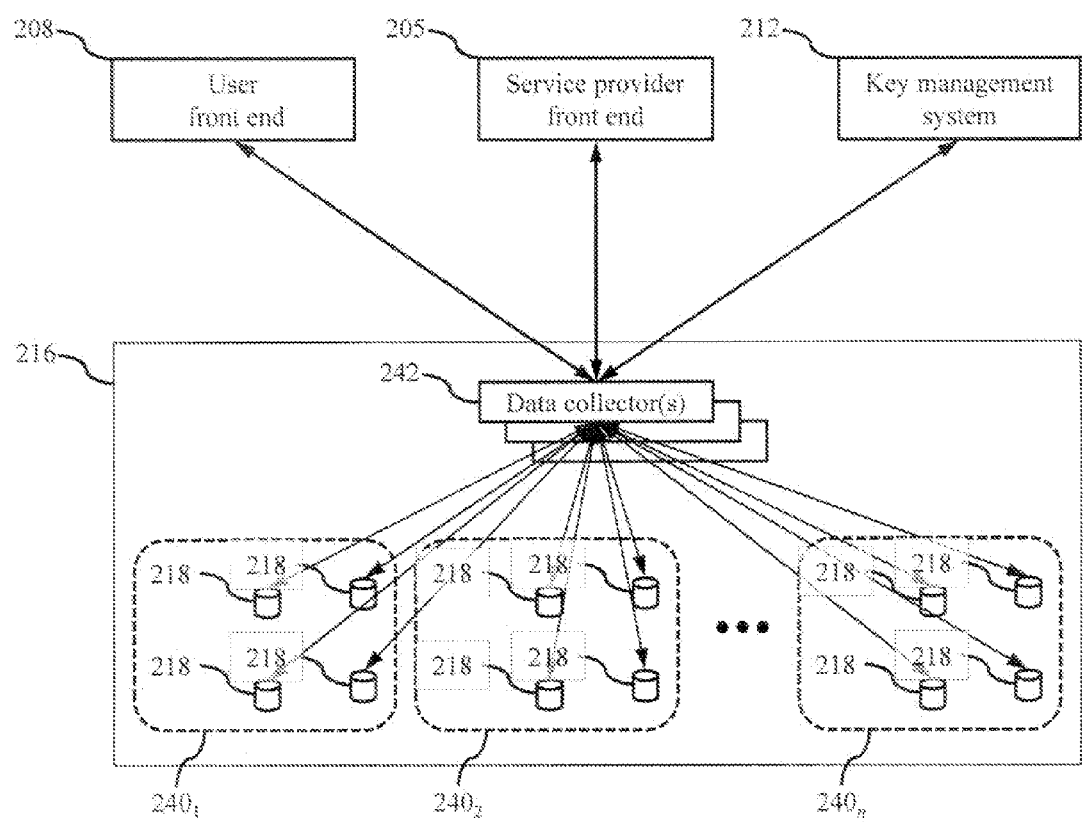
FIG. 11 illustrates the dispersed data storage system of the A&DDS management system of FIG. 7 in more detail with its connections to various other components of the system.

FIG. 11 illustrates in more detail the dispersed data storage system 216 and its connections. The dispersed data storage system 216 is used in the system to keep two kinds of system resources: (i) data containers having token secret keys and token status, and (ii) data containers having other data.

All data containers are identified by a data container identifier (i.e., file name) that is derived with an algorithm based on a combination of unique identifiers in the system, namely (in the case of a data container having other data) the user ID and service provider ID. Other values may also contribute to the combination. This combination is obfuscated by one-way function. A one-way function is a function that is easy to compute but whose inverse is very difficult to compute. The one-way function generates the data container identifier that is used to retrieve a data container from the dispersed data storage 216. The purpose of obfuscation is to make it impossible (in any practical sense) to restore the user ID and/or service provider ID from the data container identifier.

In one exemplary embodiment, the obfuscation uses a RSA encoding procedure with a known public key. In cryptography RSA is an algorithm, named after its inventors (Rivest, Shamir and Adleman), for public-key cryptography. RSA is widely used in electronic commerce protocols, and is believed to be secure given sufficiently long keys. RSA uses a public key and a private key. The public key can be known to anyone and used for encrypting messages. Messages encrypted with the public key can only be decrypted using the private key. The public key consists of the modulus n and the public (or encryption) exponent e. The private key, which must be kept secret, consists of the modulus n and the private (or decryption) exponent d. The A&DDS system generates a public/private key pair. The public key is stored at the location in the system responsible for generating the data container identifier (e.g., token 27 or the A&DDS management system 204 depending on the embodiment). The private key is destroyed, deleted, or set aside in highly secure data storage for data recovery in case of disaster. In order to derive the data container identifier, the user ID and service provider ID are first concatenated. That is, for illustrative purposes only, if user ID is (in binary) 0110 and the service provider ID is 1110, then the concatenation user ID|service provider ID=01101110 where "|" represents the concatenation operator. This concatenation is then encrypted with the public key, i.e., data container identifier=[(user ID|service provider ID)$^e$]modulus$_n$ The public key encryption acts as a one-way function since the private key is unavailable to decrypt the data container identifier to reveal the user ID and service provider ID.

The dispersed data storage system 216 includes multiple dispersed and networked data storage locations 218. The dispersed data storage management system 210 preferably includes one or more data collectors 242. The data storage locations 218 are networked computers equipped with hard disks; e.g., solid state disk drives. Their primary task is to permanently store data. A data collector 242 receives requests from the user front end 208, the service provider front end 205 and the key management system 212. Those requests are to create, read, write, or delete a data container specified by its data container identifier. In certain embodiments, the resources are stored in a dispersed manner in accordance with an information dispersal algorithm. When data is stored (a write operation) in the system, a data collector 242 executes the information dispersal algorithm to convert the data into a plurality (e.g., 10-20) of data segments and calculated derivatives thereof (for redundancy) and sends each segment to a separate data storage location 218. To execute a read request, a data collector 242 first collects the corresponding segments from the data storage locations 218, and, in case one or more data storage locations 218 fail, a data collector 242 obtains segments from other data storage locations 218 for their segments. The intrinsic redundancy of the information dispersal algorithm is used to preserve data and can also be used to check for data errors.

Various information dispersal algorithms may differ in particular details, such as the matrix and arithmetic used, and whether the information dispersal algorithm tries to identify errors itself or in reliance on some other data. But information dispersal algorithms tend to work in the same way. The operation of an information dispersal algorithm can be illustrated by the following examples. Assume a long number such as 12345678 is to be stored in a dispersed manner. To store the number safely, it is divided into two halves: 1234 and 5678. The first half (1234) is stored at a first data storage location (location #1) (e.g., first data server). The second half (5678) is stored at a second data storage location (location #2). Next, some derivative of the halves is calculated, such as the sum of the halves, 6912 in this example. This derivative is stored at a third data storage location (location #3). With this approach, any one of three data storage locations can be lost/corrupted/unavailable and the original data can be restored from the remaining two locations. For example, if location #1 is down, the original data can be restored using the values in location #2 and #3: the data in location #1 is restored by subtracting the data in location #2 from the data in location #3. Likewise, if location #2 is unavailable, its data can be derived by subtracting the value in location #1 from the value in location #2.

By increasing the storage 1½ times (when compared to simply storing 1234 and 5678 in two locations), the original information is recoverable if two data storage locations are available. It is noted that the use of derived redundancy segments also reduces the data storage requirements. If pure mirrored redundancy were used, four data storage locations (i.e., two locations for storing 1234 and two locations for storing 5678) would be required. Further, while using more data storage locations (four rather than three), not all combinations of locations can be used to restore the original data. For example, the original data cannot be restored from two locations having stored therein 5678.

The above-described three location redundancy scheme can be modeled as $(m,k)=(2,1)$ $m+k=n=3$ where m represents the size (in segments) of the original data and the absolute minimum number of segments required to restore information, k represents the redundancy data (i.e., the number of segments of data that can be lost), and n represents the total number of chunks.

Even better results can be obtained if a fourth data storage location is added for storing the difference between the data in the second and first locations, i.e., $4444=5678-1234$ The data storage is double that used when merely storing the data in two locations; but, any two segments of data can be used to restore the original information, even if none of the segments containing original (i.e., non-derived) data portions (e.g., 1234 and 5678) is available. For example, if both location #1 and location #2 are unavailable, the content of these locations, and thus the content of the original data, can be restored from location #3 and location #4, i.e., $$\text{contents of location \#1} = \frac{\text{location \#3} - \text{location \#4}}{2}$$

$$\text{contents of location \#2} = \frac{\text{location \#3} + \text{location \#4}}{2}$$

Moreover, if an individual location is still responding but returns corrupted data instead of the real information, this can be detected and the original data restored.

This redundancy scheme can be modeled as $(m,k)=(2,2)$ where
k=2
m=2
n=4

Using four data storage locations, any two can be lost and the remaining two can be used to restore the original data.

In an exemplary embodiment the information dispersal algorithm used by the system to store the data in dispersed form is the Reed-Solomon algorithm and further elaborated in U.S. Pat. No. 5,485,474 Scheme for Informational Dispersal and Recostruction [1996]. From a very high level and simplified perspective, the Reed-Solomon algorithm works in accordance with the foregoing description, though using Galua fields and polynomial algebra. The algorithm breaks the original data into multiple parts or chunks and provides data redundancy, as opposed to simply mirroring the original data (i.e., storing the same part of data multiple times). The algorithm conforms to the (m, k), m+k=n scheme described above. That is, there are n locations, and at least any m of them can be used to recover the original information. There are k additional locations for redundant data. Errors totaling k/2 can also be detected and corrected when k/2 locations appear functional at first glance but actually provide corrupt data.

In exemplary embodiments the information dispersal algorithm has 12 locations and conforms to a (6, 6) scheme. However, greater or less redundancy can also be built in, such as (6, 12) and (8, 16) schemes.

Another way to protect the data is to cipher (e.g., encrypt) them with a symmetric key. The key may be calculated as a hash of a concatenated user ID and service provider ID. This encryption operation is independent from that undertaken with the token's data encryption key.

The data storage locations 218 are preferably dispersed over predefined zones $240_1$ to $240_n$, where n is preferably three or more, in such a way that it is impossible to restore data from the data storage locations 218 belonging to a single zone 240. On the other hand, it should be possible to restore data even in case a whole zone 240 of data storage locations 218 is nonfunctional. For a (12, 6) information dispersal algorithm the latter condition may be met by three zones 240 with four data storage locations 218 each. For a (16, 8) information dispersal algorithm six, five, and five data storage locations 218 are required in three different zones.

Figure 12A:
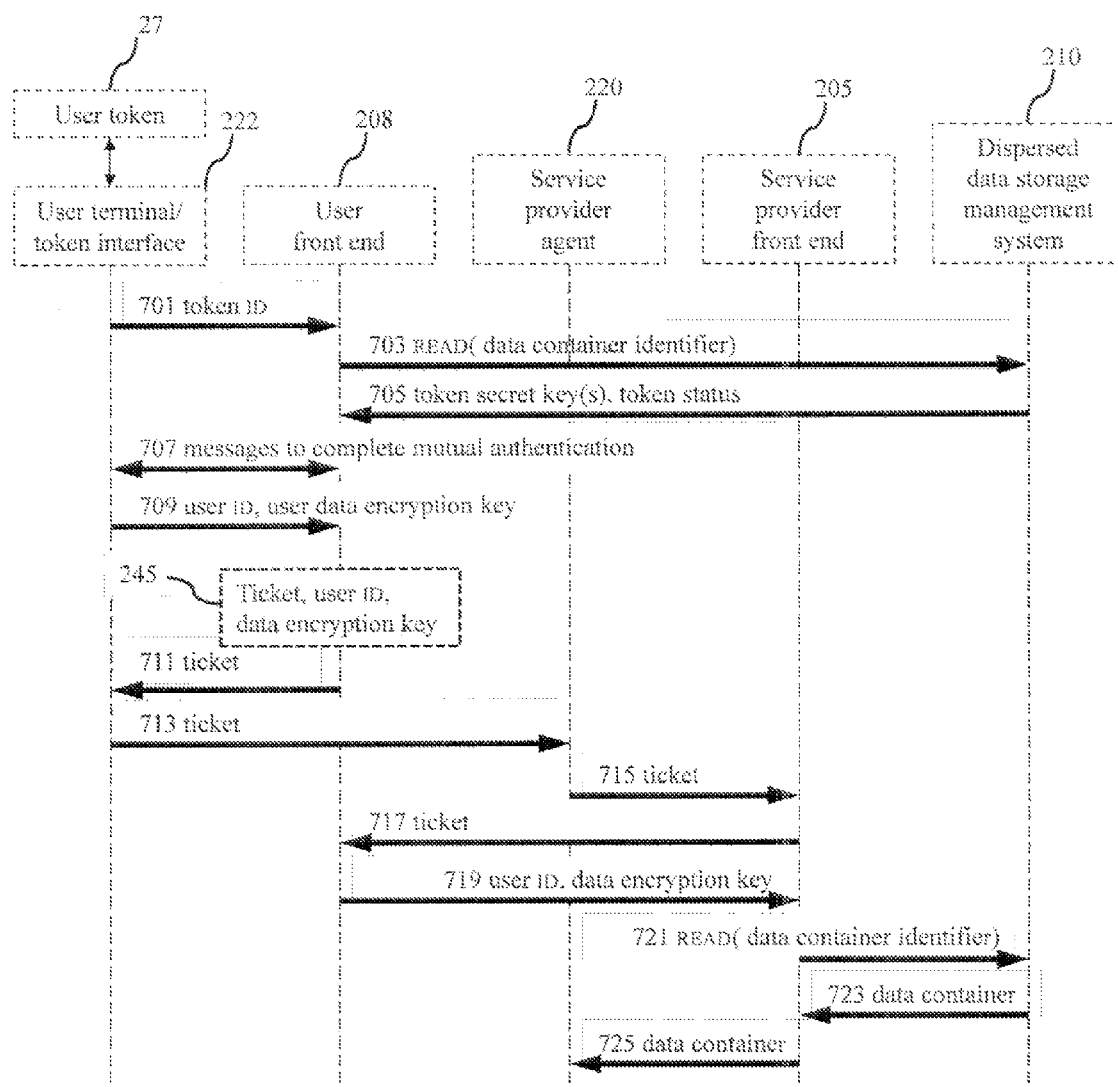
FIG. 12A is a message sequence chart for user authentication at a service provider and data retrieval according to a first embodiment of the present invention.

FIG. 12A is the message sequence diagram for user authentication at a particular service provider agent 220 where the ticket is issued by the user front end 208. In the authentication method illustrated by the sequence diagram of FIG. 12A, the token 27 starts the process, asking for a new ticket from the user front end 208. The user front end 208 logically links the ticket and user ID. The token 27 sends the ticket to the service provider agent 220. Then, the ticket is produced to the service provider front end 205. The service provider front end 205 obtains the location address of the ticket issuer (i.e., of the user front end 208). The service provider front end 205 then obtains the user ID. It is now possible to retrieve corresponding data. The service provider front end 205 links both user and service provider IDs and optionally other codes and asks the dispersed data storage management system 210 for the data that corresponds to this pair. Finally the data is collected by a data collector 242 and sent to the service provider agent 220.

As a more detailed example of user and operation, with specific reference to FIG. 12A, the process starts when the user presents himself/herself to a service provider, such as when the user accesses the webpage of a service provider agent 220. The user is prompted to authenticate using the token 27. For example, one way to prompt the user is to send a webpage with a HTML form in it to the user terminal/token interface 222. The user connects the token 27 to the user terminal/token interface 222 (via, for example, a USB port, a contactless reader, or by taking appropriate steps with the user's mobile phone) and presses the soft or hard consent button. The token 27 then starts the process of mutual authentication with the user front end 208. The token 27 sends and receives messages to/from the user front end 208 via the user terminal/token interface 222. The authentication and data retrieval sequence described below follows.

For communications between the token 27 and the user front end 208, any number of standard mutual authentication algorithms may be used, such as those explained in the ISO/IEC-9798 specification, the entirety of which is hereby incorporated by reference herein. The details of this mutual authentication are not described herein so as to avoid unnecessarily obscuring the details of the present invention. Only a very high level illustration of this authentication procedure is discussed below in connection with messages 701 through 709, with certain features unique to the present system also described in connection therewith.

Every token 27 uses its own authentication key, known to the A&DDS system. An essential part of any authentication is the sending of the token ID from the token 27 to the A&DDS system. This is shown at message 701 where the token 27 sends its token ID (which is not to be confused with the user ID) to the user front end 208.

The A&DDS management system 204 stores some information about each token that it creates. This information includes at least a token state (enabled or blocked) and a token key for use in token authentication. This information is stored in a data container in the same dispersed data storage system 216 as the other data (i.e., as the data containers associated with a user/service provider pair). Therefore, a data container identifier is used to retrieve this information from the dispersed data storage system 216. The user front end 208 has the token ID (from message 701) and some predefined number TSPID, which serves as a virtual service provider ID. Essentially TSPID is a system ID that is used in combination with any given token ID for purposes of deriving a data container identifier. The user front end 208 uses both identifiers to calculate a data container identifier for the data container having the token information described above for the presented token 27. In exemplary embodiments this data container identifier is derived by using the TSPID and token ID as inputs to a one-way function $$\text{data container identifier} = f_{one-way}(\text{TSPID}, \text{token ID})$$

At message 703, the user front end 208 sends this data container identifier to the dispersed data storage management system 210 with a READ request shown as READ(data container identifier) which equates to READ($f_{one-way}$(TSPID, token ID)). Passing the data container identifier queries the dispersed data storage management system 210 for the information on (i) whether this token ID is registered in the system and is active (i.e., not blocked or deactivated) and (ii) the cipher keys associated with the token.

The system does not use a single master key, a technique by which a public token number, stored on the token, is combined with a secret system-wide private number (the master key) in a one-way function to yield a public result that is also stored on the token, and by which any device knowing the master key and the one-way function may verify the authenticity of the token. Therefore, there is no master key that can be stolen and used to compromise the system. Rather, separate symmetric keys (e.g., cryptographic keys and optionally identification of the cryptographic algorithm) are used for each token 27 issued by the system. Even then, these keys are not stored in a single place. Rather, the keys are dispersed over the dispersed data storage system the same way data (i.e., data containers storing data) are stored in the system.

The dispersed data storage management system 210 uses the data container identifier to retrieve the data container containing the token's secret key(s) and status from the dispersed data storage system 216. At message 705, the data container is sent to the user front end 208. The use of "key(s)" illustrates that a single key can be used to encrypt communications back and forth between the user front end 208 and the token 27, or separate keys can be used for encrypting communications to the user front end 208 and from the user front end 208, At this point, the user front end 208 continues the authentication process, which normally results in generation of a session key or keys, which will be used to encrypt all subsequent messages between the token 27 and the user front end 208 during this session. As determined by the authentication algorithm that is employed, the token 27 and the user front end 208 exchange messages to complete the mutual authentication. This exchange for completion of the mutual authentication is shown as messages 707 in FIG. 12A. A session key is derived from symmetric authentication keys and random challenges exchanged during authentication At encrypted message 709 the token 27 uses the session key to encrypt the user ID it has stored in its secure data storage and (optionally) a data encryption key, and then sends them to the user front end 208. The user front end 208 decrypts this message and creates and stores in its random-access memory a data structure 245, which describes this authentication process. This data structure holds the user ID and the optional data encryption key along with a ticket. In embodiments, the ticket is an identifier of the transaction that is unique in time and space. For example, the ticket can be a string of ASCII or UTF-coded symbols including a temporarily unique-for-this-user front end random number, the user front end network address (possibly a local virtual private network address) and optionally some other helper information.

It should be understood that message sequence 701 through 709 illustrates only one possible message sequence for mutual authentication between the token 27 and the A&DDS management system 204. Other procedures can be employed, such as those used by the various smart cards available on the market.

At encrypted message 711 the user front end 208 sends the ticket over the encrypted channel to the token 27.

At message 713 the token decrypts the ticket and passes it to the user terminal/token interface 222, which in turn sends it to service provider agent 220. For example, the user terminal/token interface 222 may insert the ticket into the service provider agent's HTML form and then return the form to the service provider agent 220.

At message 715 the service provider agent 220 connects to the service provider front end 205, and sends the ticket to the service provider front end 205. Service provider agents 220 can be considered to have more or less a permanent connection to the A&DDS management system 204. In this situation, the service provider front end 205 already has the service provider ID. If there is no such permanent connection, the service provider agent 220 and service provider front end 205 perform mutual authentication and session key generation as discussed above in connection with authentication of the token 27 and the user front end 208. In this manner, the service provider ID is revealed to the service provider front end 205.

At message 717 the service provider front end 205 receives the ticket and obtains the network address of the issuing user front end 208 from the ticket. The service provider front end 205 then sends the ticket to the so-identified user front end 208, requesting the user ID and, optionally, the data encryption key.

At message 719, the user front end 208 finds the data structure 245 associated with the ticket received from the service provider front end 205 and replies to the service provider front end 205 with the user ID and data encryption key. After this data is transmitted to the service provider front end 205, the data structure 245 can be deleted from the random access memory of the user front end 208.

At message 721 the service provider front end 205, which has both the user ID (from message 719) and service provider ID uses both identifiers (and optionally additional codes) to derive a data container identifier (i.e., the file name of the data container associated with the service provider/user ID pair). In exemplary embodiments this data container identifier is derived by using the user ID and service provider ID as inputs to a one-way function $$f_{one-way}(\text{service provider ID}, \text{token ID})$$

as described above. This data container identifier is sent to the dispersed data storage management system 210 as message 721 READ(data container identifier).

At message 723, using the information dispersal algorithm and data container identifier, a data collector 242 of the dispersed data storage management system 210 gathers enough segments of the data container from the dispersed data storage system 216, assembles the data container and sends the data container to the service provider front end 205. The service provider front end 205 receives the data container and, if encrypted, decrypts the data using the data encryption key it received from the user front end 208 in message 719.

At message 725 the service provider front end 205 sends the data container to the service provider agent 220 in the same form it was received from the service provider agent 220. The data is preferably encrypted using a session key established by the service provider agent 220 and the service provider front end 205 during their mutual authentication session.

Figure 12B:
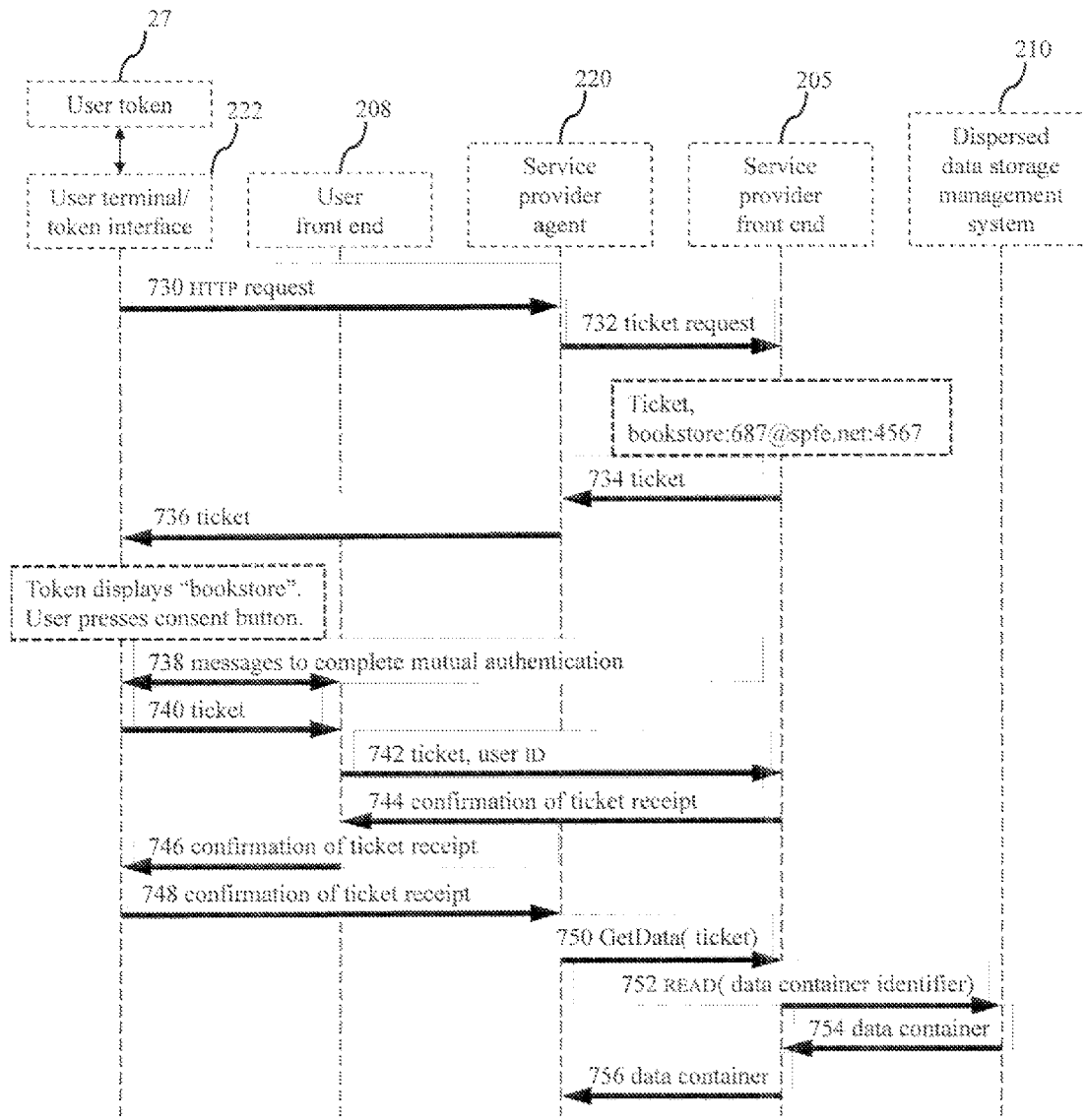
FIG. 12B is a message sequence chart for user authentication at a service provider and data retrieval according to a second embodiment of the present invention.

FIG. 12B is message sequence diagram for user authentication at a particular service provider agent 220 where the ticket is issued by the service provider front end 205 (as opposed to the user front end 208 as shown in the sequence diagram of FIG. 12A). In this approach, the service provider agent 220 requests a new ticket from the service provider front end 205. The service provider front end 205 generates a new ticket and assigns it to this particular service provider agent 220. The service provider agent 220 provides this ticket to the token 27. The token 27 in turn authenticates itself according to an authentication procedure and produces the ticket to the user front end 208. The user front end 208 links this ticket with the user ID and sends this linked ticket to the service provider front end 205, which issued the ticket. The service provider front end 205 then links both the user ID and service provider ID and the dispersed data storage management system 210 for the data that corresponds to this ID pair. Finally the data is retrieved and sent to the service provider agent 220.

With specific reference to the information sequence diagram of FIG. 12B, at message 730 the user begins the interaction with the service provider agent 220 by initiating some action that, in the service being provided to the user, requires authenticating the user; e.g., sending an HTTP request (e.g., by pressing the image of an HTML authentication button on the webpage of the service provider agent 220).

At message 732 the service provider agent 220 requests a ticket from its service provider front end 205. It is assumed that the service provider agent 220 is already authenticated in the service provider front end 205. The service provider front end 205 knows the service provider ID and, therefore, (optionally) a human-readable presentation of the service provider's name, e.g. "bookstore". This human readable presentation, optionally together with a service provider agent-provided purpose in demanding authentication, may be included in the ticket issued by the service provider front end 205. The ticket issued by the service provider front end 205 may have, for example, the following form of a universal resource identifier:

spname:nonce@host:port where spname is the human-readable presentation of the service provider (e.g., bank name, airline name, etc.), nonce is a number used once (e.g., any sequence which makes the ticket unique), and host:port denotes the Internet address of the service provider front end 205. In the present example the ticket may be:

bookstore:687@spfe.net:4567

Other parameters may also be present in the ticket.

At message 734 the service provider front end 205 sends the ticket to the service provider agent 220.

At message 736 the service provider agent 220 relays the ticket to the user terminal/token interface 222, which presents the ticket to the token 27. If the token 27 is equipped with a display (see FIGS. 8B, 8C, 8D), the token can extract the service provider's name from the ticket and show this name (e.g., "bookstore") and purpose to the user. Alternately a token 27 without a display may transmit the name and purpose to the user terminal/token interface 222 for display. This step helps assure the user that the service provider has been checked and verified by the A&DDS system, and reduces possibilities for phishing attacks.

The user then presses the consent button on the token 27 to start the token authentication procedure. Alternately a token 27 without a consent button may employ the user terminal/token interface 222 to obtain consent from the user. The authentication of the token 27 may be the same procedure described in connection with FIG. 12A at messages 701 through 709 (illustrated in FIG. 12B as messages 738). The one difference is that the ticket is transferred from the token 27 to the user front end 208 (message 740) as opposed to vice versa once authentication has been completed.

At message 742, using the host:port part of the ticket to address the corresponding service provider front end 205, the user front end 208 now sends the ticket and user ID (received from the token 27 during messages 738) to the service provider front end 205 that issued the ticket.

At message 744 the user front end 208 receives from the service provider front end 205 confirmation of successful ticket receipt.

At message 746 the user front end 208 relays this confirmation to the token 27 via the user terminal/token interface 222.

At message 748 the token 27 sends the confirmation via the user terminal/token interface 222 to the service provider agent 220.

At message 750 the service provider agent 220 sends a request GETDATA(ticket) to the service provider front end 205 for the data. The request includes the ticket received with message 734.

The service provider front end 205 receives the data request. The service provider front end 205 has the user ID (from message 742) and service provider ID (received during its authentication procedure with the service provider agent 220). The service provider front end 205 can combine both IDs to obtain the data container identifier as discussed above. At message 752 the service provider front end sends the data container identifier as part of a READ request to the dispersed data storage management system 210 (i.e., READ(data container identifier)).

At message 754 the dispersed data storage management system 210 uses a data collector 242 to gather and assemble segments of the data container and sends the assembled data container back to the service provider front end 205.

At message 756, the service provider front end 205 sends the data container to the service provider agent 220 in the same form it was received from this service provider agent 220; e.g., in encrypted or unencrypted form.

As should be appreciated based on the foregoing description the user ID parameter stored in the token's memory is very sensitive from a security point of view. It is used to retrieve data from the dispersed data storage system 216. The alternative embodiments discussed below in connection with FIGS. 12C and 12D allow the user ID to never leave the token. In contrast many service providers are associated with public businesses or applications with widespread visibility for which anonymity is not a concern. In these cases the corresponding service provider ID may not be as sensitive from a generic security point of view.

Figure 12C:
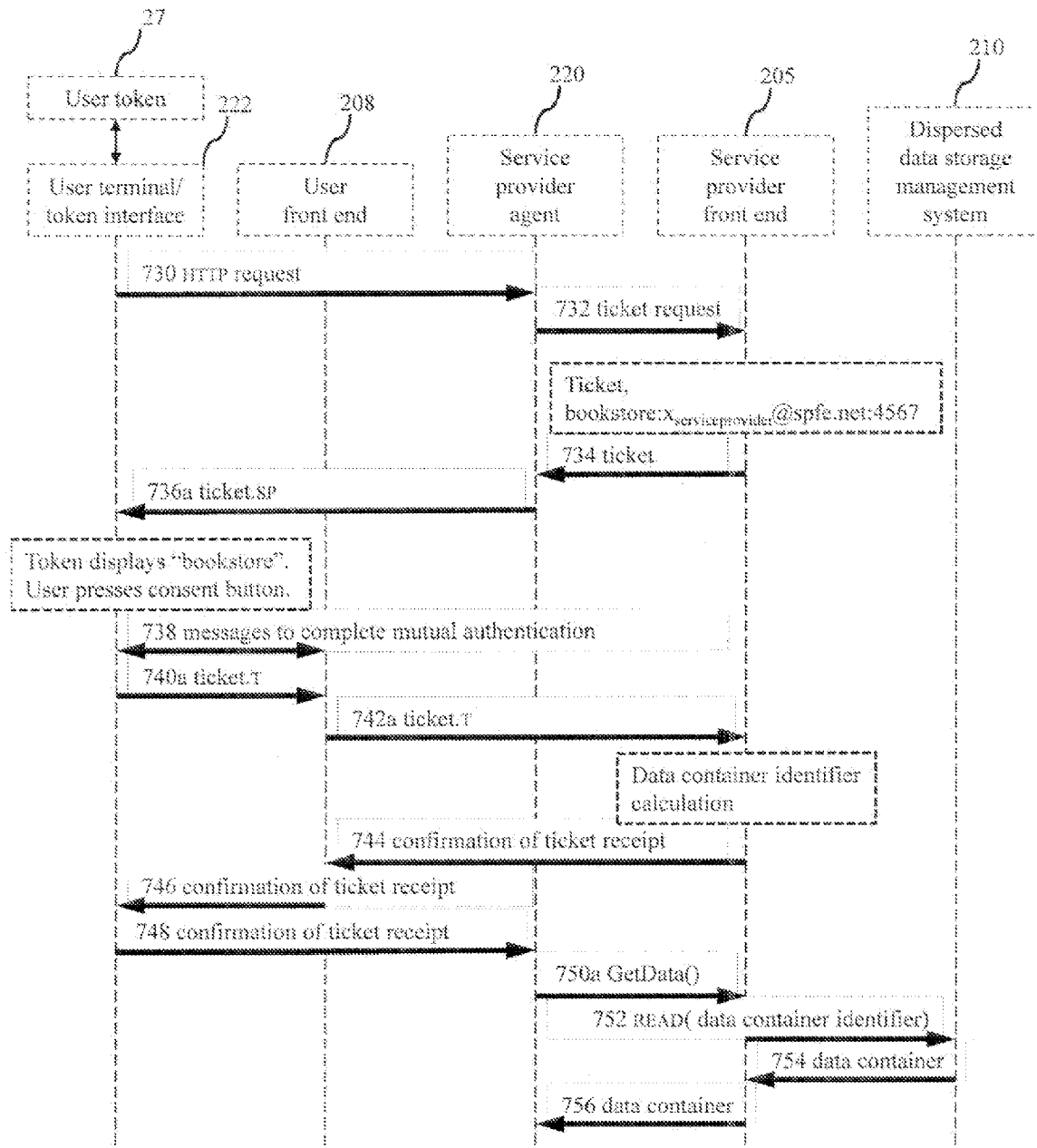
FIGS. 12C and 12D are alternative embodiments of the message sequence chart of FIG. 12B.

FIG. 12C illustrates an alternative embodiment of the message sequence diagram of FIG. 12B. This embodiment provides enhanced protection of both the user ID and the service provider ID that are used in deriving the data container identifier that is used in retrieval of the data by the dispersed data storage management system 210. This embodiment uses the nonce portion of the ticket (shown as number "687" in FIG. 12B and generically as x in FIG. 12C) in a specialized way as described below. Messages from FIG. 12C that are identical to those in FIG. 12B are identified with the same reference number and modified messages are identified with the corresponding reference number from FIG. 12B with an appended "a".

With specific reference to the information sequence diagram of FIG. 12C, messages 730, 732 and 734 are unchanged. The service provider front end 205, however, generates a pair of nonces x and y before sending the ticket message 734 rather than just one nonce. The value of x is a random number; the value of y depends on the value of x. x is sent to the service provider agent 220 in the ticket message 734 as part of the field bookstore:x@spfe.net: 4567, but y is kept as a secret in the service provider front end memory.

After receiving the ticket message 734, the service provider agent 220 does not simply forward the ticket to the user terminal as in FIG. 12B. Rather, the service provider agent 220 modifies x according to the following formula:

$$x_{service\ provider} = f_1(\text{service provider ID}, x)$$

At message 736a the service provider agent 220 sends $x_{service\ provider}$ in the modified ticket ticket. SP in the field bookstore: $x_{service\ provider}$@spfe.net:4567. The user terminal/token interface 222 receives ticket. SP and presents it to the token 27. The token 27 modifies $x_{service\ provider}$ to derive:

$$x_{token} = f_2(\text{user ID}, x_{SP})$$

The token 27 provides a modified ticket ticket.T containing the field bookstore: $x_{token}$@spfe.net:4567 to the user terminal/token interface 222, which forwards this ticket. T to the user front end 208 in message 740a.

The user front end 208 forwards this ticket. T in message 742a to the service provider front end 205. When the service provider front end 205 receives ticket.T, the final calculation is performed:

$$\text{data container identifier} = f_3(x_{token}, y)$$

The functions $f_1$, $f_2$ and $f_3$ along with the values of the pair (x, y) ensure that the data container identifier depends only on the user ID/service provider ID pair, and not on x or y, and that the data container identifier is unique for all service provider ID/user ID pairs. y serves to remove the influence of x on the output of $f_3$.

One possible implementation of the above protocol is based on the Paillier Cryptosystem. To use this algorithm two constant parameters are required. The first is a Paillier Cryptosystem public key (known to all participants) and some constant number c, used because Paillier cannot encode negative numbers. c introduces an offset in a data container identifier, e.g., $$\text{service provider ID}|\text{user ID}+c$$

thus accounting for Paillier features while leaving a unique data container identifier. In this case the service provider front end 205 obtains or generates a random number y, encrypts it with a Paillier public key to form random number x and sends the number to the service provider agent 220 in message 734a. The service provider front end 205 records y for later use. Thus the random number x corresponds to an encrypted version of y, i.e., $$x = f_{encrypt}(y, \text{Paillier public key}) \equiv (\text{Paillier public key})^y$$

The public key for decryption is known to the locations participating in the procedure. The service provider agent 220 also uses a bit-shifted version of the service provider ID. Specifically the service provider agent 220 bit-shifts the service provider ID by the number of bits in the user ID:

$$\text{SPID}_{shifted} = \text{service provider ID} \times 2^{bit\ length\ of\ user\ ID}$$

The service provider agent does not know the user ID but does know the number of bits in the user ID. (As a consequence of this bit-shift:

$$\text{SPID}_{shifted} + \text{user ID} = \text{service provider ID}|\text{user ID}$$

Assume the service provider ID is 110011 and the user ID is 010101. If one were to concatenate these IDs, the service provider ID would be left-shifted six bit positions, the number of bits in the user ID, to become 110011000000. Adding the user ID to this value would equate to the concatenation of service provider ID and user ID: 110011010101.) The service provider agent 220 multiplies the encrypted result of the bit shift $\text{SPID}_{shifted}$ by x to form $x_{service\ provider}$:

$$x_{service\ provider} \equiv f_1(\text{service provider } ID, x)$$
$$\equiv x \times f_{encrypt}(SPID_{shifted}, \text{Paillier public key})$$
$$\equiv f_{encrypt}(y, \text{Paillier public key}) \times$$
$$f_{encrypt}(SPID_{shifted}, \text{Paillier public key})$$
$$\equiv (\text{Paillier public key})^y \times (\text{Paillier public key})^{SPID_{shifted}}$$
$$\equiv (\text{Paillier public key})^{y+SPID_{shifted}}$$

All multiplications are modulus operations. The token 27 then encrypts the user ID with the public key and multiplies the result by $x_{service\ provider}$ to derive $x_{token}$:

$$x_{token} \equiv f_2(\text{user } ID, X_{SP})$$
$$\equiv x_{service\ provider} \times f_{encrypt}(\text{user } ID, \text{Paillier public key})$$
$$\equiv (\text{Paillier public key})^{y+SPID_{shifted}} \times (\text{Paillier public key})^{user\ ID}$$
$$\equiv (\text{Paillier public key})^{y+SPID_{shifted}+user\ ID}$$
$$\equiv (\text{Paillier public key})^{y+(service\ provider\ ID|user\ ID)}$$

The service provider front end 205 performs the final transformation by encrypting the difference c−y and multiplying the result by what it received from the token 27, thus obtaining a data container identifier:

$$\text{data container identifier} \equiv f_3(x_{token}, y)$$
$$\equiv x_{token} \times f_{encrypt}(c - y, \text{Paillier public key})$$
$$\equiv (\text{Paillier public key})^{y+(service\ provider\ ID|user\ ID)} \times$$
$$(\text{Paillier public key})^{c-y}$$
$$\equiv (\text{Paillier public key})^{(service\ provider\ ID|user\ ID)+c}$$

Per the foregoing description, the service provider front end 205 can derive the data container identifier without the user ID being transmitted through the system. The data container identifier can be derived by the service provider front end 205 after receipt of message 742a.

Messages 744 through 750 are used only to synchronize the user terminal/token interface 222 (i.e., the browser) and the service provider agent 220 (i.e., the HTTP server). Messages 744 through 748 and 752 through 756 are identical to those discussed above in connection with FIG. 12B. Message 750a is simply a GETDATA( ) request as no ticket is required.

Figure 12D:
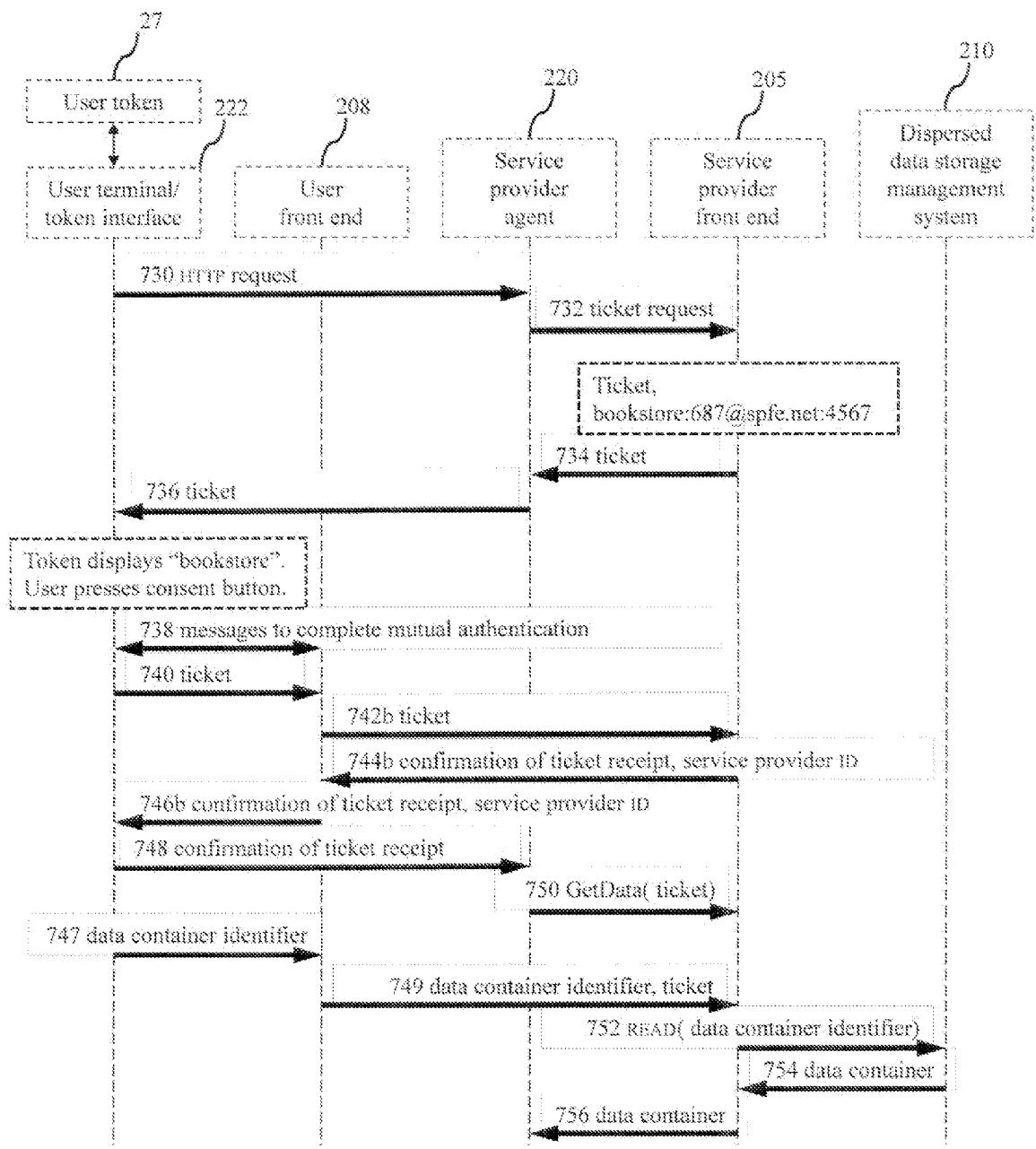

FIG. 12D illustrates a second alternative embodiment of the message sequence diagram of FIG. 12B. In this embodiment, the token 27 calculates the data container identifier using the service provider ID and the user ID. As such, the user ID does not have to be transmitted outside of the token 27. Messages from FIG. 12D that are identical to those in FIG. 12B are identified with the same reference number, and modified messages are identified with the corresponding reference number from FIG. 12B with an appended "b". Additional messages 747 and 749 are also illustrated.

With specific reference to the information sequence diagram of FIG. 12D, messages 730, 732, 734, and 736 are unchanged. The token authentication process illustrated by messages 738b is the same as that described above for messages 738 of FIG. 12B only the user ID is not transmitted from the token 27 to the user front end 208. Message 740 is unchanged. The ticket (and not the user ID) is sent from the user front end 208 to the service provider front end 205 in message 742b.

At message 744b the service provider front end 205 sends the service provider ID to the user front end 208.

At message 746b the user front end 208 sends this service provider ID to the token 27 via user terminal/token interface 222.

The method sends messages 748 and 750 as with the method of FIG. 12B. In parallel, however, the token 27 calculates the data container identifier using the received service provider ID and its own internally stored user ID. Optional additional codes may be used to determine the data container identifier. The token 27 sends this data container identifier to the user front end 208 in message 747, which in turn sends the data container identifier to the service provider front end 205 with the ticket in message 749.

Messages 752, 754 and 756 are unchanged from the description of FIG. 12B.

Key Management:

The key management system 212 is responsible for generating new tokens 27 and initial registration of those tokens in the system. The key management system 212 is also responsible for token deactivation and token replacement.

Figure 13:
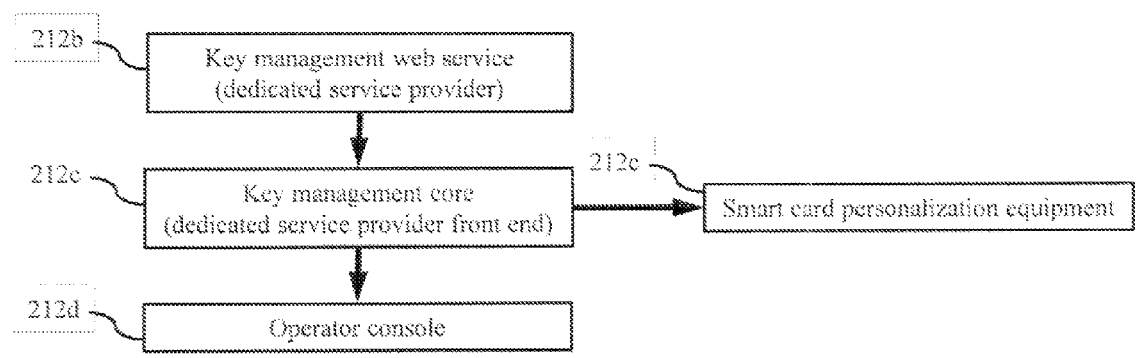
FIG. 13 illustrates the components of an embodiment of a key management system.

In one exemplary embodiment the key management system 212 is a multi-part system as illustrated in the block diagram of FIG. 13. The key management system 212 includes smart card personalization equipment 212a. In embodiments the smart card personalization equipment 212a is a special-designed computerized machine that produces smart cards and writes data into smart card memory. This smart card personalization equipment 212a is controlled by the key management core 212c, which services commands from an operator's console 212d (e.g., requests to produce new batches of tokens). Another source of requests to produce new tokens comes from the key management web service 212b (e.g., token replacement requests) or other similar program.

For security reasons it is preferred that user IDs are not stored in the system. Therefore a master token 260 is used to replace lost or compromised tokens 27. The master token 260 holds the information needed to replace an old token 27 (e.g., a representation of token ID, user ID and the optional data encryption key(s)). When a user is authenticated in the system with his master token 260, a new token 27/master token 260 pair may be generated and sent to the user. At the same time the previous working tokens 27 are deactivated (e.g. by triggering a deactivation flag for the token ID in the data container associated with that token 27 and the authentication service).

Figure 14:
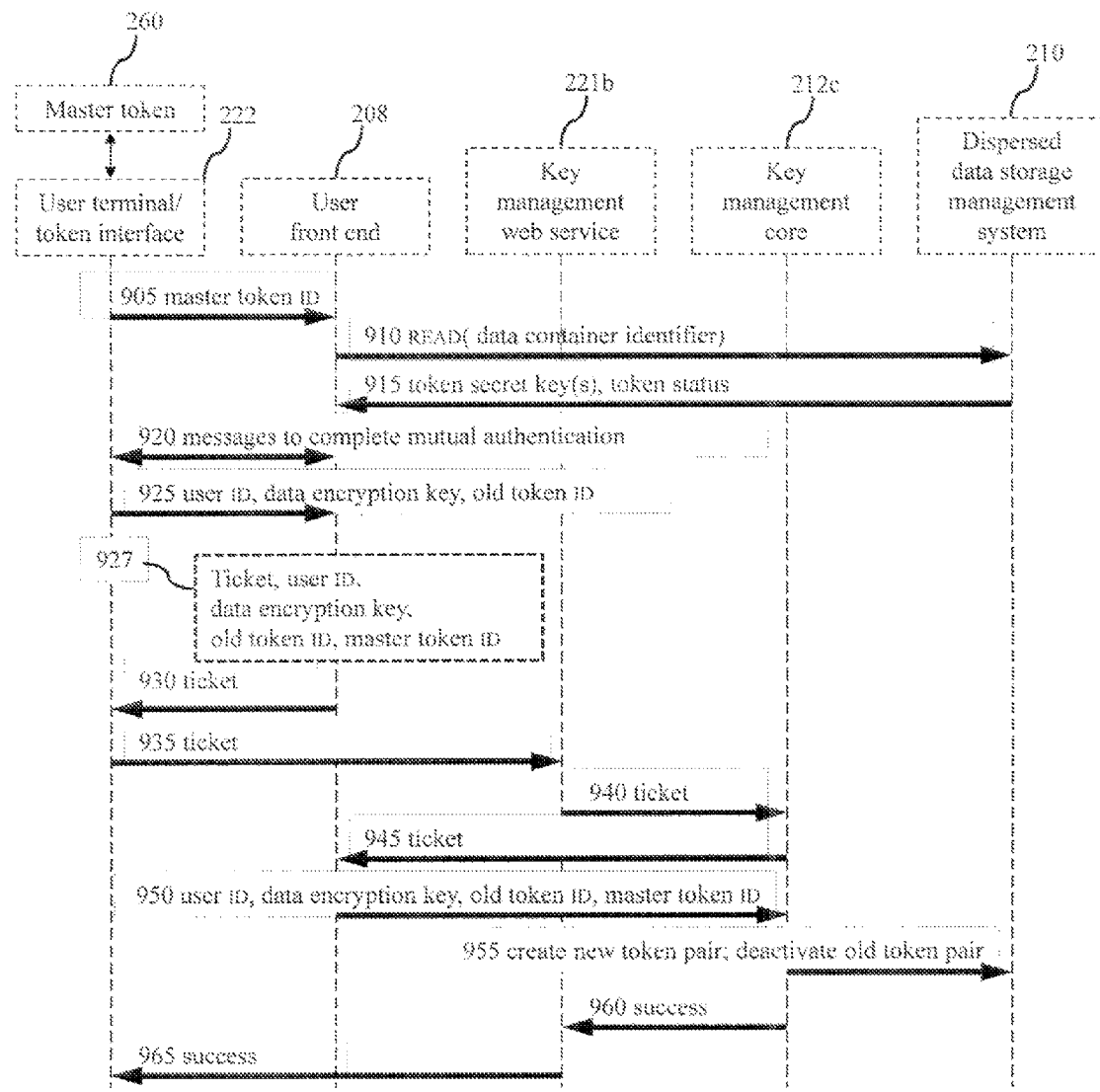
FIG. 14 is message sequence chart illustrating a method of generating and issuing a new token pair for replacement of a token.

FIG. 14 is a message sequence for replacement of a token 27. The procedure is quite close to that depicted in FIG. 12A. To deactivate a lost or stolen token 27, the user directs the browser of the user terminal/token interface 222 to the key management service webpage (provided by the key management web service 212b of key management system 212) and authenticates himself using his master token 260. Similar to message 701 of FIG. 7A, at message 905 the master token 260, through the user terminal/token interface 222, provides a master token ID to the user front end 208.

Like message 703 of FIG. 12A, at message 910 the user front end 208 calculates a data container identifier from the TSPID and the master token ID. The user front end 208 sends this data container identifier to the dispersed data storage management system 210 with a READ request; i.e., READ(data container identifier).

The dispersed data storage management system 210 uses the data container identifier to retrieve the data container containing the master token 260's secret key(s) and token status from the dispersed data storage system 216. At message 915 (like message 705 of FIG. 12A), this information is sent to the user front end 208 as part of a data container.

Messages 920 to complete mutual authentication, like messages 707 of FIG. 12A, are then exchanged between the user front end 208 and the token 27.

When compared to the encrypted message 709 (FIG. 12A), encrypted message 925 carries additional information: the token ID, user ID, and the optional data encryption key and the algorithm identification of the token 27 to be replaced. This additional information and the master token ID are stored in the ticket 927.

Messages 930 through 945 show the ticket path through the system and are fully equivalent to messages 711 through 717 of FIG. 12A except that the key management core 212c replaces the service provider front end 205. In fact, the key management core 212c can play the role of a service provider front end for key management web service 212b, which in turn can be considered as a service provider. The difference, however, is that after production of a ticket, the key management core 212c receives from the user front end 208 not only the user ID and optional data encryption key/algorithm, but also the ID of the token 27 to be replaced (message 950).

At this point in the sequence the key management system 212 has all the information necessary to produce a new pair of tokens (a normal everyday token 27 and master token 260) that will point to the same user ID. New token IDs and secret keys are generated for the pair of tokens 27, 260 and this information is written into new tokens 27, 260 by the smart card personalization equipment 212a. As illustrated by message 955, a new token record is provided to the dispersed data storage management system 210 and any old tokens 27, 260 will be marked as deactivated. Message 960 reports the success/failure status of the operation to the key management web service 212b for communication back to the user terminal/token interface 222 in message 965.

Security Measures:

A number of measures are taken in the system to keep authentication secrets and data as safe as possible. First, identifiers (i.e., token ID, service provider ID, user ID) used in the system should be long integer numbers; for example, at least 64 bits in length. Those numbers are produced by a random number generator. This makes it difficult to find existing identifiers by an exhaustive search method. Second, all data exchange is preferably secured with secret keys that are at least 128 bits long. Furthermore, data container identifiers are one-way ciphered (e.g., encrypted) with resulting name lengths being more than 512 bits. It is impossible (in any practical manner) to restore the user ID and/or service provider ID from a data container identifier. Data itself may be stored in encrypted form with secret keys that are hashes of the service provider ID and the user ID and that are known to the system only for the active period when the user communicates with the system. Moreover, as a service provider option, data containers may be ciphered (e.g., encrypted) by the service provider before they are sent to the A&DDS system. Finally, in embodiments, the A&DDS system does not store (on any permanent basis) the service provider ID assigned to a given service provider or the user ID assigned to a token. As such, the A&DDS system by itself cannot gain access to a data container associated with a service provider ID/user ID pair without the service provider and token going through the requisite authentication procedures. That is, since the A&DDS system does not separately maintain lists of user IDs and service provider IDs, neither it nor unscrupulous other parties can derive the data container identifier needed to recover or retrieve the data container.

Examples of Use:

An exemplary use of the A&DDSM system described herein is for providing third party authentication services in a service provider/user transaction and for safely storing the user's profile data on behalf of the service provider. A typical service provider/user interaction would be between a vendor (e.g., on-line bookstore) and a user who has an account with the vendor. The user accesses the vendor's website, presents the token, the authentication procedure is performed and if the user is authenticated, the data container containing the user's profile data (e.g., name, account information, customer loyalty information, billing information, etc.) is retrieved for use by the vendor. When the transaction is completed, the data can be updated and the vendor sends the data container back to the A&DDS system for safe storage. In another typical use of the system, the user can present the token to a suitable terminal at the physical store of the vendor. The authentication procedure is again performed and, if authentication is successful, the data container containing the user's profile information is retrieved. When the transaction is completed, the data can be updated and the vendor sends the data container back to the A&DDS system for safe data storage. This application relieves the user of the need to carry multiple loyalty cards for multiple vendors.

On-Line Retailer Example:

Application of the system in an on-line retail environment is now discussed. In this example there are three participants in the system: (1) the on-line retailer; (2) the customer (e.g., the individual that shops with the on-line retailer); and (3) the third-party authenticator (i.e., the entity that runs the A&DDS management system 204.

The customer establishes an account with the third-party authenticator and the third-party authenticator issues one or more tokens 27 and a master token 260 to the customer. For example, in the case of hardware tokens, these tokens are mailed to the customer. If the token is an application that runs on the customer's smart phone or personal data assistant, the token application is downloaded to the device by the customer. The tokens 27 include the user ID and encryption key(s) discussed above, and the master token 260 includes the user ID, master token ID and encryption key(s) discussed above. A data container is stored in the system corresponding to each token, including the key(s) for token authentication and token status. This data container is accessed using the token ID and another data element (e.g., service provider ID of the third-party authenticator).

The on-line retailer also establishes a relationship with the third-party authenticator to provide third-party authentication services and third-party data storage for the on-line retailer. The third-party authenticator provides any necessary software and tokens for communications with the A&DDS system and provides the service provider ID to the on-line retailer. The on-line retailer then adds an icon or other selectable link on its website.

In this example, it is assumed that the customer has established a relationship with (i.e., registered with) the on-line retailer. That is, the customer has at some point provided user information to the on-line retailer, which the on-line retailer uses to create a customer profile associated with the customer. This customer profile can include information such as customer name, address, customer account number, financial instrument information (e.g., credit card number and billing address), account username, customer preferences, and the like. Note that there is no need for a user password as the user has already been authenticated. Over time, the on-line retailer can supplement this information with historical information such as the customer's purchase history, trends and preferences, loyalty status, etc. The on-line retailer provides this information to the third-party authenticator as a data container for storage in the dispersed data storage system 216. This data container is identified and retrieved using a data container identifier, which is derived from the service provider ID assigned to the on-line retailer and the unique user ID stored in the token 27 issued to the customer. The process for initial creation of a data container is identical to requesting a data container (i.e., READ command) except messages 721 (FIG. 12A) and 752 (FIGS. 12B, 12C and 12D) send the data container identifier with a CREATE rather than READ request. In response to the CREATE request, a data container is created at location specified by the data container identifier. Data for initial storage in the container can also accompany the CREATE request.

The customer accesses the website of the on-line retailer and clicks on the authentication icon (or link) displayed on the webpage. Optionally, a new webpage is displayed prompting the customer to present the customer's token, such as by connecting the token to the USB interface of the customer's home computer. The name of the on-line retailer may be displayed on the customer's token, and the customer hits the consent button on the token. The authentication procedures discussed above for authenticating the token (and thus the customer) and the service provider are performed amongst the customer's token, the service provider ID of the on-line retailer and the A&DDS system operated by the third-party authenticator. Assuming the on-line retailer and the customer have been properly authenticated, the third party authenticator uses a data container identifier (derived using the user ID of the customer's token and the service provider ID assigned to the on-line retailer) to retrieve and/or reconstruct from the dispersed data storage system 216 the data container associated with the on-line retailer/customer pair and transmits this data container to the on-line retailer. The data container contains the customer's user profile. As such, the identify and user information of the customer is revealed to the on-line retailer and can be used in interacting with the customer and performing transactions (e.g., purchases). If no changes are made to the data, the session can terminate (with no changes to the data container in the dispersed data storage system 216) or the received data can be written back into the dispersed data storage system 216 with a WRITE request.

Point-of-Sale Retailer Example:

The system operates in much the same way with commerce applications that are not electronic, e.g., where the customer visits the retail location of the service provider. In this example, assume the service provider is a retail bookstore (Retail Bookstore). Rather than the customer logging into a website, the customer presents the customer's token to a token interface connected to the Retail Bookstore's point-of-sale terminal or kiosk. The point-of-sale terminal acts as the customer's user terminal (i.e., home computer) and communicates between the token and the user front end 208 of the third party authenticator's A&DDS system. Authentication of the customer and the Retail Bookstore is performed as described above and if successful the third party authenticator retrieves the data container associated with the Retail Bookstore/customer pair and provides the data container to the Retail Bookstore. For example, the data container is provided to the Retail Bookstore's system for display to the retail associate with the point-of-sale terminal. As such the identity of the customer, billing information, loyalty status, etc. are available to the retail associate.

Employee Rights to Access Resource Example:

The service provider may choose to trust the A&DDS management system 204 with storing data associated with a specific user. Alternatively, in cases where the service provider already has a large investment in a reliable database and does not want to redesign its core technologies, it is possible to store within the dispersed data storage system 216 only certain pieces of information, such as the service provider's local IDs that it associates with the presented user. It should be understood that this form of data need not necessarily be, but may be, stored in a dispersed format. This particular approach can be used to allow employers to authenticate their employees and provide access to secure corporate resources. The employer/corporate entity is considered the service provider and the employee is the user. The employee can use the same token 27 at work that the employee uses for other service providers (e.g., on-line retailers). If the employee does not already have a token, then one can be provided. The token can be used to gain access to secure areas (e.g., to gain access to the building, restricted floors, etc.) and to log-in to the corporate network.

When the user plugs (or otherwise interfaces) the token into her work computer, the authentication process described above is performed. The data container identifier, which is derived using the user ID assigned to the employee and the service provider ID of the employer, is used to retrieve from the A&DDS system of the third party authenticator the employee's local ID for the employer's system. The employer's system has built-in authorization procedures it follows to determine what resources this employee can access.

The employer benefits in a number of ways. For example, assuming the employee also uses the token in the employee's personal life (e.g., in on-line and point of sale transactions), the token has more value for the employee than a typical corporate access device (e.g., key fob). The employee, therefore, will be careful not to leave the token connected to his or her computer during lunch, etc. Moreover, to the extent the employee already has a token, there is no cost to the employer for supplying the token. There is also no need to return the token when the employee departs the company since there is nothing on the token itself concerning the employer. When the employee leaves the company, the system administrator simply changes the authority level associated with the employees internal ID. No changes in the data stored by the A&DDS management system 204 are required to effectively lock the employee out.

While the data storage aspects of the system have been described above principally in connection with safe storage of private data, it should be understood that the system is not so limited. Rather, the system can used to store, and provide authentication services in connection with, any protected resource. The resource may be a software application, an object or place, a document, a webpage, a file, executable code, or other computational resource, communication-type resource, etc. that is only accessed or retrieved if the user and service provider are both authenticated. Possible applications of the technology described herein also include, but are not limited to:

a) use of Internet resources;
b) authorization for use of software programs or hardware (e.g., to get an access to a program, or to special features, as a service);
c) loyalty cards and other customer identification means in stores, restaurants, etc.;
d) transport cards (e.g., public transit, ski lifts, etc.);
e) use of safe storage of credit/debit cards account information and/or facilitating secure internet payment or other secure financial transaction (e.g., brokerage transaction);
f) secure access identification systems for entrance to buildings, logging into work, and the like;
g) post-financial transaction transactions, such as a proxy for boarding passes, e-badges, tickets (e.g., movie or concert tickets);
h) personal healthcare information management and access;
i) integration of the backend storage system with existing authentication and identification systems;
j) secure and anonymous electronic elections, voting, etc.;
k) centralized documents storage for driver's license and other personal data;
l) digital signature and security certificates;
m) authorization for micropayments, pay-as-you-go, or pay-per-use;
n) user-to-user connections, e.g., business cards exchange;
o) billing systems, such as precise, up to the second registration of a service provider (e.g., attorney) time dedicated to a particular user's matter;
p) e-mail spam elimination, meaning only authenticated entities (service providers or customers) can send email messages to other authenticated entities;
q) authentication at corporate networks and workstations; and,
r) storage of mail certificates which allow a user to use a mail agent (e.g., Mozilla Thunderbird™ agent or Microsoft Outlook®) on any computer.

Token Management

As noted above in relation to FIG. 13, a token owner (e.g., a natural person, machine, or application within a machine acting as a user or a service provider) employs a token management service (e.g., Key Management engine 212) to generate new tokens, register the new tokens, activate tokens, deactivate tokens, and replace tokens. In some examples, a token owner accesses the token management service via a web application (e.g., by accessing a secure website). Using the token management service, a token owner can manage the tokens associated with his/her account.

Figure 15:
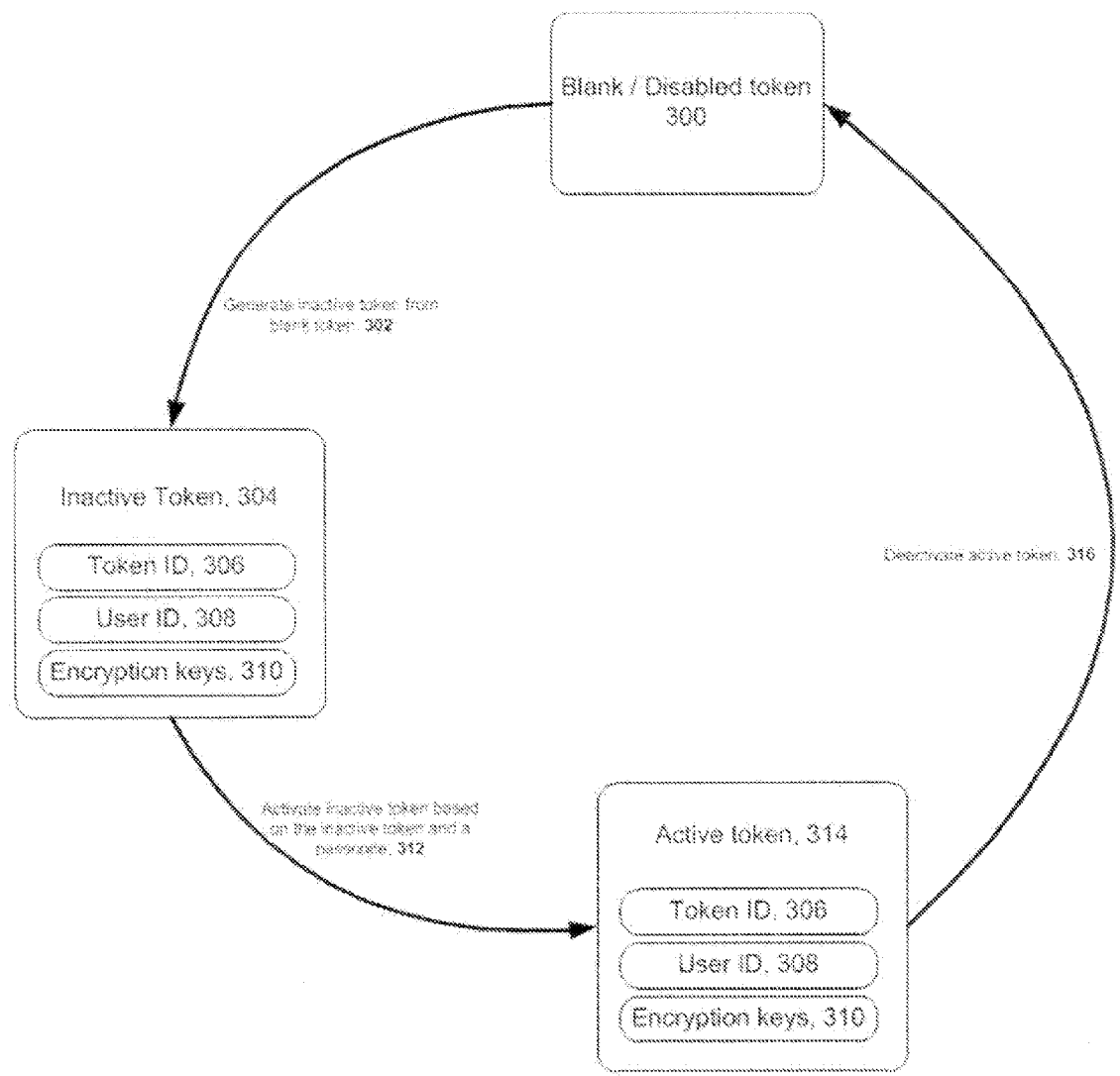
FIG. 15 shows an exemplary token lifecycle.

FIG. 15 depicts an overview of an exemplary token lifecycle. The lifecycle of a token begins with a blank token 300. The blank token 300 may or may not have firmware loaded thereon. A token owner cannot use the blank token for authentication or to access information. Rather, a blank token 300 is a device that can become an active token if the correct information is loaded onto the token.

As described in more detail to follow, a blank token 300 can be transformed (302) into an inactive token 304. An inactive token 304 is a token that has been individualized and associated with a particular token owner. To individualize a blank token 300 a token ID 306 is assigned to the token. The token ID is a token specific parameter that identifies the token as described herein. To associate the token with an owner, a user ID 308 and encryption keys 310, and optionally encryption algorithm identifiers (not shown) are stored in the token (e.g., using one or more of the processes described herein). The user ID 308, encryption keys 310, and encryption algorithm identifiers are user-specific codes associated with the particular token owner.

While an inactive token has the token ID 306, user ID 308 and encryption keys 310 stored on the token, the token cannot be used to authenticate the token owner or to enable the token owner to enter a transaction (e.g., such as accessing stored information). In order to activate an inactive token (e.g., as shown in arrow 312), a token owner presents the inactive token 304 (with the stored token ID 306, user ID 308 and encryption keys 310) and provides a passcode to verify the authenticity of the token owner. The passcode can be a passcode assigned to the token owner when the owner creates its first token. As such, the passcode serves to verify that the individual requesting activation of the inactive token 304 is the individual associated with the user ID stored on the token. Requiring that the token owner enter a previously assigned passcode prevents a person not associated with the User ID who comes into possession of an inactive token from activating and using the token. Upon verification of the passcode, the inactive token 304 is activated and becomes an active token 314. As described herein, the active token 314 can be used to authenticate the token owner and to enable the token owner to enter various types of transactions.

In some situations, a token owner may desire to disable an active token 314. For example, if the token owner loses the token, the token is stolen, or the token is otherwise no longer securely in the token owner's possession, the token owner may desire to prevent use of the token. In order to prevent an active token from being used, a token owner can disable a token (e.g., as shown in arrow 316). A disabled token is considered to be a Blank token 300. While a blank token resulting from the deactivation of an active token, may have a token ID, user ID, and encryption keys stored on the token, the deactivated token cannot be used for any form of authentication. In some embodiments, a disabled token may be reused by overwriting existing information with a new token ID, user ID, and encryption keys as described above.

While in the example above after deactivation a deactivated token can be over-written and re-used, the ability to overwrite a token's contents can depend on whether the chip was "locked" after the initial load of firmware, IDs and encryption keys. Locking the chip can improve security. If locked and disabled, the token could not be reactivated.

Activating an Inactive Token

Figure 16:
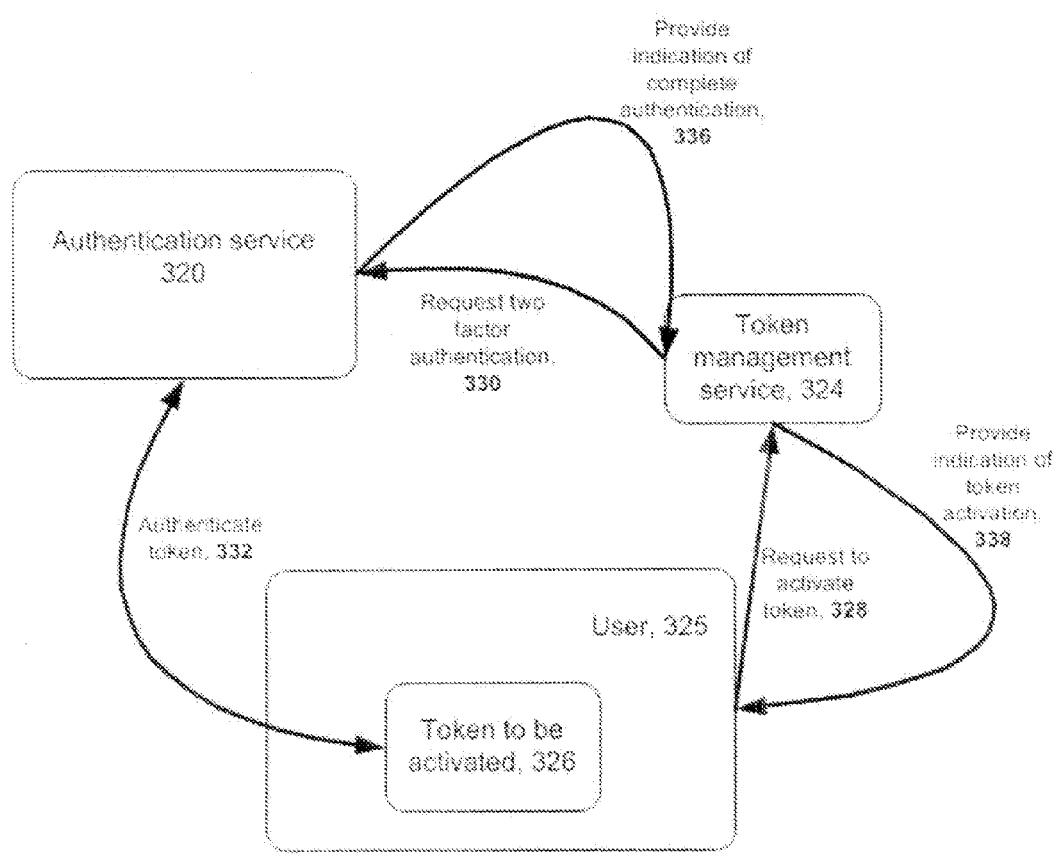
FIG. 16 shows an exemplary token activation process.

FIG. 16 depicts an overview of a data flow for activating an inactive token. As noted above, an inactive token has a token ID, user ID, and encryption keys stored thereon, but is not active in the system and therefore cannot be used for authentication or to enter a transaction. The activation process begins with a token owner 325 in possession of an inactive token (e.g., token 326). The token owner 325 submits a request to a token management service 324 to activate the token 326 (arrow 328). Upon receiving the request, the token management service 324 sends a request to an authentication service 320 to authenticate the token (arrow 330) with two factors—token authentication and passcode authentication. The authentication service 320 performs an authentication process to authenticate the token (arrow 332). During the authentication, the authentication service 320 requests that the token owner 325 enter their previously assigned passcode. The token owner 325 enters their passcode and the passcode is transmitted to the authentication service 320. The authentication service verifies the passcode is correct (e.g., based on a comparison of the entered passcode and a stored passcode associated with a user ID for the token owner). If the passcode is correct, the authentication service activates the token and provides an indication to the token management service 324 that the authentication of the token was successful (arrow 336). The token management service 324 provides an indication to the token owner 325 that the activation of the token was successful and that the token is now active and can be used for authentication (arrow 338).

As seen in the process above, to increase the security of the system, the passcode is communicated only to the authentication service 320 and not to the token management service 324. By communicating the passcode to only the authentication service 320, the token owner's passcode can be protected and other entities will not be able to access a token owner's passcode.

In some embodiments, the passcode may be further protected by the authentication service by additional methods such as the following. The passcode entered by the user can be encrypted (e.g., within the token using the user encryption key and algorithm) and is provided to the authentication service only in this encrypted form. The authentication service compares the received encrypted passcode with a copy previously saved by the authentication service. This copy resides in the distributed secure storage in a data container located by an access code formed from the user ID and the authentication services service provider ID. Theft of the passcode by, for example, a key logger, video camera, or observer at a human owner's personal computer is of reduced utility as the thief cannot encrypt the passcode without the token. The authentication service lacks a list of passcodes (which would be more attractive to a thief) as each passcode is stored individually in a data container accessible only when the token is present at the token owner's machine. Additionally, the authentication service never receives/stores an unencrypted version of the passcode, nor does it hold the decryption key.

In some additional embodiments, the passcode entry can occur only on the token; e.g., by a human user via a keyboard on the token such as a keyboard integrated into a mobile telephone. This embodiment prevents theft of a passcode via a keystroke logger on to human user's personal computer.

Figure 17:
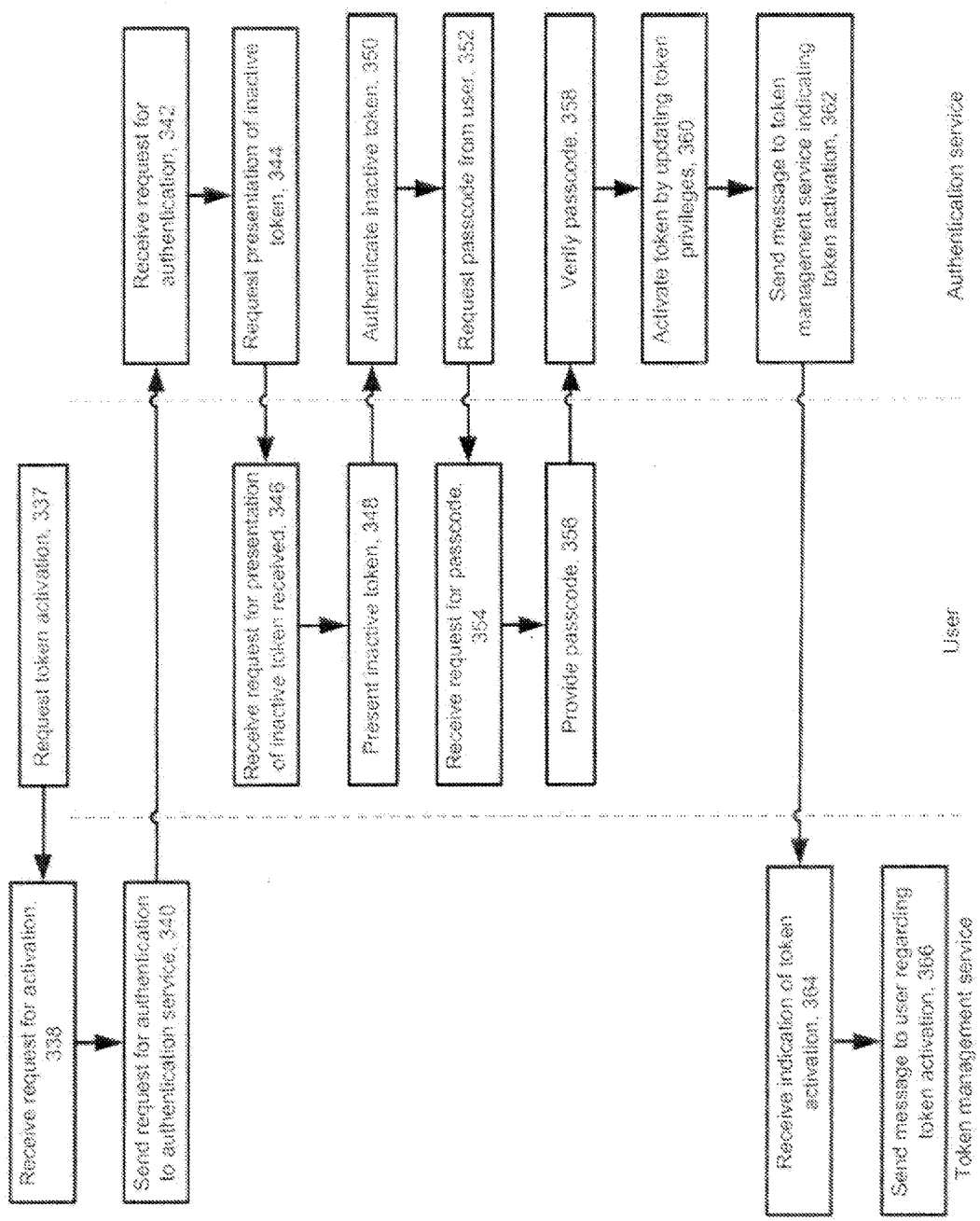
FIG. 17 shows an exemplary token activation process.
Figure 18:
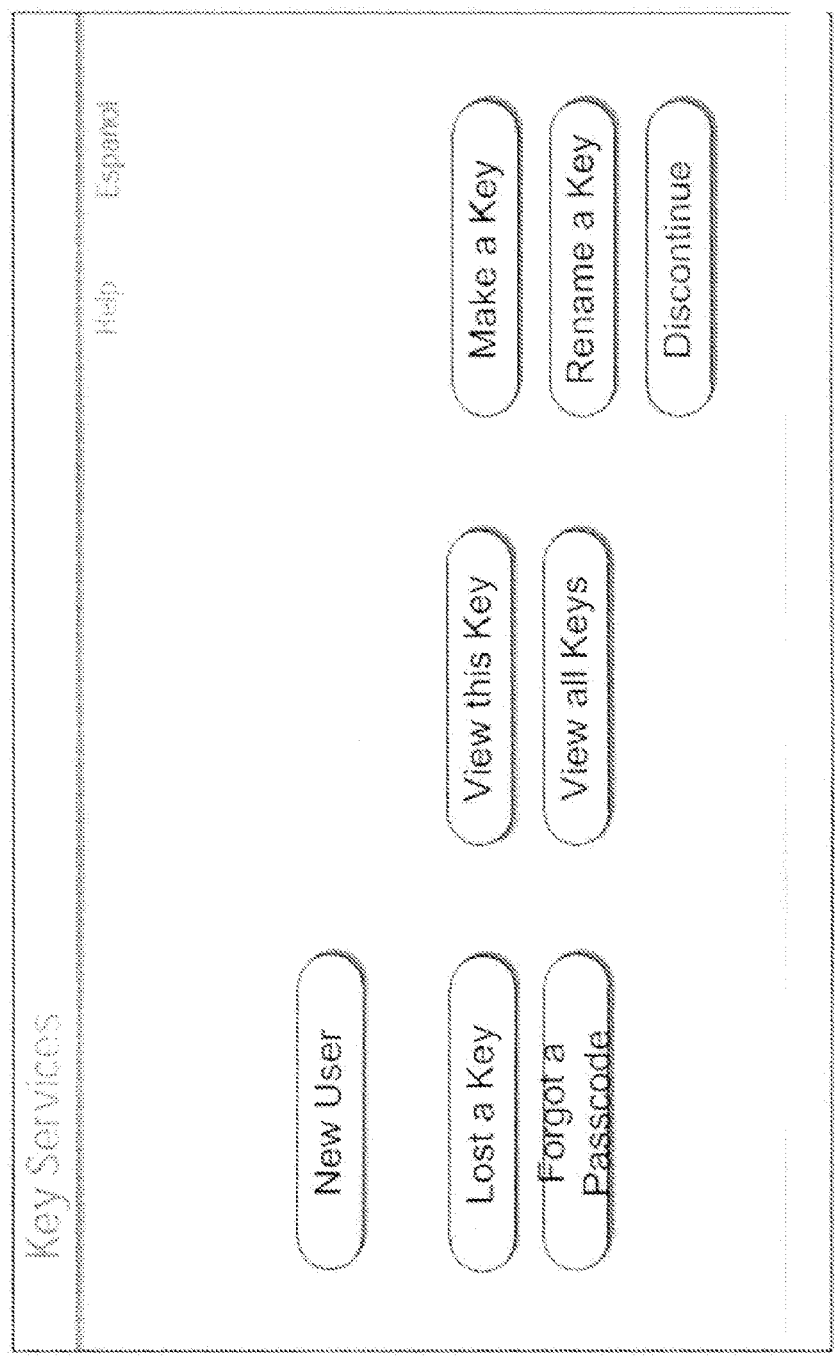
FIG. 18 shows an exemplary user interface for token management.

FIG. 17 shows a flow chart of an exemplary token activation process. The process begins with a token owner requesting to activate a token (block 337). For example, the token owner can navigate a web browser to a website of a token management service and select an option to activate a token. An exemplary user interface for selecting to activate a token is shown, for example, in FIG. 18. As seen in the example of FIG. 18, a token owner can begin the token activation process by selecting the link labeled "Make a Key". The token management service receives the request for authentication and activation of the token (block 338) and sends a request for two-factor authentication to an authentication service (block 340). The token management service sends the request to the authentication service rather than performing the authentication itself to protect the secrecy of the information stored on the token and the token owner's passcode which are used to activate the token.

In exemplary embodiments, the authentication service is separated from the token management service such that all requests for authentication, regardless of source (e.g., token management service, private secure storage service, and any other applications/service providers) are processed by the authentication service. Processing all authentication requests by a single authentication service is believed to provide various advantages. For example, presenting a single man-machine interface to human users can reduce the confusion and training that might otherwise occur if, for example, a multiplicity of applications were used an a variety of approaches were used to interrogate the user for the passcode. A centralized authentication service can re-verify that the application/service requesting the authentication of its counterparty is registered and entitled to obtain authentications; e.g., it not a phishing attack on the counterparty and had not fallen into arrears for paying for authentication services, etc. A centralized authentication service can also provide to the counterparty a suitable representation, of the registered and verified identify of the application/service requesting the authentication e.g., via a man-machine interface or application programmatic interface.

Figure 19:
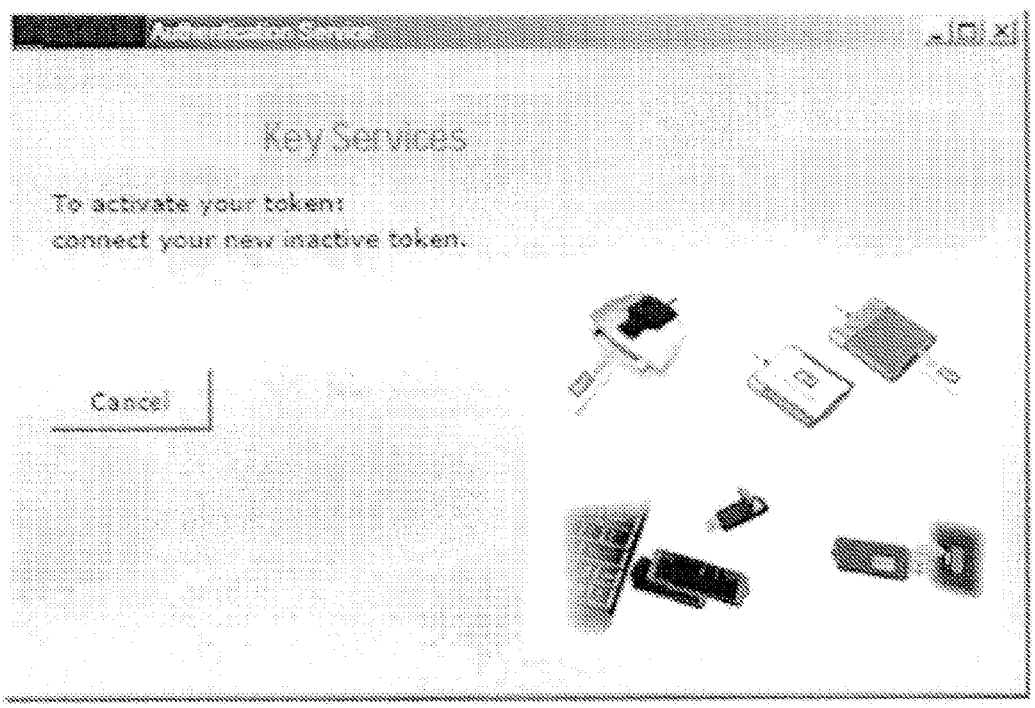
FIG. 19 shows an exemplary user interface for token activation.

The authentication service receives the request for two-factor authentication of the token (block 342) and sends a request to the token owner to present their token for authentication (block 344). As noted above, an inactive token has a previously assigned token ID and has the token owner's User ID and encryption keys stored on the token. The token owner receives the request for presentation of the token (block 346). For example, a user interface can be displayed to the token owner with a message requesting presentation of the token, e.g., "Token Manager wants to activate your token. Please present your token now if you wish to continue." An exemplary user interface for requesting presentation of the token by the user is shown, for example, in FIG. 19. As seen in the example of FIG. 19, the request for presentation of the token can include an indication of what service provider is requesting for the token owner to present their token—in this example, the token management service.

In response to the request from the authentication service, the token owner presents the token (block 348). For example, the token owner can place the token on a contactless interface or can connect the token to the Internet via a contact-based interface.

Upon presentation of the inactive token by the token owner, the authentication service authenticates the inactive token (block 350). During the authentication process certain information is exchanged between the token and the authentication service to verify the identity and authenticity of both the token and the authentication service. Exemplary authentication processes are described herein.

Figure 20:
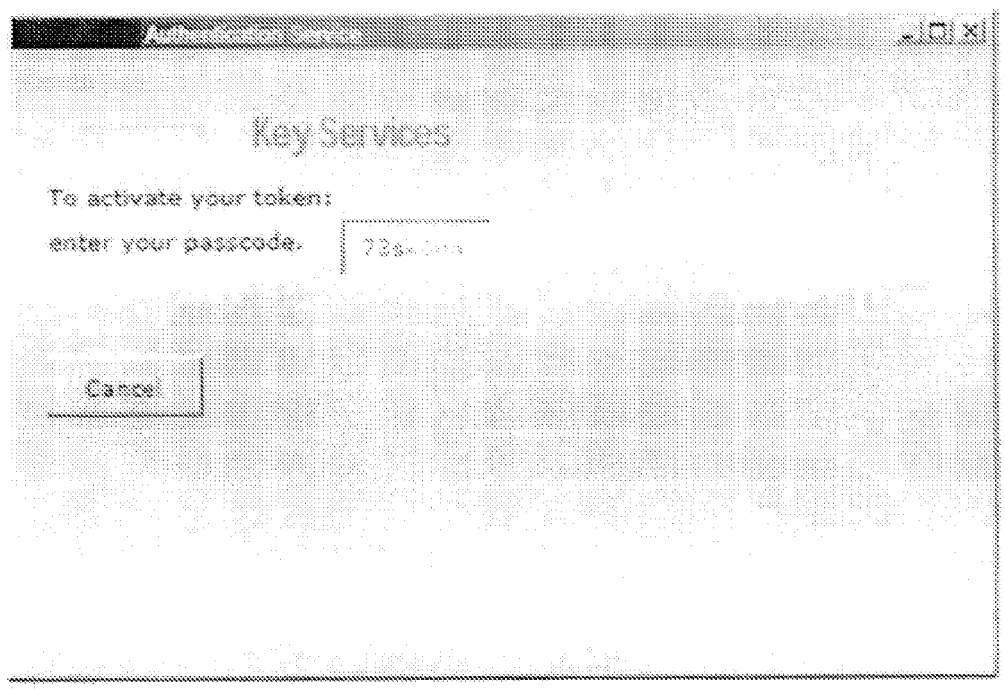
FIG. 20 shows an exemplary user interface for passcode entry.

Upon successful authentication of the inactive token by the authentication service, the authentication service requests a passcode from the token owner (block 352). The token owner receives the request for their passcode (block 354) and provides the passcode to the authentication service (block 356). For example, the authentication service can request the passcode by presenting a user interface to the token owner with a message requesting that the token owner enter his/her passcode, e.g., "To activate your token enter your passcode." An exemplary user interface for requesting entry of a passcode is shown, for example, in FIG. 20. As seen in the example of FIG. 20, the request for the passcode can include a user entry mechanism where the token owner can type the passcode. While in this example the passcode is entered via a user interface, other passcode entry methods can be used. For example, the passcode can be entered on a mobile device containing the token. In such examples, the request for the passcode is forwarded to the mobile device. The mobile device displays the message to the human user; e.g., "Token Manager wants to activate your token. Please enter your passcode." The human owner enters the passcode on the mobile device's keyboard.

The authentication service verifies the passcode (block 358). For example, the passcode can be stored in a secure data storage location accessible to the authentication service based on an access code generated from the combination of an identification code associated with the authentication service combined with the user ID associated with the token. As such, the passcode is accessible to the authentication service only after successful authentication of the token (during which the authentication service receives the user ID from the token). The authentication service compares the passcode received from the token owner to the stored passcode to verify that the received passcode is correct. If the passcode is not correct, the authentication service can abort the token activation process or request that the token owner reenter their passcode.

In some exemplary embodiments, repeated unsuccessful passcode entries (e.g., three consecutive failed attempts within five minutes) may trigger temporary or permanent disablement of the token.

After successful verification of the token owner's passcode, the authentication service activates that token by updating privileges associated with the token (block 360). As noted above, the token's state are checked during the token authentication process prior to authenticating a token. As such, by updating the token privileges the token can then be used for authentication. The token state can be stored in a secure data storage location accessible to the authentication service based on an access code generated from the combination of an identification code associated with the authentication service combined with the user ID associated with the token.

Figure 21:
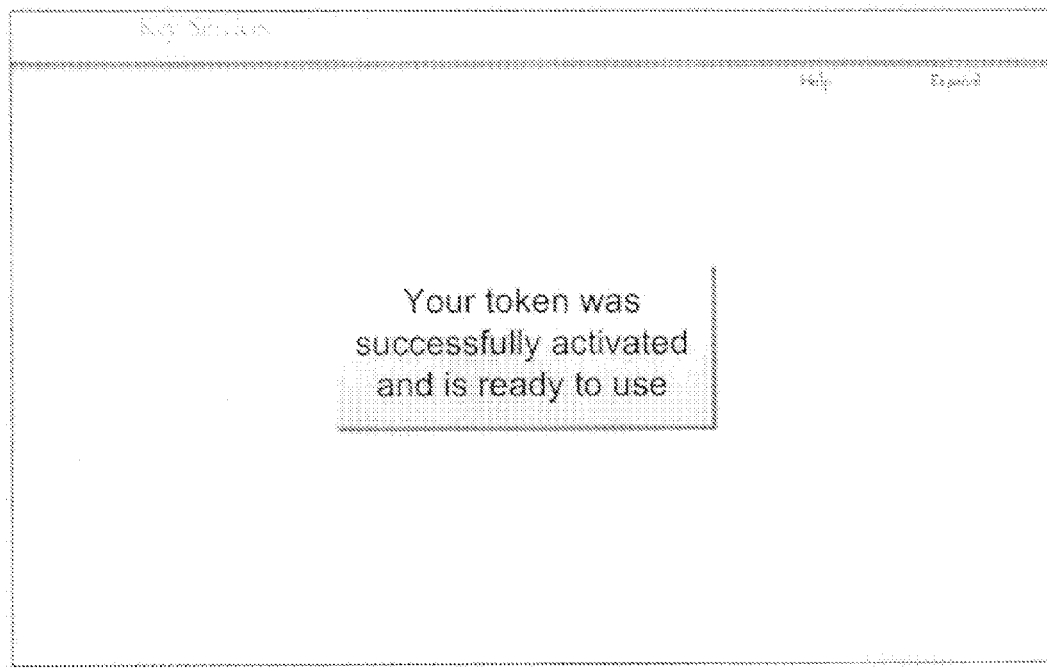
FIG. 21 shows an exemplary user interface for communication of token activation.

After successful activation of the token, the authentication service sends a message to the token management system indicating that the token has been successfully authenticated (block 362) and the token management system receives the message from the authentication service (block 364). The token management system sends a message to the token owner regarding the successful activation of the token (block 366). For example, the token management system can present a user interface to the token owner with a message indicating that the token activation was successful. An exemplary user interface is shown, for example, in FIG. 21.

Such an activation process which relies on the combination of successful authentication of an inactive token and entry of a passcode by a token owner can provide one or more of the following advantages. An inactive token may be created in one location (e.g., by the holder of a recovery key) and sent to the owner at another location; e.g., by courier, post or package delivery service. If the inactive token is stolen during transit, it is useless to the thief without the corresponding passcode.

The user of a passcode, a representation of an arbitrary binary number in a form convenient to the owner, avoids the use and storage of owner-specific personal data (e.g., name, mother's maiden name, favorite color, or other similar so-called security questions and answers) in the activation process. This preserves the anonymity of the owner to the authentication service operator.

As the passcode is already known to the user from its usage in the course of ordinary authenticated transactions with a variety of applications and service providers, the creation and activation of a replacement token delivery need not be accompanied by a parallel delivery of a one-time activation code.

An inactive token may also be activated by the authentication service during the owner's ordinary course of business with applications/services (e.g., service providers). In this embodiment, the owner begins a transaction with any service provider employing the authentication service. During the transaction the service provider requests authentication of its user (either 1-factor or more than one factor). The authentication service, having now authenticated the token, notes that the token is an inactive token. Even if the service provider requested only one-factor authentication (e.g., just the presentation of an active token), the authentication service requests the passcode. In some applications, the owner and to token may be at a device unable to accept a passcode (e.g., a door lock token reader). In such applications, the token must be activated prior to its use.

Use of Recovery Keys to Replace Tokens

As described above, during the lifecycle of a token, a blank is transformed into an inactive token by loading firmware onto the token and storing on the token a token ID, user ID, and two encryption keys and encryption algorithm identifiers (for the token and for data) on the token. For simplicity, the combination of the user ID, encryption keys and encryption algorithm identifiers is referred to herein as the "payload." However, in order to store the payload on a token, the authentication system must first know which user ID and encryption keys to associate with the blank token. In some examples, in order to enable a token owner to generate new (e.g., duplicate or replacement) tokens using their associated payload, a token owner is provided with one or more recovery keys. The recovery key includes a stored copy of the payload for a particular token owner and can be used to authenticate the token owner and transfer the payload to a blank token to form an inactive token. While the recovery key includes the payload for a user, it cannot be used to authenticate the token owner for entering into a transaction or accessing data other than for token management activities. The purposes of the recovery key are to provide procedures by which the owner can disable and replace tokens or recovery keys and can replace a forgotten passcode.

In another exemplary embodiment, the recovery key does not contain the payload. Rather the recovery key contains a different user ID and different data encryption key/algorithm identifier. In this way, the recovery key can never be used to authenticate ordinary transactions (e.g., transactions not used for token management) nor to access data associated with such transactions because its user ID differs from the token owner's user ID.

The recovery key's user ID combined with the token management service provider IS form an access code used to retrieve a data container containing information including the payload. This data container may be encrypted with the recovery key's data encryption key and algorithm.

In yet another exemplary embodiment, the recovery key contains the differing user ID and data encryption key/algorithm identifier described above so as to prevent its use for ordinary transactions. The recovery key also holds the payload and this payload may be encrypted with a randomly-generated encryption key "X" used only for this purpose. The key "X" and encryption algorithm identifier is stored in a data container (which may be encrypted with the recovery key's data encryption key/algorithm), with this data container's location determined by an access code formed from the combination of the recovery key's user ID, the token management service provider ID, and optionally additional factors.

Variations of the above employ authentication service provider ID instead of or in addition to the token management service provider ID to form the access code for the data container(s) involved in obtaining the payload. More generally, the partition of functions between token management service and authentication service provide convenience for implementation and for the realization of alternate or third-party token management utilities; however unified implementations integrating token management and authentication services into a single service provider with one service provider ID represent another potential implementation.

More particularly these procedures allow an owner to undertake these actions on his own, anonymously and without the knowledge or assistance of the system operators. Furthermore, because the owner's data is never accessible with a recovery key, these procedures may be executed by a trusted representative of the token owner (e.g., a recovery agent) such as a friend, lawyer, or third party organization providing recovery services.

To activate a blank token (e.g., a token that does not include previously stored User ID and encryption keys), a recovery key is presented. In one example, the recovery key allows access to a data container holding the payload (e.g., holding the User ID and encryption keys and encryption algorithm identifier). In another example, the recovery key includes stored information about the payloads. Presentation of the recovery key enables the system to transfer the payload to the token to be activated (e.g., the blank token). After the payload has been stored on the token to be activated, the token owner provides a passcode. The system verifies the passcode, and if the passcode is correct, activates the token. As such, the combination of a recovery key and the passcode can be used to generate an active token from a blank token.

Figure 22:
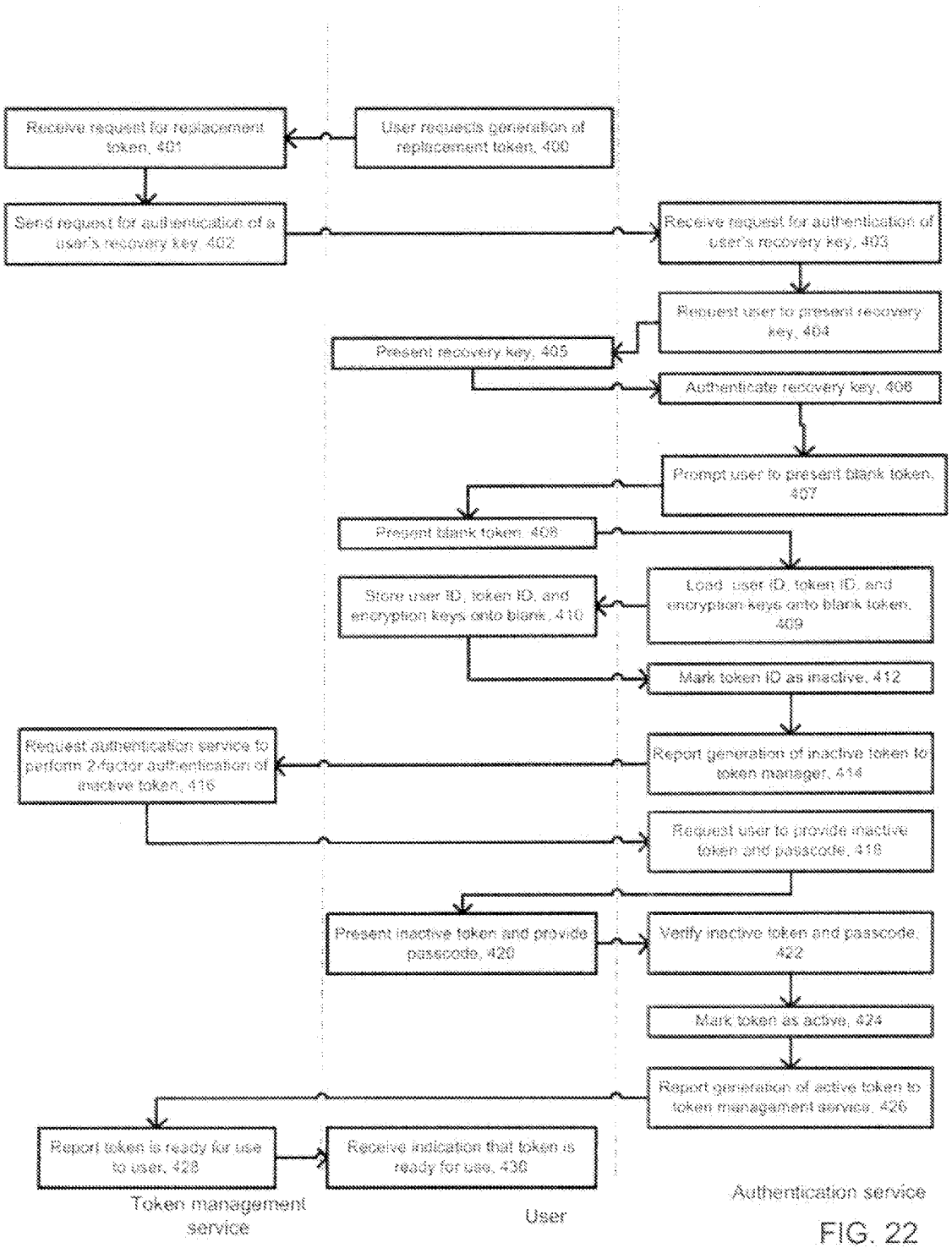
FIG. 22 shows an exemplary token replacement process.

More particularly, FIG. 22 show a process for generating an active token based on the presentation of a recovery key and entry of a passcode. The process described in relation to FIG. 22 assumes that the token owner who has the token to be activated also has a copy of his/her recovery key (e.g., the token owner is in possession of the recovery key and the token to be activated such that the two tokens are in the same location).

The process includes a token owner requesting generation of a replacement token (e.g., generation of a new token that is active within the system and can be used for authentication) (400). The token owner can desire to generate a new active token for a variety of reasons. For example, the token owner can want to have an extra copy of his/her token to keep in a separate location or the token owner may have lost his/her active token and need a new active token to replace the token that was lost. The token owner can request to begin the process of generating a new token in various manners, for example, the token owner can start a web based application (e.g., a token management service application). The web based application can include a user interface with the option to select "I lost a token" or equivalent procedure. By selecting such an option, the token owner can begin the replacement token generation process.

Upon initiation of the replacement token generation process, the token management service receives the request for the replacement token (401) and sends a request to an authentication service to perform a one-factor authentication of a recovery key (402). The authentication service receives the request to perform a one-factor authentication of the recovery key (403). In general, the one-factor authentication can be based on a single confirmation. In this case, the one-factor authentication is based on something that the token owner has in his/her possession, more particularly, the recovery key. As described in more detail to follow, the one-factor authentication does not complete the token generation process. Rather, in subsequent portions of the token generation process, the token owner must provide additional factors for authentication.

In this example, the one-factor authentication is based on the token owner's presentation of his/her recovery key and the process involves the authentication service requesting for the token owner to present his/her recovery key (404). The request for presentation of the recovery key can include an indication of what service provider is requesting for the token owner to present their recovery key—in this example, the token management service and the purpose of the authentication (e.g., to create a replacement token). In response to the request from the authentication service, the token owner presents the recovery key (405). For example, the token owner can place the recovery key on a contactless interface or can connect the recovery key to the Internet via a contact-based interface.

The authentication service authenticates the recovery key (406). For example, the authentication service checks that the device provided by the token owner is a recovery key. If so, the authentication service reports successful authentication to the token management service (407). A data container from the distributed data storage associated with the one-way obfuscation of User ID+token manager service provider ID is also delivered to token manager. The data container includes the payload.

After the token owner has successfully authenticated their recovery key, the replacement token generation process continues by creating a replacement token.

The authentication service prompts the token owner to present a blank token (405). The request for presentation of the blank token can include an indication of what service provider is requesting the token owner to present the blank token and what operation is being performed. The token owner removes his/her recovery key (if still present in reader) and provides a blank token (408). The authentication service checks that the device provided by the token owner is a blank. If so, the authentication service loads firmware (if needed), loads the user ID, and loads the encryption keys (409, 410). The authentication service can optionally verify that each of the loads worked correctly and mark the token ID as inactive but ready to activate (412). In this state the token has been associated with its owner via the token owner's User ID and encryption keys, but cannot be used for authentication purposes because it has not been activated.

In some embodiments, the memory of the user equipment to which the recovery key or token is connected may not be trusted. In one example of methods used to protect the transfer of the payload through untrusted user equipment into the blank token, the payload remains encrypted while in the user equipment. During the operations, the token generates a random one-time asymmetric key pair and transmits the public key of the pair to the device holding the payload (e.g., recovery key, token management service or authentication service), which encrypts the payload with this public key and transmits the encrypted payload into the token. The token decrypts the payload with the private key.

The authentication service reports the successful result (e.g., that the inactive token was generated successfully) to the token management service (414). In response, the token management service requests that the authentication service perform a two-factor authentication process to activate the inactive token. In some examples, a three-factor or four-factor authentication process could be used instead of a 2-factor authentication process. The authentication service authenticates the token management service and displays a message to the token owner to prompt the token owner to provide their inactive token and passcode and waits for token owner to provide token (if not still in reader) and passcode (418). For example, authentication service can display a message of "Blank token successfully prepared. Please provide this token and your passcode." The token owner presents the inactive token and provides the passcode (420). The authentication service authenticates inactive token and passcode (422) and, if the combination is correct, marks the inactive token as active (424). The token can be marked as active by updating the token's privileges from inactive to active. The authentication service reports to the token management service that the token generation and activation was successful (426) and the token management service informs token owner that the new token is now ready for use (428, 430).

In the examples described above, a token owner generated an active token based on his/her possession of a recovery key and knowledge of his/her passcode. However, in some examples, a token owner may desire to generate a new active token in a situation where he/she does not have physical access to his/her recovery key. For example, if the token owner is traveling on vacation in another country and loses his/her active token, the token owner is unlikely to have access to his/her recovery key as the user would likely have left the recovery key in a safe location separate from the active token. As such, the token owner may desire to generate a new active token without being able to physically provide the recovery key from his/her current location. In order to use a recovery key that is located in a separate location from the token owner to generate a new active token, the system uses a ticket-based process in which the authentication and provision of the payload occurs based on a recovery key presented in a different location from the token to be activated.

When the recovery key is in a different location from the token to be activated, the process begins similar to the process described above with an authorized representative of the owner who holds a recovery key (e.g., a recovery agent) requesting that a new token be generated. The token management service requests that the recovery key be presented from a first location (e.g., Location A) and authenticated by the authentication service. For example, the authentication can be accomplished using one or more of the processes described above. Upon completion of the authentication, the token management service generates a ticket that includes a protected representation (e.g., encrypted with a one-time key) of the payload or protected representation of its one-time temporary location. The ticket is also associated with a one-time code that can be used to identify the ticket. The token management service sends the one-time code identifying the ticket to the recovery agent at location A. The one time code can be a string of numbers and/or characters used to identify the ticket. The recovery agent at location A communicates the one-time code to the token owner at a second location separate from the first location (e.g., Location B). This communication can be in various forms including by telephone, text message, e-mail, etc. For additional security the ticket and its identifier may have a limited time window (start and finish time) during which it can be used.

The token owner at location B provides the one time code and his/her passcode to the authentication service. In response, the token management service (in conjunction with the authentication service), creates an inactive token and activates the inactive token. More particularly, to create the inactive token, the token management service retrieves the ticket identified by the one-time code and can thereby obtain or instruct the authentication service to obtain the payload. As such, when the token owner at location B receives the one time code, the token owner can then gain access to the stored information in the ticket. By passing a one-time code between the holder of the recovery key (e.g., the recovery agent at location A) and the user attempting to generate a new token (e.g., the token owner at location B) the sensitive information of the user ID and the user encryption keys/algorithm identifier does not have to be transferred outside of the tokens and the authentication service.

Disabling a Token

Figure 23:
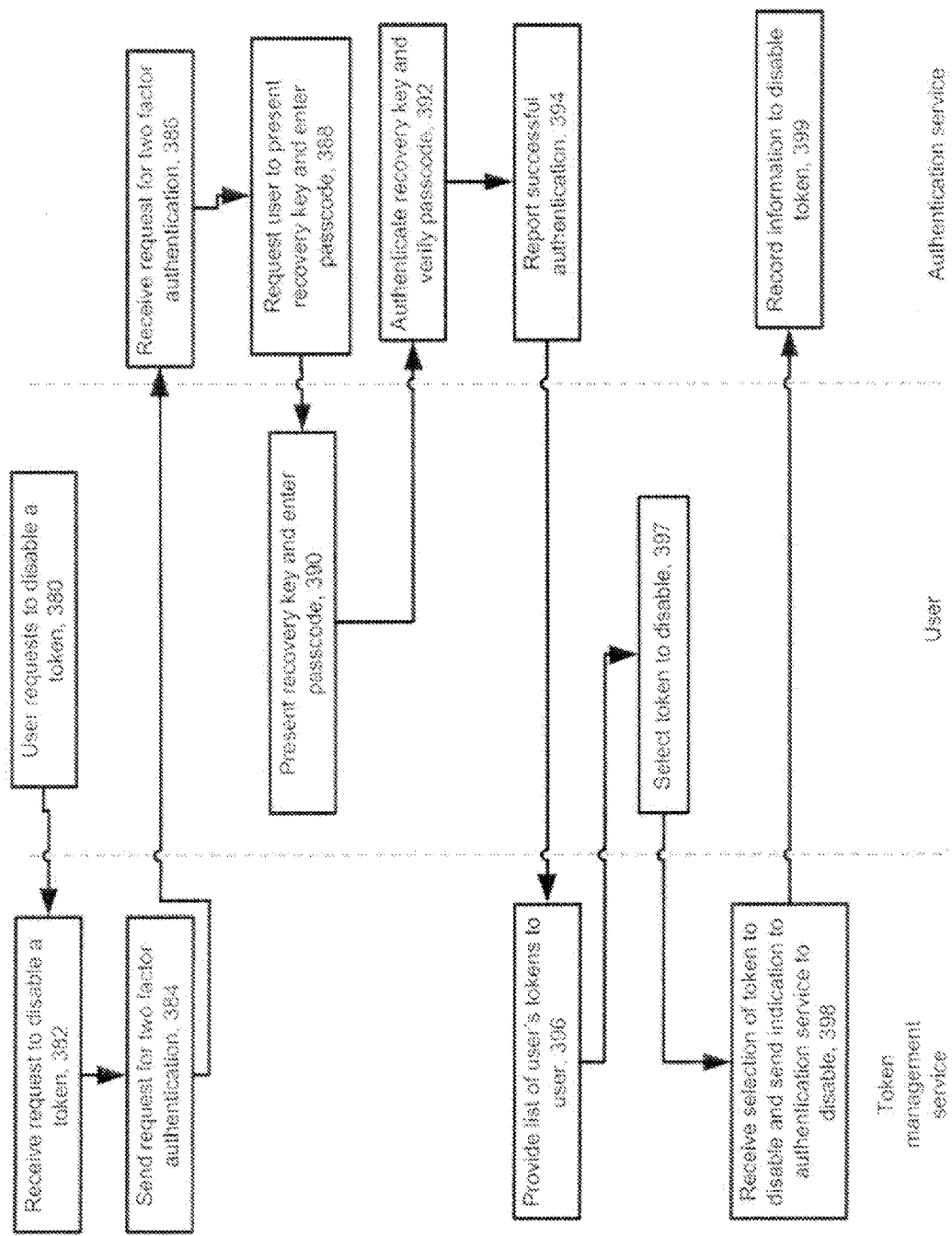
FIG. 23 shows an exemplary token disablement process.

As shown in FIG. 23, the process includes a token owner requesting to disable a token (380). The token owner can desire to disable a token for a variety of reasons. Upon initiation of the token disablement process, the token management service receives the request to disable a token (382) and sends a request to an authentication service to perform a two-factor authentication of a recovery key and passcode (384). The authentication service receives the request to perform a two-factor authentication of the recovery key and passcode (386). In general, the two-factor authentication can be based on two confirmations. In this case, the two-factor authentication is based on something that the token owner has in his/her possession, more particularly, the recovery key and something an owner knows, e.g., the passcode.

In this example, the two-factor authentication is based on the token owner's presentation of his/her recovery key and entry of the passcode and the process involves the authentication service requesting for the token owner to present his/her recovery key and enter his/her passcode (388). In response to the request from the authentication service, the token owner presents the recovery key and enters the passcode (390).

The authentication service authenticates the recovery key (392). For example, the authentication service checks that the device provided by the token owner is a recovery key. If so, the authentication service reports successful authentication to the token management service (394). The authentication service also verifies that the passcode is correct.

After successful two-factor authentication, the token manger presents dialog to token owner via a user interface, listing the token owner's tokens (396). If desired, based on the presented list of tokens, the token owner selects a token to disable (397). For example, the token owner may desire to deactivate or disable a token that has been lost or is in the possession of someone that the token owner does not wish to have access. The token management service receives the selection of the token to disable and sends an indication to the authentication service to disable to selected token (398). The authentication service records appropriate information to disable the token (399). For example, the authentication service can modify a status of the token from active to disabled.

In another example, a data container identified by an access code formed from the combination of token ID and authentication service provider ID is destroyed. As this data container holds an encryption key and algorithm identifier needed to establish communications between the token and the authentication service, the token is disabled. If the token's memory was locked when it was created, the token becomes permanently useless for authentication as it cannot create and retain a new key.

Use of Recovery Key to Generate Additional Recovery Keys

A token owner may possess multiple recovery keys which are isomorphic, e.g., possess equal powers. Any one of these isomorphic recovery keys with proper authentication, may be used to disable another recovery key and to create an inactive or active recovery key.

In one exemplary embodiment, isomorphism is realized by creating all there recovery keys to include identical recovery key user ID and user data encryption keys and algorithm identifiers. As explained herein, some exemplary embodiments set the recovery key user ISD equal to the owner's user ID (as stored on the token owner's active token) and similarly employ identical data encryption keys and tokens. Other exemplary embodiments employ a recovery key user ID and data encryption keys that differ from that employed by the owner's active tokens.

To individualize these recovery keys, each contains its own unique token ID and token encryption key/algorithm identifier.

For example, following procedures similar to those described above for replacing a token, a user of the token management service creates an inactive recovery key from a blank token by authenticating with another recovery key. The inactive recovery key is activated by authenticating it with the owner's passcode.

In another example, following procedures similar to those above for replacing a token when the owner is at another location distant from any recovery key, a recovery agent holding one recovery key uses the token management service to create a ticket enabling the remote creation a of a new recovery key from a blank token. The owner, upon receipt of the one-time code identifying the ticket, uses the token management service to authenticate the ticket identifier and owner's passcode and thereafter create an active recovery key from a blank token.

In a further example, following procedures analogous to those described above for disabling a token, a user of token management service disables one or more recovery key(s) (active or inactive) by authenticating with another recovery key and the owner's passcode.

In a further example, following procedures similar to those described above for disabling a token when the owner is at a location distant from any recovery key, a recovery agent holding one recovery key uses token management service to create a ticket enabling remote disabling of recovery keys. The owner upon receipt of the one-time code identifying the ticket, uses token management service to authenticate the ticket identifier and owner's passcode and thereafter disables one or more recovery key(s) (active or inactive).

The passcode associated with the recovery key can be the same as the passcode associated with an active token or can differ from the passcode associated with the active token.

Passcode Recovery

In some situations, a token owner may forget his/her passcode or desire to be assigned a new passcode. In general, the passcode is a binary code assigned by the authentication service. For the convenience of human owners the passcode can be represented as, for example, a string of alphanumeric characters, e.g., "73DeK3Na". Assigning the passcode selected by the authentication system (e.g., as opposed to allowing the token owner to select his/her own passcode) is believed to increase the security of the passcode because the token owner is unable to select a common password that he/she uses to access other systems or a password that is easily determined or guessed based on knowledge of the token owner. However, embodiments may additionally or alternatively permit owner-selected passcodes. This, assignment of a passcode herein can also include selection of a passcode by the token owner.

Passcodes may be stored by a variety of methods. For example, the passcode may be stored in a data container whose location is determined based on an access code formed by the combination of a token user ID, authentication service provider ID, and optionally other factors.

The representation of the passcode in storage may be obfuscated for further security. For example, obfuscation may be performed by a one-way function (e.g., hash algorithm) executed by the authentication service.

Figure 24:
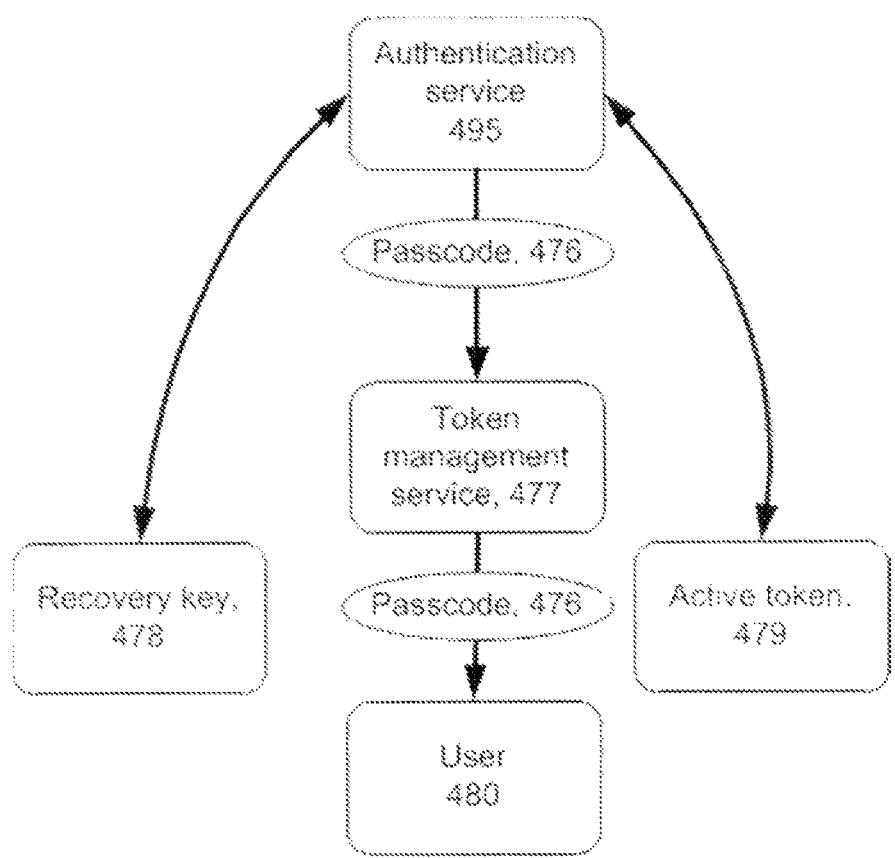
FIG. 24 shows an exemplary passcode restoration process.

Referring to FIG. 24, in order to be assigned a new passcode or to receive a previously assigned passcode, a token owner presents both an active token 479 and a recovery key 478. The active token 479 and recovery key 478 are both authenticated by an authentication service 495. Upon successful authentication of both the active token 479 and recovery key 478, the authentication service 495 assigns a new passcode 476 to the token owner's account. The authentication service transmits the passcode to the token management service 477 which, in turn, provides the passcode 476 to the user 480, for example, during the user's secure web session with the token management service.

In another exemplary embodiment, the passcode is created within the token upon instruction by the authentication service after authentication of the active token 479 and recovery key 478. A plain or obfuscated version of the passcode is provided to the authentication service for storage. When at any later time, the user is asked for his passcode, the user's response s entered directly on the token. The token obfuscates the passcode if required and transmits the (obfuscated) passcode to the authentication service via a secure channel (e.g., encrypted with one-time keys). The obfuscation algorithm may, for example, include either or both of a one-way function and an encryption using, e.g., an asymmetric key pair and associated algorithm of which one key and the algorithm's identity was provided to the authentication service for storage at the time the passcode was generated. In such an example, the authentication service decrypts the received encrypted/obfuscated passcode using the identified algorithm and key from storage and compared the result with the stored obfuscated passcode. When additional/replacement tokens are created, the obfuscation method and parameters and the token's passcode encryption key and algorithm are included in the payload. In such examples, the user's form of the passcode is never displayed nor entered nor directly represented on any device except the token and the token never retains the passcode in any form in long term storage.

Figure 25:
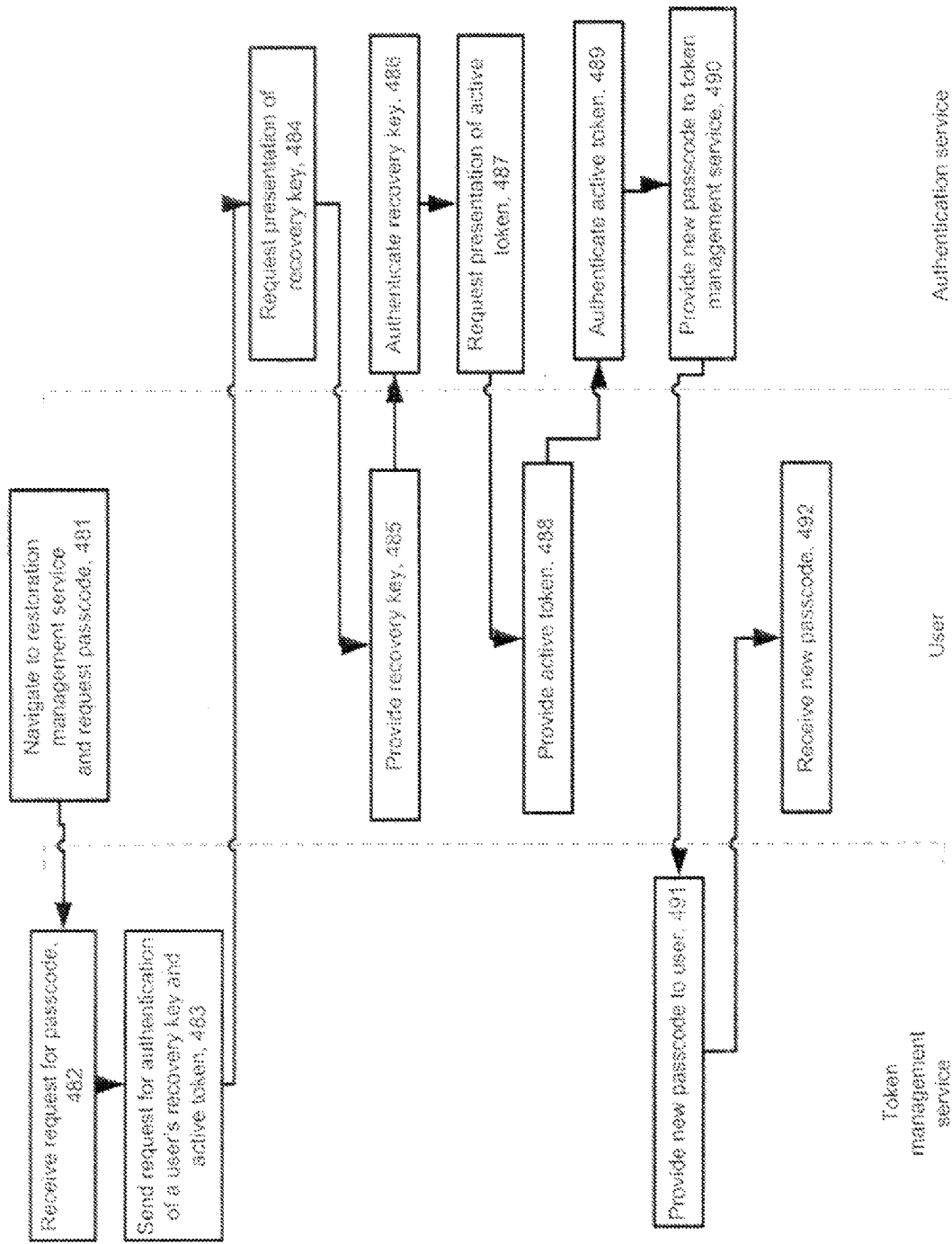
FIG. 25 shows an exemplary passcode restoration process.

FIG. 25 shows a flow diagram of an exemplary process for providing a passcode to a token owner based on the token owner's presentation of both an active token and a recovery key. The token owner navigates to token management service and requests that the service provide his/her passcode (481). The token management service receives the request for passcode (482) and sends a request for authentication of a token owner's recovery key and active token to the authentication service (483).

The authentication service requests that the token owner present his/her recovery key (484). In response to the request, the token owner provides his/her recovery key (485) and the authentication service authenticates the recovery key, e.g., using one or more of the authentication processes described herein (486). The authentication service requests that the token owner present his/her active token (487). In response to the request, the token owner provides his/her active token (488) and the authentication service authenticates the active token, e.g., using one or more of the authentication processes described herein (489).

After successful authentication of both the token owner's recovery key and active token, the authentication service provides a new passcode to token management service (490) and the token management service provides the passcode to the token owner (491) and the token owner receives a new passcode (492).

Passcode recovery may also occur even if the owner is distant from the recovery key. For example, using procedures similar to those described herein for other token management tasks involving distance recovery keys, a recovery agent holding a recovery key uses the token management service to create a ticket enabling the passcode recovery. The owner, upon receipt of the one-time code identifying the ticket, users token management service to authenticate the ticket identifier and the token and thereafter follows the process to obtain a new passcode.

Specialized Passcodes

In some embodiments, the token owner may create and employ specialized passcodes for unique tasks.

For example, the passcode associated with the recovery key can be the same as the passcode associated with the token or can differ from the passcode associated with that token. In the latter case, the recovery key passcode is limited to authenticating token management actions involving the recovery key (e.g., two-factor authentication of the recovery key to create and inactive token) and it's not used as a substitute for the passcode associated with the active token (e.g., to activate an inactive token).

In another example, the token owner may create a panic code which, when entered instead of the passcode associated with the token, temporarily or permanently disables the use of that token, that recovery key, all tokens or all tokens and recovery keys. Such panic codes may be used when the threat of misuse of the token(s), recovery key(s) or data protected thereby exceeds the short-term or long-term value of the token(s), recovery key(s) or data.

Such specialized passcodes are generated and stored by the token management and authentication services using the same methods employed for ordinary passcodes. When the authentication service receives a response to a request for the passcode, the authentication service tests the response against the stored list of specialized passcodes and perms the associated specialized action when a match occurs.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. A computer-implemented method comprising:
   receiving a user identifier and one or more encryption keys from a recovery key, the recovery key being associated with a user and enabled to generate replacement tokens;
   receiving an encryption algorithm identification associated with each of the one or more encryption keys from the recovery key;
   storing the user identifier, the one or more encryption keys, and the encryption algorithm identification on the replacement token;
   requesting a passcode from the user; in response to the request, receiving the passcode from the user; and
   upon verification of the passcode, activating the replacement token by updating state information associated with the replacement token.

2. The method of claim 1, wherein receiving the user identifier and the one or more encryption keys from the recovery key comprises receiving the user identifier and the one or more encryption keys from a memory of the recovery key.

3. The method of claim 1, wherein receiving the user identifier and the one or more encryption keys from the recovery key comprises receiving the user identifier and the one or more encryption keys from a data container identified by an access code that is based in part on a unique identifier associated with the recovery key.

4. The method of claim 1, further comprising:
   prior to storing the user identifier and the one or more encryption keys on the replacement token, storing the user identifier and the one or more encryption keys in a storage location that is accessible based on a combination of a service provider identifier and a code;
   receiving the code from the user;
   combining the code with the service provider identifier; and
   accessing the stored user identifier and one or more encryption keys from the storage location.

5. The method of claim 4, further comprising storing an encryption algorithm identifier on the replacement token.

6. The method of claim 1, wherein the recovery key is prevented from performing transactions other than those associated with token and passcode management.

7. The method of claim 1, further comprising installing firmware on the token prior to storing the user identifier and the one or more encryption keys on the token.

8. The method of claim 1, further comprising:
   providing a list of tokens associated with the particular user to the particular user;
   receiving a selection of one or more of the tokens from the list of tokens; and
   deactivating the selected one or more of the tokens from the list of tokens by updating state information associated with the token.

9. The method of claim 1, further comprising subsequent to activating the token receiving a request from a service provider to authenticate the token and authenticating the token to enable the user and the service provider to perform a transaction.

10. The method of claim 1, wherein the token comprises an electronic device configured to connect to the Internet.

11. The method of claim 1, wherein the token comprises an electronic device configured to connect to a network via a host device.

12. The method of claim 1, wherein the token comprises an electronic device configured to connect to the Internet via a contactless interface.

13. The method of claim 1, wherein the token comprises an electronic device configured to connect to the Internet via a contact-based interface.

14. The method of claim 1, wherein updating the state of the token comprises accessing a look-up table indexed by token identifiers and modifying the state of the token in the look-up table.

15. The method of claim 1, wherein updating the state of the token comprises modifying a state of the token in a data container accessible based on an access code generated based on a combination of the token identifier and a service provider identifier.

16. The method of claim 1, further comprising subsequent to activating the token to authenticating the user based on presentation of the token.

17. A computer program product tangibly embodied in a non-transitory computer readable medium comprising instructions that, when executed by a processing device, cause the processing device to:
- receive a user identifier and one or more encryption keys from a recovery key, the recovery key being associated with a user and enabled to generate replacement tokens;
- receive an encryption algorithm identification associated with each of the one or more encryption keys from the recovery key;
- store the user identifier, the one or more encryption keys, and the encryption algorithm identification on the replacement token;
- request a passcode from the user; in response to the request, receiving the passcode from the user; and
- upon verification of the passcode, activate the replacement token by updating state information associated with the replacement token.

18. The computer program product of claim 17, wherein the instructions to receive the user identifier and the one or more encryption keys from the recovery key comprises instructions to receive the user identifier and the one or more encryption keys from a memory of the recovery key.

19. The computer program product of claim 17, wherein instructions to receive the user identifier and the one or more encryption keys from the recovery key comprise instructions to receive the user identifier and the one or more encryption keys from a data container identified by an access code that is based in part on a unique identifier associated with the recovery key.

20. The computer program product of claim 17, further comprising instructions to:
- prior to storing the user identifier and the one or more encryption keys on the replacement token, store the user identifier and the one or more encryption keys in a storage location that is accessible based on a combination of a service provider identifier and a code;
- receive the code from the user;
- combine the code with the service provider identifier; and
- access the stored user identifier and one or more encryption keys from the storage location.

21. The computer program product of claim 20, further comprising instructions to store an encryption algorithm identifier on the replacement token.

22. The computer program product of claim 17, further comprising instructions to prevent the recovery key from performing transactions other than those associated with token and passcode management.

23. The computer program product of claim 17, further comprising instructions to:
- provide a list of tokens associated with the particular user to the particular user;
- receive a selection of one or more of the tokens from the list of tokens; and
- deactivate the selected one or more of the tokens from the list of tokens by updating state information associated with the token.

24. A system comprising:
a processing device; and
a memory comprising instructions that, when executed by the processing device, cause the processing device to:
- receive a user identifier and one or more encryption keys from a recovery key, the recovery key being associated with a user and enabled to generate replacement tokens;
- receive an encryption algorithm identification associated with each of the one or more encryption keys from the recovery key;
- store the user identifier, the one or more encryption keys, and the encryption algorithm identification on the replacement token;
- request a passcode from the user; in response to the request, receiving the passcode from the user; and
- upon verification of the passcode, activate the replacement token by updating state information associated with the replacement token.

25. The system of claim 24, wherein the instructions to receive the user identifier and the one or more encryption keys from the recovery key comprises instructions to receive the user identifier and the one or more encryption keys from a memory of the recovery key.

26. The system of claim 24, wherein instructions to receive the user identifier and the one or more encryption keys from the recovery key comprise instructions to receive the user identifier and the one or more encryption keys from a data container identified by an access code that is based in part on a unique identifier associated with the recovery key.

27. The system of claim 24, further comprising instructions to:
- prior to storing the user identifier and the one or more encryption keys on the replacement token, store the user identifier and the one or more encryption keys in a storage location that is accessible based on a combination of a service provider identifier and a code;
- receive the code from the user;
- combine the code with the service provider identifier; and
- access the stored user identifier and one or more encryption keys from the storage location.

28. The system of claim 27, further comprising instructions to store an encryption algorithm identifier on the replacement token.

29. The system of claim 24, further comprising instructions to prevent the recovery key from performing transactions other than those associated with token and passcode management.

30. The system of claim 24, further comprising instructions to:
- provide a list of tokens associated with the particular user to the particular user;
- receive a selection of one or more of the tokens from the list of tokens; and
- deactivate the selected one or more of the tokens from the list of tokens by updating state information associated with the token.

* * * * *